(12) United States Patent
Kon et al.

(10) Patent No.: US 8,351,129 B2
(45) Date of Patent: Jan. 8, 2013

(54) ZOOM LENS AND ELECTRONIC IMAGING APPARATUS INCORPORATING THE SAME

(75) Inventors: Toyoki Kon, Hachioji (JP); Keisuke Ichikawa, Tama (JP)

(73) Assignee: Olympus Imaging Corp., Toyko (JP)

( * ) Notice: Subject to any disclaimer, the term of this patent is extended or adjusted under 35 U.S.C. 154(b) by 0 days.

(21) Appl. No.: 13/200,069

(22) Filed: Sep. 15, 2011

(65) Prior Publication Data
US 2012/0075715 A1  Mar. 29, 2012

(30) Foreign Application Priority Data

Sep. 28, 2010  (JP) .................................. 2010-216387
Aug. 11, 2011  (JP) .................................. 2011-175551

(51) Int. Cl.
  *G02B 15/14*  (2006.01)
(52) U.S. Cl. ........................................ 359/683; 359/676
(58) Field of Classification Search .................. 359/676, 359/683, 758
See application file for complete search history.

(56) References Cited

FOREIGN PATENT DOCUMENTS
| | | |
|---|---|---|
| JP | 2008-129238 | 6/2008 |
| JP | 2008-225314 | 9/2008 |
| JP | 2009-069671 | 4/2009 |
| JP | 2009-192771 | 8/2009 |

*Primary Examiner* — Jack Dinh
(74) *Attorney, Agent, or Firm* — Kenyon & Kenyon LLP

(57) ABSTRACT

The zoom lens of the invention comprises, in order from an object side thereof, a first lens group having positive refracting power, a second lens group having negative refracting power, a third lens group having positive refracting power, a fourth lens group having positive refracting power, a fifth lens group having negative refracting power, and a sixth lens group having positive refracting power. The first lens group includes a reflective optical element, and the lens in and on the most image side of the fourth lens group comprises a negative lens concave on its image side.

10 Claims, 32 Drawing Sheets

Example 1

FIG. 2
Example 2
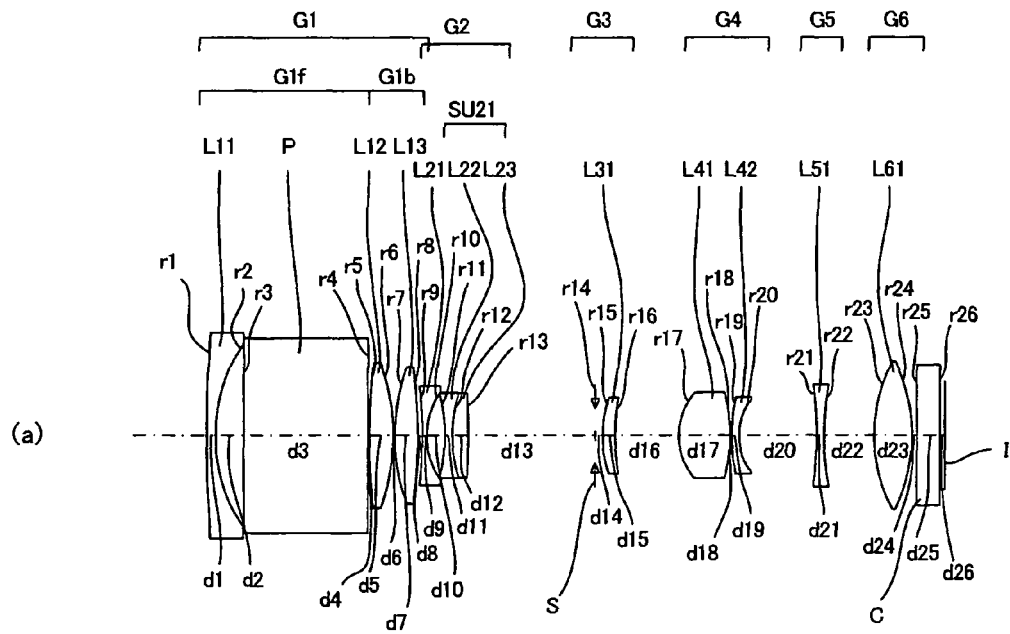
(a)
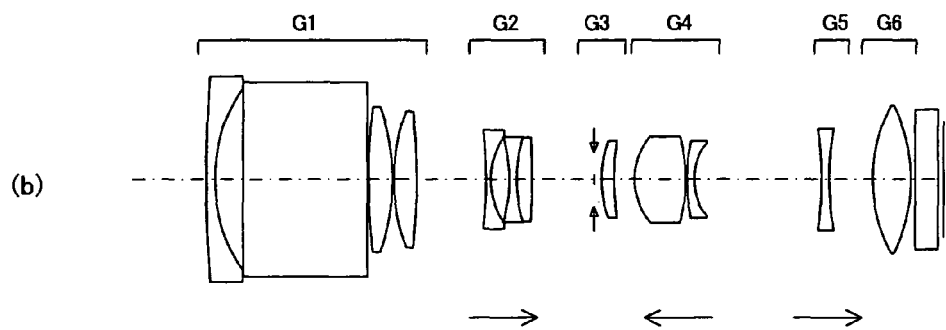
(b)
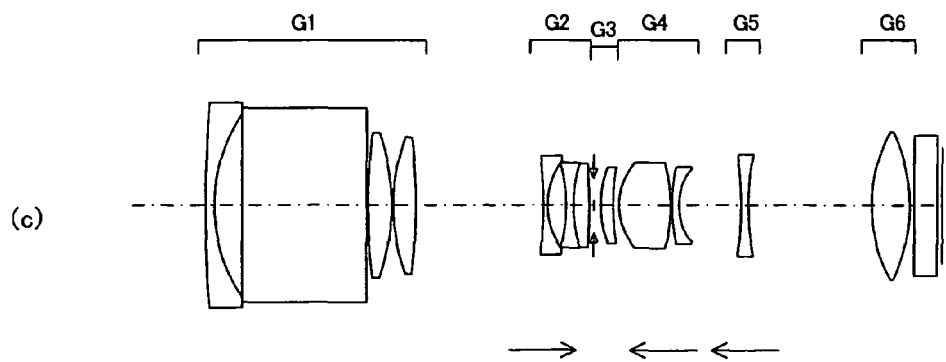
(c)

Example 3

Example 4

Example 6

Example 8

Example 11

Example14

Example 15

ZOOM LENS AND ELECTRONIC IMAGING APPARATUS INCORPORATING THE SAME

BACKGROUND OF THE INVENTION

For an optical system used with electronic imaging apparatus like digital cameras and digital video cameras, it is now required to have small-format size and optical performance high enough to be well corrected for aberrations. As one approach to achieving size reduction, there has been a bending or flexion optical system known in the art that includes a reflective optical element inside as well as an electronic imaging apparatus incorporating the same.

For the bending optical systems including a reflective optical element, a small-format imaging optical system of positive-negative-positive-positive-negative-positive six-groups construction has been known as set forth in the following patent publications.

JP(A) 2009-69671 has proposed adding and inserting one additional lens group to and into a bending optical system of positive-negative-positive-positive-negative-positive six-groups construction having a zoom ratio of about 7 so that zooming may be implemented on a side where the focal length grows longer than could do at the telephoto end of the six-groups construction, with a zoom ratio of as high as about 10.

JP(A)'s 2009-192771, 2008-225314 and 2008-129238 have come up with a bending optical system of positive-negative-positive-positive-negative-positive six-groups construction with a zoom ratio of 5 to 7.

SUMMARY OF THE INVENTION

According to one aspect of the invention, there is a zoom lens provided, which comprises, in order from an object side thereof, a first lens group having positive refracting power, a second lens group having negative refracting power, a third lens group having positive refracting power, a fourth lens group having positive refracting power, a fifth lens group having negative refracting power and a sixth lens group having positive refracting power, characterized in that the first lens group includes a reflective optical element, and the lens in and on the most image side of the fourth lens group comprises a negative lens concave on its image side.

According to the zoom lens of this aspect wherein the first lens group includes a reflective optical element, there is no need for popping up a lens barrel from an imaging apparatus body during use, unlike a received-in-a-lens-mount type optical system, and the optical axis is bent or flexed for location thereby achieving an imaging apparatus that is by far smaller in the depth direction.

Because the negative lens concave on its image side is used for the lens in and on the most image side of the fourth lens group, the front principal point of the fourth lens group may be positioned more on the object side. This in turn enables the fourth lens group to be located more on the image side than could be achieved so far in the art at the wide-angle end where the air separation between the third and the fourth lens group grows the widest; so the zooming space can be more effectively used than in the prior art. As the lens in and on the most image side of the fourth lens group fluctuates during zooming, there are fluctuations of aberrations such as coma and meridional field curvature. If the negative lens concave on its image side is used for the lens in and on the most image side of the fourth lens group, however, those aberration fluctuations are then well corrected. As a consequence, it is possible to obtain a small-format zoom lens capable of allowing for a sufficient zoom ratio while keeping the zooming space small.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 2 is a sectional view, as taken along the optical axis, of the optical arrangements of the zoom lens according to Example 2 upon focusing on an infinite object (a) at the wide-angle end, (b) in an intermediate setting, and (c) at the telephoto end.

DESCRIPTION OF EXEMPLARY EMBODIMENTS

Figure 1:
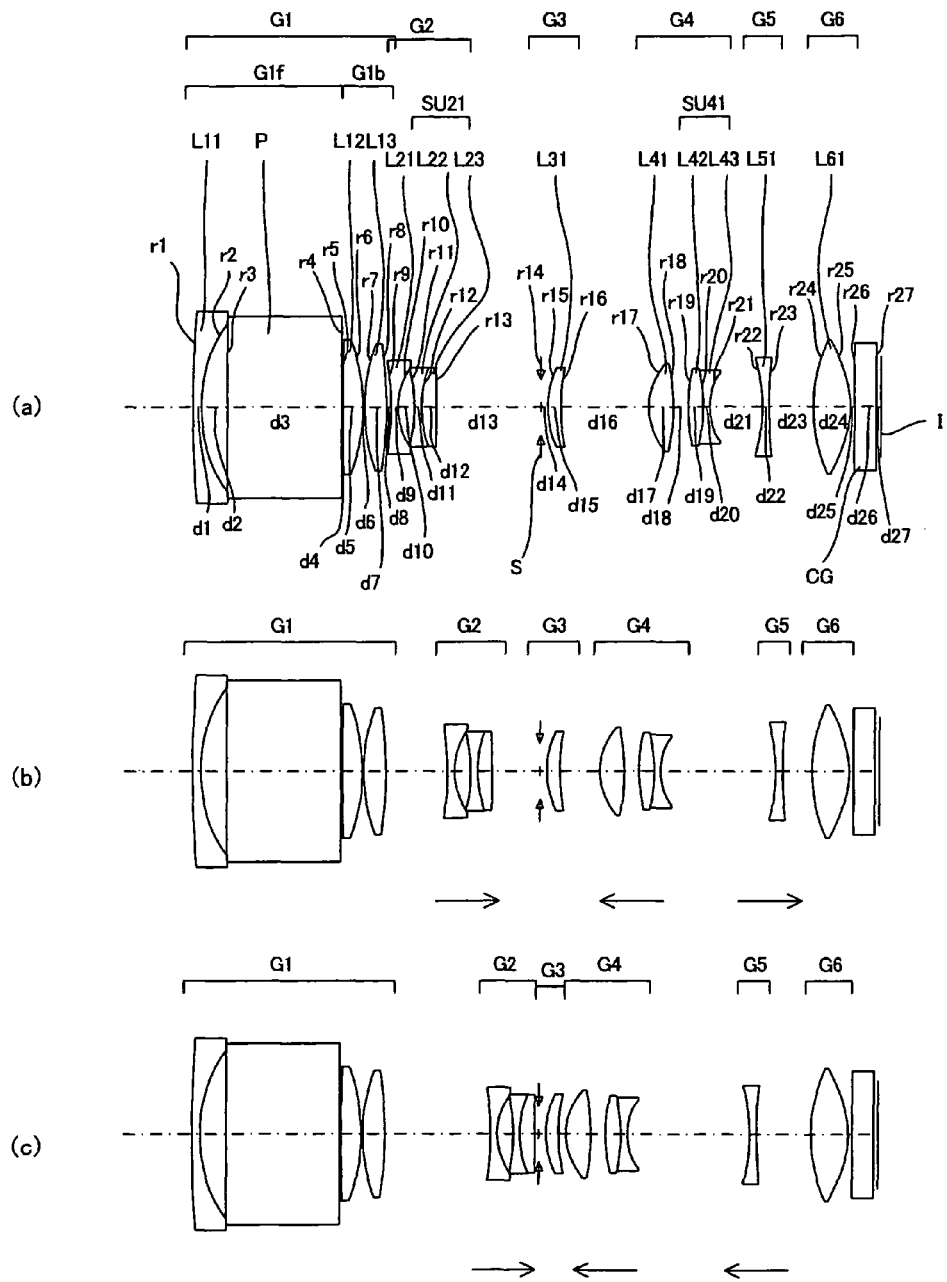
FIG. 1 is a sectional view, as taken along the optical axis, of the optical arrangements of the zoom lens according to Example 1 upon focusing on an infinite object (a) at the wide-angle end, (b) in an intermediate setting, and (c) at the telephoto end.

While the advantages of the exemplary zoom lens constructions set forth hereinafter are now explained, it is to be understood that the invention is by no means limited to them. The explanation of the exemplary zoom lenses includes a lot of specific details for illustration; however, it would be obvious for those skilled in the art that variations added to those details do not deviate from the scope of the invention. Therefore, the exemplary examples of the invention set forth hereinafter are given without getting rid of the generality of the invention for which rights are sought or imposing any limitation thereon.

For the zoom lens exemplified herein, it is desirable to comprise, in order from the object side thereof, the first lens group having positive refracting power, the second lens group having negative refracting power, the third lens group having positive refracting power, the fourth lens group having positive refracting power, the fifth lens group having negative refracting power and the sixth lens group having positive refracting power, wherein the first lens group includes a reflective optical element, and the lens in and on the most image side of the fourth lens group comprises a negative lens concave on its image side.

The arrangement here is designed such that the optical path involved can be bent or flexed by reflection in any desired direction because the first lens group includes a reflective optical element; so there is no need for popping up a lens barrel from an imaging apparatus body during use, unlike the received-in-a-lens-mount type optical system. It is thus possible to provide a small-format zoom lens (bending optical system) that is slimmed down in its depth direction as well as an electronic imaging apparatus incorporating the same.

To put it another way, it is possible to provide a zoom lens that is a bending optical system including a reflective optical element, which is of small-format size and satisfactory optical performance as well as an electronic imaging apparatus incorporating the same.

It is here noted that the "reflective optical element" means an element capable of bending the optical path involved such as the optical axis by reflection in any desired direction. For instance, there is the mention of a mirror, and a prism.

To reduce the size in general and the full length in particular of the bending optical system that is of the positive-negative-positive-positive-negative-position six-groups construction and includes the reflective optical element, the refracting power of each lens group must be strong and, at the same time, the air separation must be diminished. Especially, letting the zooming groups have strong refracting power thereby diminishing the air separation is effective for full-length reduction. As the full length of the optical system is curtailed while keeping hold of high zoom ratios, however, there is no option but to make the refracting power of each lens group strong, and no option but to diminish the space necessary for zooming, imposing some limitations on size reduction.

For instance, referring to JP(A) 2009-192771, JP(A)2008-225314, and JP(A) 2008-129238, the separation between the zooming groups: the fourth lens group of positive power and the third lens group of positive power gets too narrow to take up the necessary and sufficient zooming space, rendering it difficult to make the full length of the optical system shorter any more.

Here, if the negative lens concave on its image side is used for the lens in and on the most image side of the fourth lens group or, in other words, if the surface in and on the most image side of the forth lens group of positive power is configured as a diverging surface, then the front principal point of the fourth lens group can be positioned more on the object side. This in turn enables the fourth lens group to be located more on the image side than could be achieved in the prior art at the wide-angle end where the air separation between the third and the fourth lens group grows the widest, resulting in the ability to make effective use of the zooming space. It is thus possible to obtain a zoom lens of small-format size and satisfactory performance that makes sure a sufficient zoom ratio while keeping the zooming space small.

Preferably, the diverging surface in and on the most image side of the fourth lens group of positive power has the strongest divergence ever in the fourth lens group. This in turn enables the front principal point of the fourth lens group to be positioned more on the object side, leading to a zoom lens of smaller size.

Patent Publication 2 teaches that the fourth lens group is made up of one double-convex lens component, and the fifth lens group is made up of one negative lens concave on its image side. To put it another way, it fails to locate the front principal point position of the fourth lens group on the object side. In consideration of a combined system with the fifth lens group, on the other hand, the front principal point position would be taken as being located on the object side. However, as the relative positions of both fluctuate during zooming or focusing, especially as there are fluctuations of the converging surface in and on the most object side of the fourth lens group and of the diverging surface in and on the most image side of the fifth lens group, it renders it very difficult to make satisfactory correction of fluctuations of aberrations such as coma and meridional field curvature.

Preferably to this end, the surface convex on its object side, located in and on the most object side and the surface concave on its image side, located in and on the most image side are held in the same fourth lens group of positive power, and they keep moving in unison. And apart from that, the fifth lens group of negative power must be left for the purpose of improvements in zooming efficiency.

More preferably, the lens surface in and on the most image side of the fourth lens group should be aspheric.

Configuring the lens surface in and on the most image side of the fourth lens group as an aspheric surface makes possible satisfactory correction of coma and field curvature in particular.

More preferably, at least two surfaces as counted from the surface in and on the most object side of the fourth lens group should be converging surfaces.

As at least two surfaces as counted from the surface in and on the most object side of the fourth lens group are converging or convex surfaces, it enables the front principal point of the fourth lens group to be positioned more on the object side, resulting in the ability to obtain a small-format zoom lens that is much more reduced in terms of full length. At the same time, it facilitates correction of spherical aberrations and coma.

For the zoom lens, it is more preferable that upon zooming from the wide-angle end to the telephoto end, the separation between the first and the second lens group grows wide, the separation between the second and the third lens group gets narrow, the separation between the third and the fourth lens group gets narrow, the separation between the fourth and the fifth lens group changes, and the separation between the fifth and the sixth lens group changes.

With the zoom lens moving as described above, efficient zooming is implementable, and size reduction is achievable as well.

For the zoom lens, it is desired to satisfy the following Condition (1):

$$1.9 \leq |(R_{G4L}+R_{G4S})/(R_{G4L}-R_{G4S})| \quad (1)$$

where $R_{G4S}$ is the radius of curvature of the surface in and on the most object side of the fourth lens group in the zoom lens, and $R_{G4L}$ is the radius of curvature of the surface in and on the most image side of the fourth lens group in the zoom lens.

In Condition (1), the shape of the whole fourth lens group in the zoom lens is defined in terms of a numerical formula. This is the condition for positioning the front principal point of the fourth lens group on the object side while making satisfactory correction of spherical aberrations, coma, field curvature and chromatic aberrations all over the area from the wide-angle end to the telephoto end.

Being short of the lower limit to Condition (1) renders it difficult to position the front principal point of the fourth lens group on the object side, resulting possibly in an obstacle to curtailing the whole optical system length. An effort to forcibly curtail the whole optical system length in this state renders it hard to make sure satisfactory optical performance especially because of the occurrence of spherical aberrations, coma, field curvature and chromatic aberrations all over the area from the wide-angle end to the telephoto end.

It is more preferable to satisfy the following Condition (1)' instead of Condition (1).

$$2.2 \leq |(R_{G4L}+R_{G4S})/(R_{G4L}-R_{G4S})| \quad (1)'$$

It is even more preferable to satisfy the following Condition (1)" instead of Conditions (1) and (1)'.

$$2.3 \leq (R_{G4L}+R_{G4S})/(R_{G4L}-R_{G4S})| \quad (1)''$$

For the zoom lens, it is desirable that the fourth and the fifth lens group satisfy the following Condition (2):

$$0.1 \leq (R_{G5S}+R_{G4L})/(R_{G5S}-R_{G4L}) \leq 0.9 \quad (2)$$

where $R_{G5S}$ is the radius of curvature of the surface in and on the most object side of the fifth lens group in the zoom lens, and $R_{G4L}$ is the radius of curvature of the surface in and on the most image side of the fourth lens group in the zoom lens.

In Condition (2), the shape of the air lens formed by the surface in and on the most image side of the fourth lens group and the surface in and on the most object side of the fifth lens group in the zoom lens is defined in terms of a numerical formula. By the satisfaction of Condition (2), field curvature, it is possible to make satisfactory correction of astigmatism and chromatic aberrations all over the area from the wide-angle end to the telephoto end.

Exceeding the upper limit to Condition (2) causes meridional field curvature to remain under from the wide-angle end up to the intermediate setting, and gives rise to astigmatism at the telephoto end in particular, rendering it hard to make sure satisfactory optical performance. It is also apt to produce higher-order chromatic aberration of magnification.

Falling short of the lower limit to Condition (2) causes meridional field curvature in particular to remain over all over the area from the wide-angle end to the telephoto end, resulting in difficulty making sure satisfactory optical performance.

It is more preferable to satisfy the following Condition (2)' instead of Condition (2).

$$0.2 \leq (R_{G5S}+R_{G4L})/(R_{G5S}-R_{G4L}) \leq 0.8 \quad (2)'$$

It is even more preferable to satisfy the following Condition (2)" instead of Conditions (2) and (2)'.

$$0.3 \leq (R_{G5S}+R_{G4L})/(R_{G5S}-R_{G4L}) \leq 0.7 \quad (2)''$$

For the zoom lens, it is desirable that the fourth and the fifth lens group satisfy the following Condition (3):

$$1.1 \leq F_{G5}/F_{G4Ln} \leq 5 \quad (3)$$

where $F_{G5}$ is the focal length of the fifth lens group in the zoom lens, and $F_{G4Ln}$ is the focal length of the negative lens in and on the most image side of the fourth lens group in the zoom lens.

Condition (3) defines the ratio between the focal length of the negative lens in and on the most image side of the fourth lens group in the zoom lens and the focal length of the fifth lens group in the zoom lens. The satisfaction of Condition (3) enables a small-format zoom lens of satisfactory optical performance to be obtained.

Exceeding the upper limit to Condition (3) renders it very hard to obtain any zoom lens of satisfactory optical performance because it undermines the ability of the fifth lens group to correct aberrations by its movement, leading to difficulty making correction of coma and astigmatism in particular all over the area from the wide-angle end to the telephoto end.

Being short of the lower limit to Condition (3) again renders it very hard to obtain any zoom lens of satisfactory optical performance, because it gives rise to increased aberration fluctuations by the movement of the fifth lens group, leading to difficulty making correction of coma and astigmatism in particular all over the area from the wide-angle end to the telephoto end.

It is more preferable to satisfy the following Condition (3)' instead of Condition (3).

$$1.2 \leq F_{G5}/F_{G4Ln} \leq 4.5 \quad (3)'$$

It is even more preferable to satisfy the following Condition (3)" instead of Conditions (3) and (3)'.

$$1.2 \leq F_{G5}/F_{G4Ln} \leq 4.0 \quad (3)''$$

For the zoom lens, it is desirable that the fourth lens group is made up of at least two lens components.

It is here to be noted that the "lens component" refers to a lens with no air separation included between the surface on its most object side and the surface on its Most image side. For instance, a single lens, a cemented lens, a composite lens and a refracting-power-variable lens may be counted as one lens component, respectively.

With that arrangement wherein the front principal point position of the fourth lens group can be located more on the object side than could be achieved by use of one lens component, it is possible to obtain a small-format zoom lens. It also facilitates correction of spherical aberrations and coma.

For the zoom lens, it is preferable that there is at least one air lens in the fourth lens group that satisfies the following Condition (4):

$$-0.45 \leq (R_{G4m1}+R_{G4m2})/(R_{G4m1}-R_{G4m2}) \leq 6 \quad (4)$$

where $R_{G4m1}$ is the radius of curvature of the object-side surface of the air lens in the fourth lens group in the zoom lens, and $R_{G4m2}$ is the radius of curvature of the image-side surface of the air lens in the fourth lens group in the zoom lens.

In Condition (4), the shape of the air lens in the fourth lens group is defined in terms of a numerical formula. By the satisfaction of Condition (4), it is possible to make satisfactory correction of spherical aberrations, field curvature and chromatic aberration of magnification all over the area from the wide-angle end to the telephoto end.

Exceeding the upper limit to Condition (4) renders it hard to make sure satisfactory optical performance, because it causes spherical aberrations and field curvature to remain under and chromatic aberration of magnification to go worse all over the area from the wide-angle end to the telephoto end.

Being short of the lower limit to Condition (4) renders it hard to make sure satisfactory optical performance, because it causes spherical aberrations and field curvature to remain under and chromatic aberration of magnification to go worse all over the area from the wide-angle end to the telephoto end.

It is more preferable to satisfy the following Condition (4)' instead of Condition (4).

$$-0.3 \leq (R_{G4m1}+R_{G4m2})/(R_{G4m2}-R_{G4m1}) \leq 3 \quad (4)'$$

It is even more preferable to satisfy the following Condition (4)″ instead of Conditions (4) and (4)′.

$$-0.28 \leq (R_{G4m1}+R_{G4m2})/(R_{G4m2}-R_{G4m1}) \leq 2 \quad (4)''$$

For the zoom lens, it is desirable that the lens surface in and on the most object side of the fifth lens group is concave on its object side.

With that arrangement, it is possible to make satisfactory correction of field curvature, astigmatism and chromatic aberration of magnification from the wide-angle end to the telephoto end.

For the zoom lens, it is preferable that the fifth lens group satisfies the following Condition (5):

$$-0.2 \leq (R_{G5S}+R_{G5L})/(R_{G5L}-R_{G5S}) \leq 8 \quad (5)$$

where $R_{G5S}$ is the radius of curvature of the surface in and on the most object side of the fifth lens group in the zoom lens, and $R_{G5L}$, is the radius of curvature of the surface in and on the most image side of the fifth lens group in the zoom lens.

In Condition (5), the shape of the fifth lens group is defined in terms of a numerical formula. By the satisfaction of Condition (5), it is possible to hold back field curvature, astigmatism and chromatic aberration of magnification well all over the area from the wide-angle end to the telephoto end.

Exceeding the upper limit to Condition (5) causes astigmatism and higher-order chromatic aberration of magnification to go worse all over the area from the wide-angle end to the telephoto end, rendering it hard to make sure satisfactory optical performance.

Being short of the lower limit to Condition (5) causes field curvature to remain under and higher-order chromatic aberration of magnification to go worse all over the area from the wide-angle end to the telephoto end, rendering it hard to make sure satisfactory optical performance.

It is more preferable to satisfy the following Condition (5)′ instead of Condition (5).

$$-0.2 \leq (R_{G5S}+R_{G5L})/(R_{G5L}-R_{G5S}) \leq 5 \quad (5)'$$

It is even more preferable to satisfy the following Condition (5)″ instead of Conditions (5) and (5)′

$$-0.18 \leq (R_{G5S}+R_{G5L})/(R_{G5L}-R_{G5S}) \leq 3.5 \quad (5)''$$

For the zoom lens, it is desirable that the first lens group comprises a front subgroup having negative refracting power and a rear subgroup having positive refracting power.

With that arrangement, the height of each light ray through the first lens group is kept low enough to make small the reflective optical element for bending the optical path. At the same time, it is possible to satisfactorily hold back especially longitudinal chromatic aberrations at the telephoto end and chromatic aberration of magnification at the wide-angle end, thereby to achieve satisfactory optical performance.

Alternatively, the front subgroup having negative refracting power and the rear subgroup having positive refracting power may be set up by letting the reflective optical element in the first lens group have refracting power.

For the zoom lens, it is desirable that the second lens group includes at two negative lenses located back-to-back and side-by-side.

That arrangement enables the front-principal point of the second lens group to be positioned more on the object side so that efficient zooming can be implemented by the zooming or second lens group. It is thus possible to make the zoom lens smaller. At the same time, the height of each ray through the first and the second lens group is kept low enough to make small the reflective optical element for bending the optical path.

For the zoom lens, it is desirable that the sixth lens group remains fixed during zooming.

That arrangement enables the lens groups that move during zooming to be reduced in number, resulting in the capability of simplifying the construction of the lens barrel. This in turn enables the whole imaging apparatus to be smaller.

According to the embodiments as described above, it is possible to provide a bending optical system or small-format zoom lens including a reflective optical element, which is well corrected for aberrations as well as an electronic imaging apparatus that incorporates the same.

It is here to be noted that only the upper or lower limit value of each condition may be replaced by a new upper or lower limit value.

While specific examples of the inventive zoom lens and electronic imaging apparatus are now explained at great length with reference to the accompanying drawings, it is to be understood that the invention is never limited to them.

The imaging optical system or zoom lens according to Example 1 is now explained. FIG. 1 is a sectional view, as taken along the optical axis, of the optical construction of the zoom lens according to Example 1 (a) at the wide-angle end, (b) in the intermediate focal length setting, and (c) at the telephoto end, respectively.

As shown in FIG. 1, the imaging optical system or zoom lens according to Example 1 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power. Commonly to all the examples, P, CG and I in the lens sectional views are indicative of a prism, a cover glass and the image plane of an electronic imaging device, respectively.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 cooperate together to form a rear subgroup G1b having positive refracting power.

The second lens group G2 is made up of, in order from the object side, a double-concave negative lens L21 and a cemented lens SU21 of a double-concave negative lens L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a double-convex positive lens L42 and a double-concave negative lens L43, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the image side with a narrowing of the separation between it and the sixth lens group G6 from the wide-angle end to the intermediate setting, and moves toward the object side with a widening of the separation between it and the sixth lens group G6 from the intermediate setting to the telephoto end.

Six aspheric surfaces are applied: one to the image-side surface r2 of the negative meniscus lens L11 in the first lens group G1, one to the image-side surface r10 of the double-concave negative lens L21 in the second lens group G2, one to the object-side surface r15 of the positive meniscus lens L31 in the third lens group G3, one to the object-side surface r17 of the double-convex positive lens L41 in the fourth lens group G4, one to the image-side surface r21 of the double-concave negative lens L43 forming a part of the cemented lens SU41 in the fourth lens group G4, and one to the image-side surface r25 of the double-convex positive lens L61 forming the sixth lens group G6.

The imaging optical system or zoom lens according to Example 2 is now explained. FIG. 2 is a sectional view, as taken along the optical axis, of the optical construction of the zoom lens according to Example 2 (a) at the wide-angle end, (b) in the intermediate focal length setting, and (c) at the telephoto end, respectively.

As shown in FIG. 2, the imaging optical system or zoom lens according to Example 2 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and Prism P here cooperate together to form a front subgroup G1$f$ having negative refracting power, and the double-convex positive lenses L12 and L13 here cooperate together to form a rear subgroup G1$b$ having positive refracting power.

The second lens group G2 is made up of, in order from the object side, a double-concave negative lens L21 and a cemented lens SU21 of a double-concave negative lens L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex-positive lens L41 and a negative meniscus lens L42 convex on its object side, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the image side with a narrowing of the separation between it and the sixth lens group G6 from the wide-angle end to the intermediate setting, and moves toward the object side with a widening of the separation between it and the sixth lens group G6 from the intermediate setting to the telephoto end.

Five aspheric surfaces are applied: one to the image-side surface r2 of the negative meniscus lens L11 in the first lens group G1, one to the image-side surface r10 of the double-concave negative lens L21 in the second lens group G2, one to the object-side surface r15 of the positive meniscus lens L31 in the third lens group G3, one to the object-side surface r17 of the double-convex positive lens L41 in the fourth lens group G4, and one to the image-side surface r20 of the negative meniscus lens L42 in the fourth lens group G4.

Figure 3:
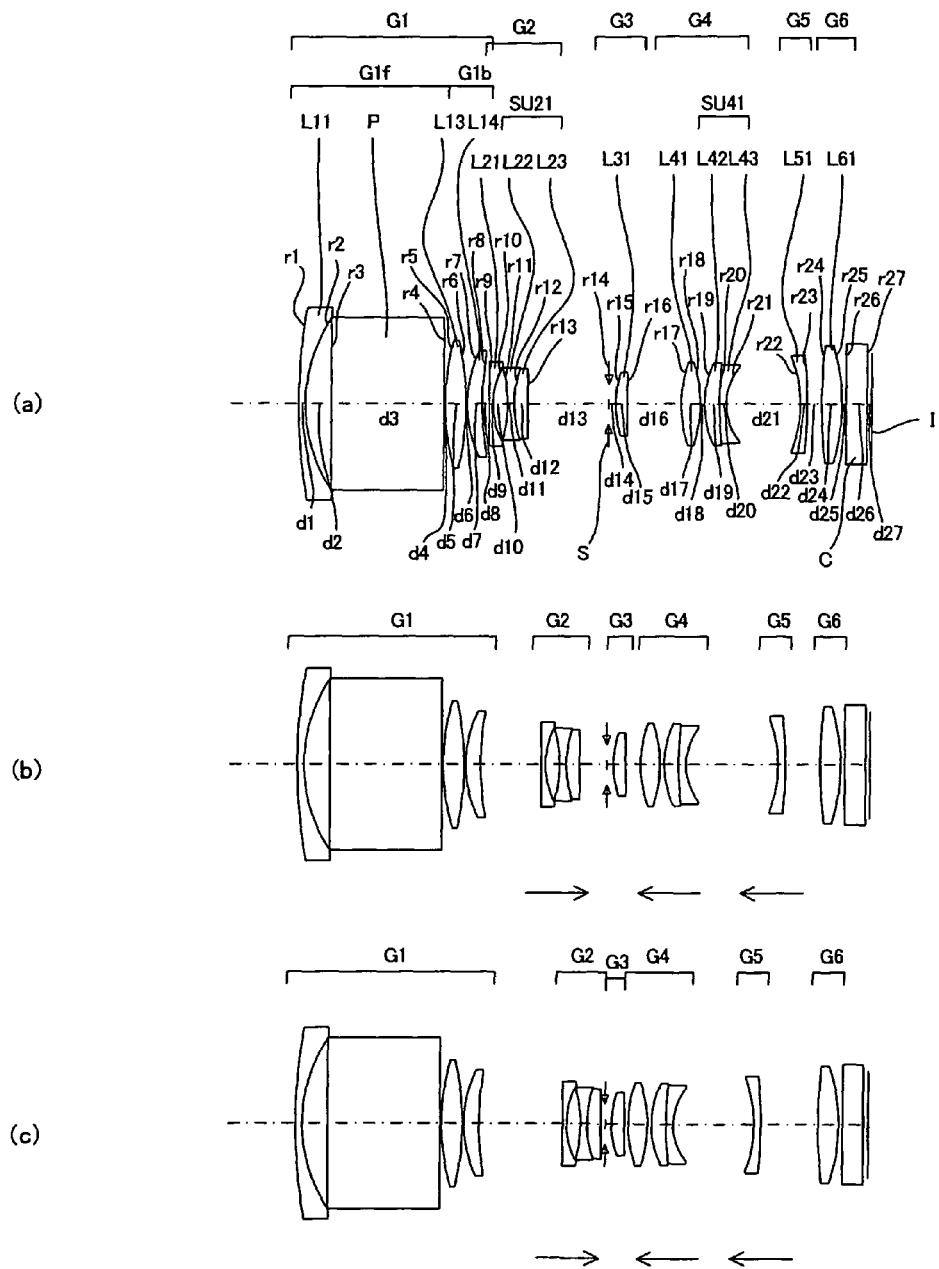
FIG. 3 is a sectional view, as taken along the optical axis, of the optical arrangements of the zoom lens according to Example 3 upon focusing on an infinite object (a) at the wide-angle end, (b) in an intermediate setting, and (c) at the telephoto end.

The imaging optical system or zoom lens according to Example 3 is now explained. FIG. 3 is a sectional view, as taken along the optical axis, of the optical construction of the zoom lens according to Example 3 (a) at the wide-angle end, (b) in the intermediate focal length setting, and (c) at the telephoto end, respectively.

As shown in FIG. 3, the imaging optical system or zoom lens according to Example 3 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a positive meniscus lens L13 convex on its object side, and has positive refracting power throughout. The negative meniscus lens L11 and prism P here cooperate together to form a front subgroup G1$f$ having negative refracting power, and the double-convex positive lens L12 and positive meniscus lens L13 here cooperate together to form a rear subgroup G1$b$ having positive refracting power.

The second lens group G2 is made up of, in order from the object side, a double-concave negative lens L21 and a cemented lens SU21 of a double-concave negative lens. L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a positive meniscus lens L42 convex on its object side and a negative meniscus lens L43 convex on its object side, and has positive refracting power throughout.

The fifth lens group G5 is made up of a negative meniscus lens L51 convex on its image side, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Three aspheric surfaces are applied: one to the object-side surface r15 of the positive meniscus lens L31 in the third lens group G3, and two to both surfaces r17 and r18 of the double-convex positive lens L41 in the fourth lens group G4.

Figure 4:
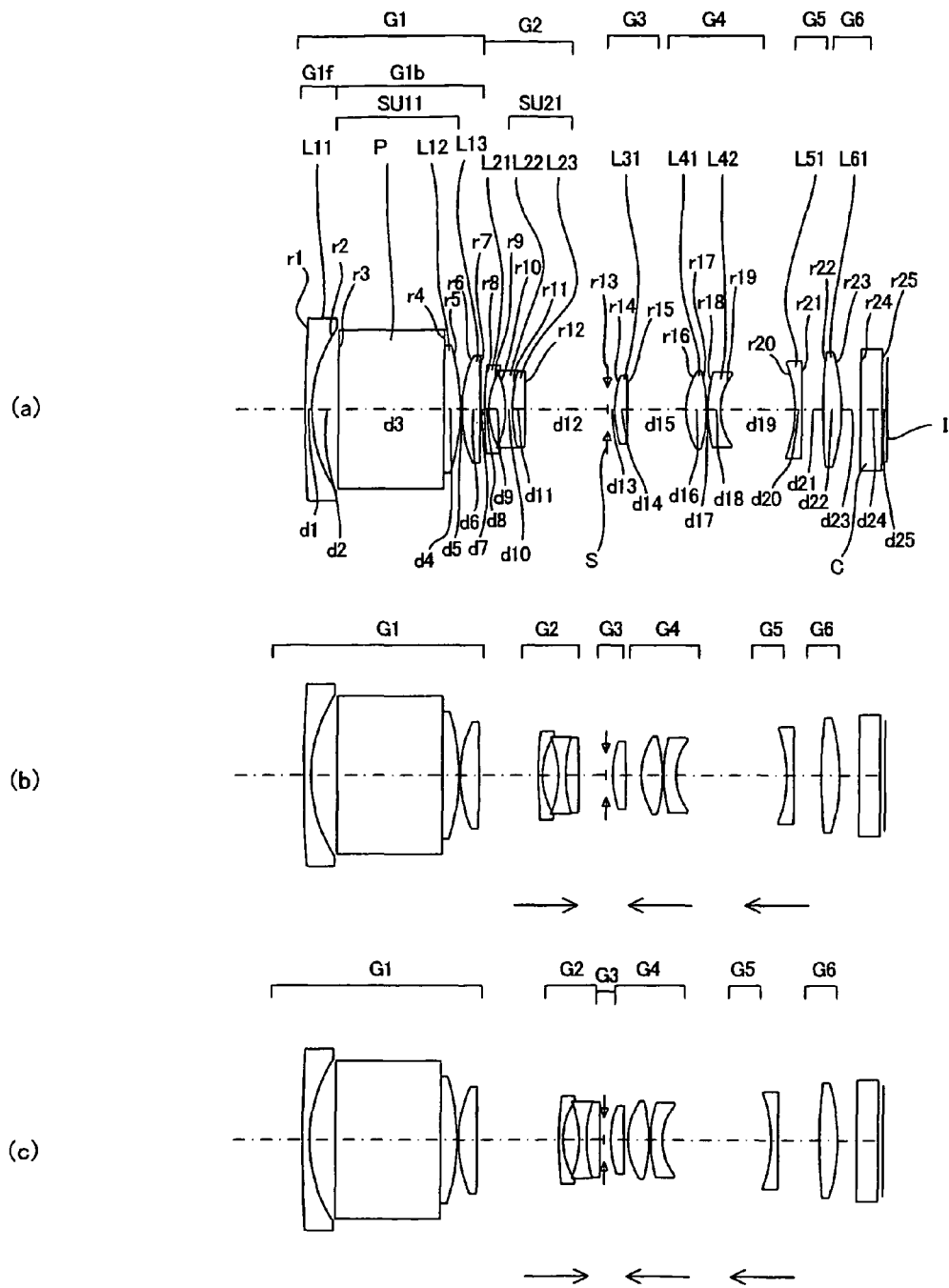
FIG. 4 is a sectional view, as taken along the optical axis, of the optical arrangements of the zoom lens according to Example 4 upon focusing on an infinite object (a) at the wide-angle end, (b) in an intermediate setting, and (c) at the telephoto end.

The imaging optical system or zoom lens according to Example 4 is now explained. FIG. 4 is a sectional view, as taken along the optical axis, of the optical construction of the zoom lens according to Example 4 (a) at the wide-angle end, (b) in the intermediate focal length setting, and (c) at the telephoto end, respectively.

As shown in FIG. 4, the imaging optical system or zoom lens according to Example 4 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, a cemented lens SU11 of the prism P that is the reflective optical element and a plano-convex positive lens L12 convex on its image side, and a double-convex positive lens L13, and has positive refracting power throughout. The negative meniscus lens L11 here forms a front subgroup G1f having negative refracting power, and the cemented lens SU 11 of the prism P and the plano-convex positive lens L12 cooperates with the double-convex positive lens L13 to form a rear subgroup GLb having positive refracting power.

The second lens group G2 is made up of, in order from the object side, a negative meniscus lens L21 convex on its object side and a cemented lens SU21 of a double-concave negative lens L22 and a double-convex positive lens L23, and has negative refracting power throughout.

The third lens group G3 is made up of, in order from the object side, a stop S and a double-convex positive lens L31, and has positive refracting power throughout.

The fourth lens group G4 is made up of, in order from the object side, a double-convex positive lens L41 and a negative meniscus lens L42 convex on its object side, and has positive refracting power throughout.

The fifth lens group G5 is made up of a negative meniscus lens L51 convex on its image side, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Four aspheric surfaces are applied: one to the image-side surface r2 of the negative meniscus lens L11 in the first lens group G1, one to the object-side surface r14 of the double-convex positive lens L31 in the third lens group G3, one to the object-side surface r16 of the double-convex positive lens L41 in the fourth lens group G4, and one to the image-side surface r19 of the negative meniscus lens L42 in the fourth lens group G4.

Figure 5:
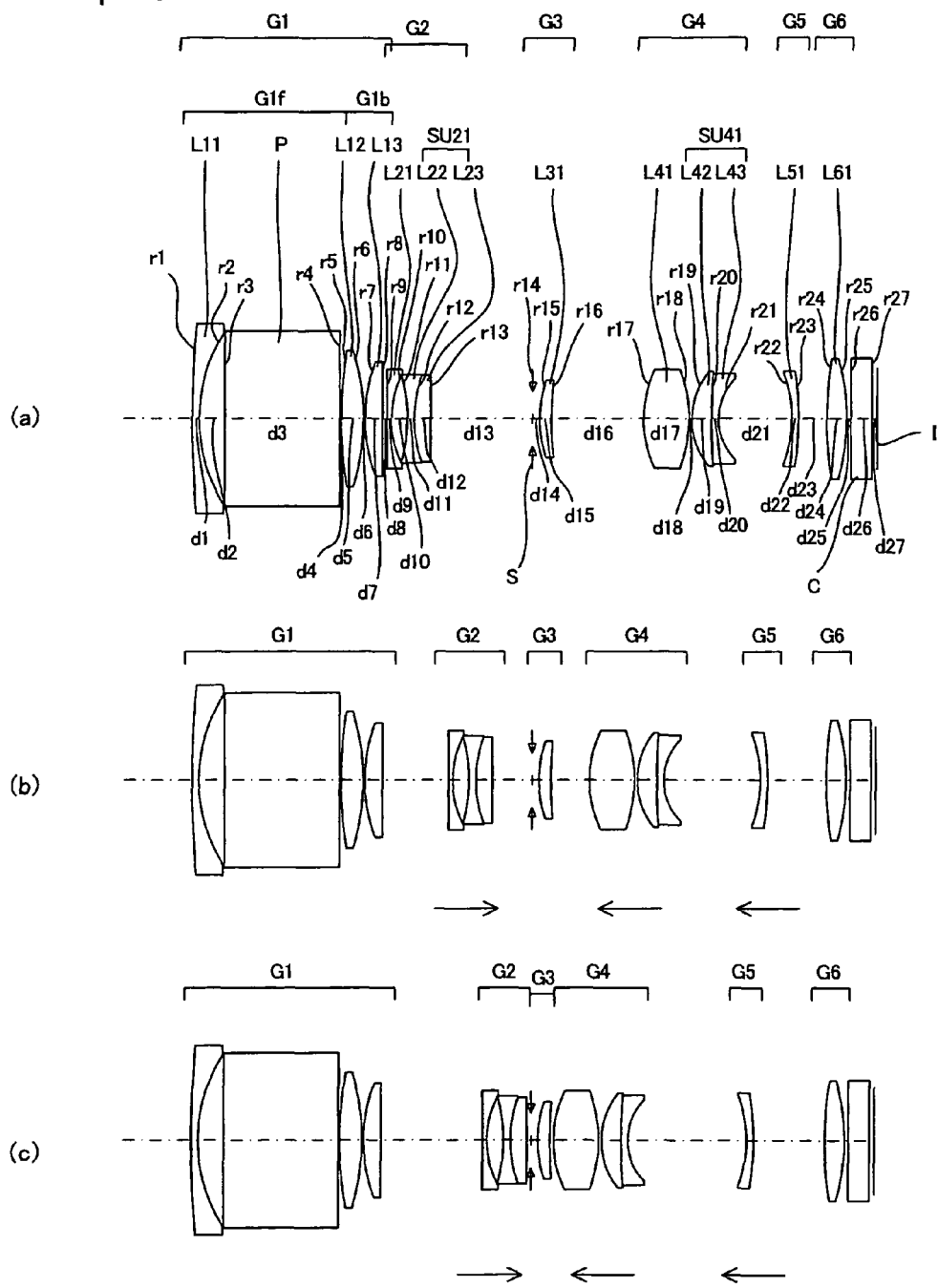
FIG. 5 is a sectional view, as taken along the optical axis, of the optical arrangements of the zoom lens according to Example 5 upon focusing on an infinite object (a) at the wide-angle end, (b) in an intermediate setting, and (c) at the telephoto end.

The imaging optical system or zoom lens according to Example 5 is now explained. FIG. 5 is a sectional view, as taken along the optical axis, of the optical construction of the zoom lens according to Example 5 (a) at the wide-angle end, (b) in the intermediate focal length setting, and (c) at the telephoto end, respectively.

As shown in FIG. 5, the imaging optical system or zoom lens according to Example 5 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a positive meniscus lens L13 convex on its object side, and has positive refracting power throughout. The negative meniscus lens L11 and prism P here cooperate together to form a front subgroup G1f having negative refracting power, and the double-convex positive lens L12 and positive meniscus lens L13 here cooperate together to form a rear subgroup G1b having positive refracting power.

The second lens group G2 is made up of, in order from the object side, a double-concave negative lens L21 and a cemented lens SU21 of a double-concave negative lens L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a positive meniscus lens L42 convex on its object side and a negative meniscus lens L43 convex on its object side, and has positive refracting power throughout.

The fifth lens group G5 is made up of a negative meniscus lens L51 convex on its image side, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Three aspheric surfaces are applied: one to the object-side surface r15 of the positive meniscus lens L31 in the third lens group G3, and two to both surfaces r17 and r18 of the double-convex positive lens L41 in the fourth lens group G4.

Figure 6:
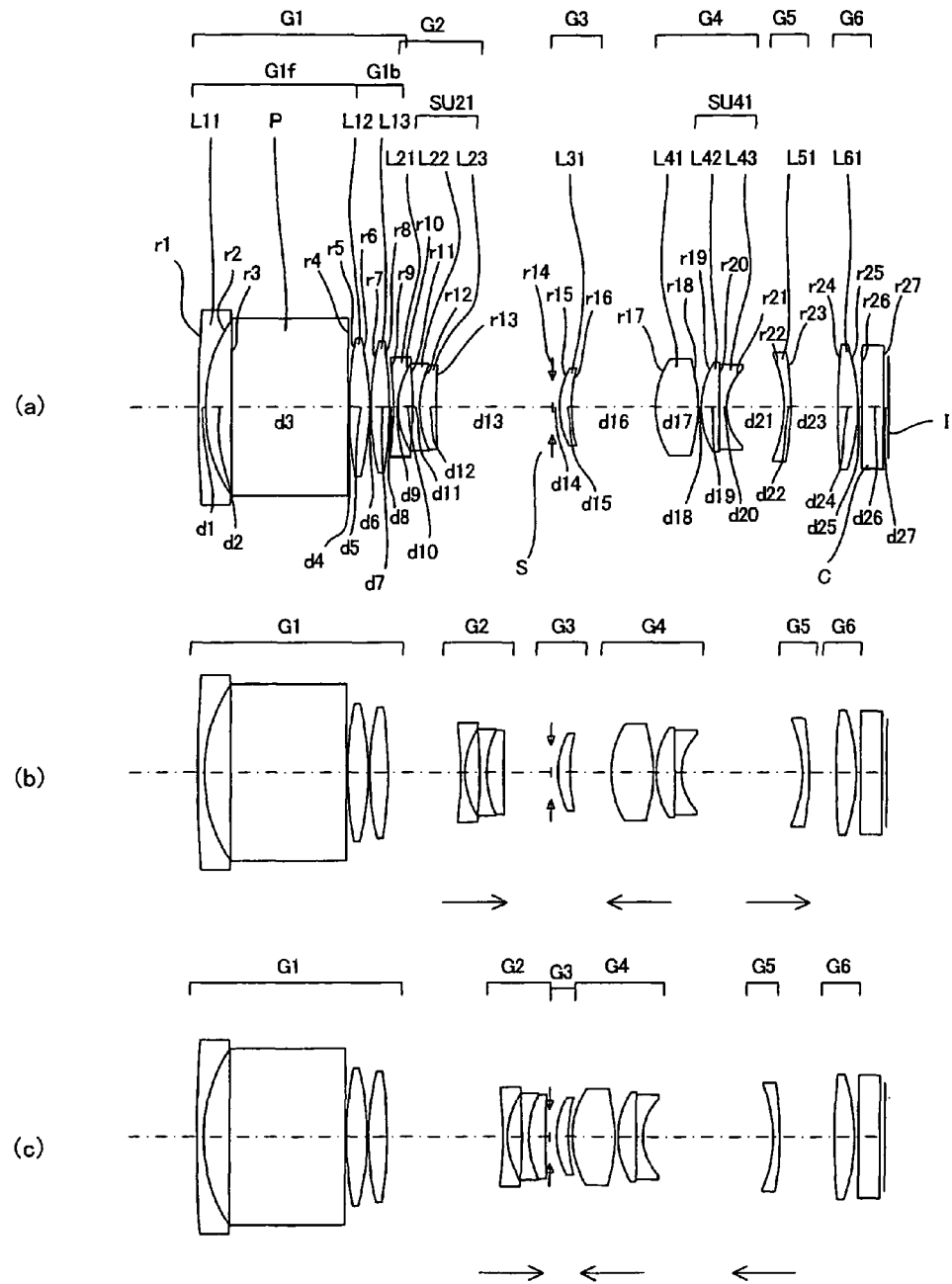
FIG. 6 is a sectional view, as taken along the optical axis, of the optical arrangements of the zoom lens according to Example 6 upon focusing on an infinite object (a) at the wide-angle end, (b) in an intermediate setting, and (c) at the telephoto end.

The imaging optical system or zoom lens according to Example 6 is now explained. FIG. 6 is a sectional view, as taken along the optical axis, of the optical construction of the zoom lens according to Example 6 (a) at the wide-angle end, (b) in the intermediate focal length setting, and (c) at the telephoto end, respectively.

As shown in FIG. 6, the imaging optical system or zoom lens according to Example 6 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1*f* having negative refracting power, and the double-convex positive lenses L12 and L13 here cooperate together to form a rear subgroup G1*b* having positive refracting power.

The second lens group G2 is made up of, in order from the object side, a double-concave negative lens L21 and a cemented lens SU21 of a double-concave negative lens L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a positive meniscus lens L42 convex on its object side and a negative meniscus lens L43 convex on its object side, and has positive refracting power throughout.

The fifth lens group G5 is made up of a negative meniscus lens L51 convex on its image side, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the image side with a narrowing of the separation between it and the sixth lens group G6 from the wide-angle end to the intermediate setting, and moves toward the object side with a widening of the separation between it and the sixth lens group G6 from the intermediate setting to the telephoto end.

Five aspheric surfaces are applied: one to the image-side surface r2 of the negative meniscus lens L11 in the first lens group G1, one to the image-side surface r10 of the double-concave negative lens L21 in the second lens group G2, one to the object-side surface r15 of the positive meniscus lens L31 in the third lens group G3, and two to both surfaces r17 and r18 of the double-convex positive lens L41 in the fourth lens group G4.

Figure 7:
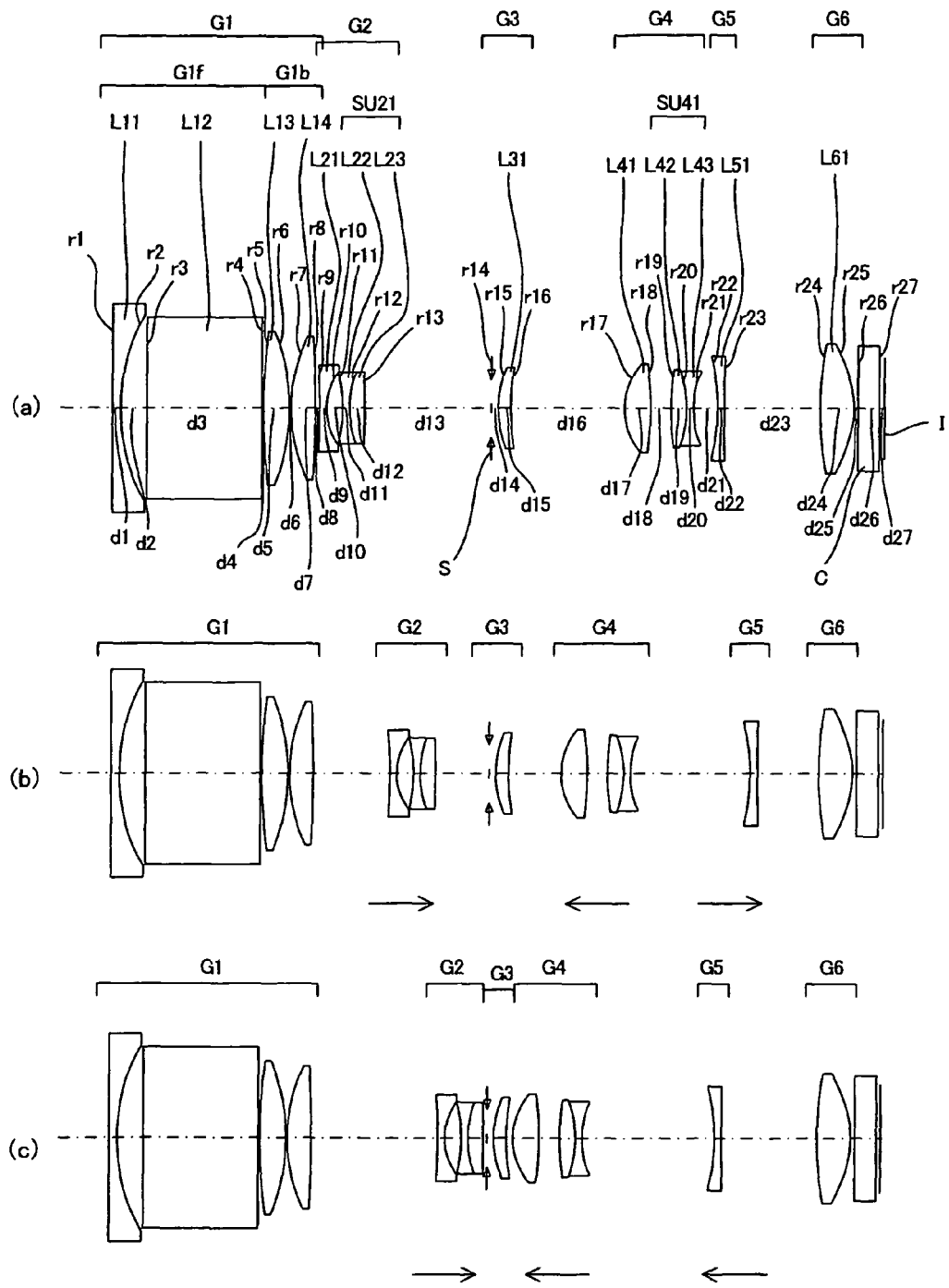
FIG. 7 is a sectional view, as taken along the optical axis, of the optical arrangements of the zoom lens according to Example 7 upon focusing on an infinite object (a) at the wide-angle end, (b) in an intermediate setting, and (c) at the telephoto end.

The imaging optical system or zoom lens according to Example 7 is now explained. FIG. 7 is a sectional view, as taken along the optical axis, of the optical construction of the zoom lens according to Example 7 (a) at the wide-angle end, (b) in the intermediate focal length setting, and (c) at the telephoto end, respectively.

As shown in FIG. 7, the imaging optical system or zoom lens according to Example 7 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a plano-concave negative lens L11 concave on its image side, the prism P that is the reflective optical element, a double-convex positive lens L12 and a double-convex positive lens L13, and has positive refracting power throughout. The plano-concave lens L11 and prism P here cooperate together to form a front subgroup G1*f* having negative refracting power, and the double-convex positive lenses L12 and L13 here cooperate together to form a rear subgroup G1*b* having positive refracting power.

The second lens group G2 is made up of, in order from the object side, a double-concave negative lens L21 and a cemented lens SU21 of a double-concave negative lens L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a double-convex positive lens L42 and a double-concave negative lens L43, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the image side with a narrowing of the separation between it and the sixth lens group G6 from the wide-angle end to the intermediate setting, and moves toward the object side with a widening of the separation between it and the sixth lens group G6 from the intermediate setting to the telephoto end.

Seven aspheric surfaces are applied: one to the image-side surface r2 of the plano-concave negative lens L11 in the first lens group G1, one to the image-side surface r10 of the double-concave negative lens L21 in the second lens group G2, one to the object-side surface r15 of the positive meniscus lens L31 in the third lens group G3, two to both surfaces r17 and r18 of the double-convex positive lens L41 in the fourth lens group G4, one to the image-side surface r21 in the double-concave negative lens L43 forming a part of the cemented lens SU41 in the fourth lens group G4, and one to the image-side surface r25 of the double-convex positive lens L61 forming the sixth lens group G6.

Figure 8:
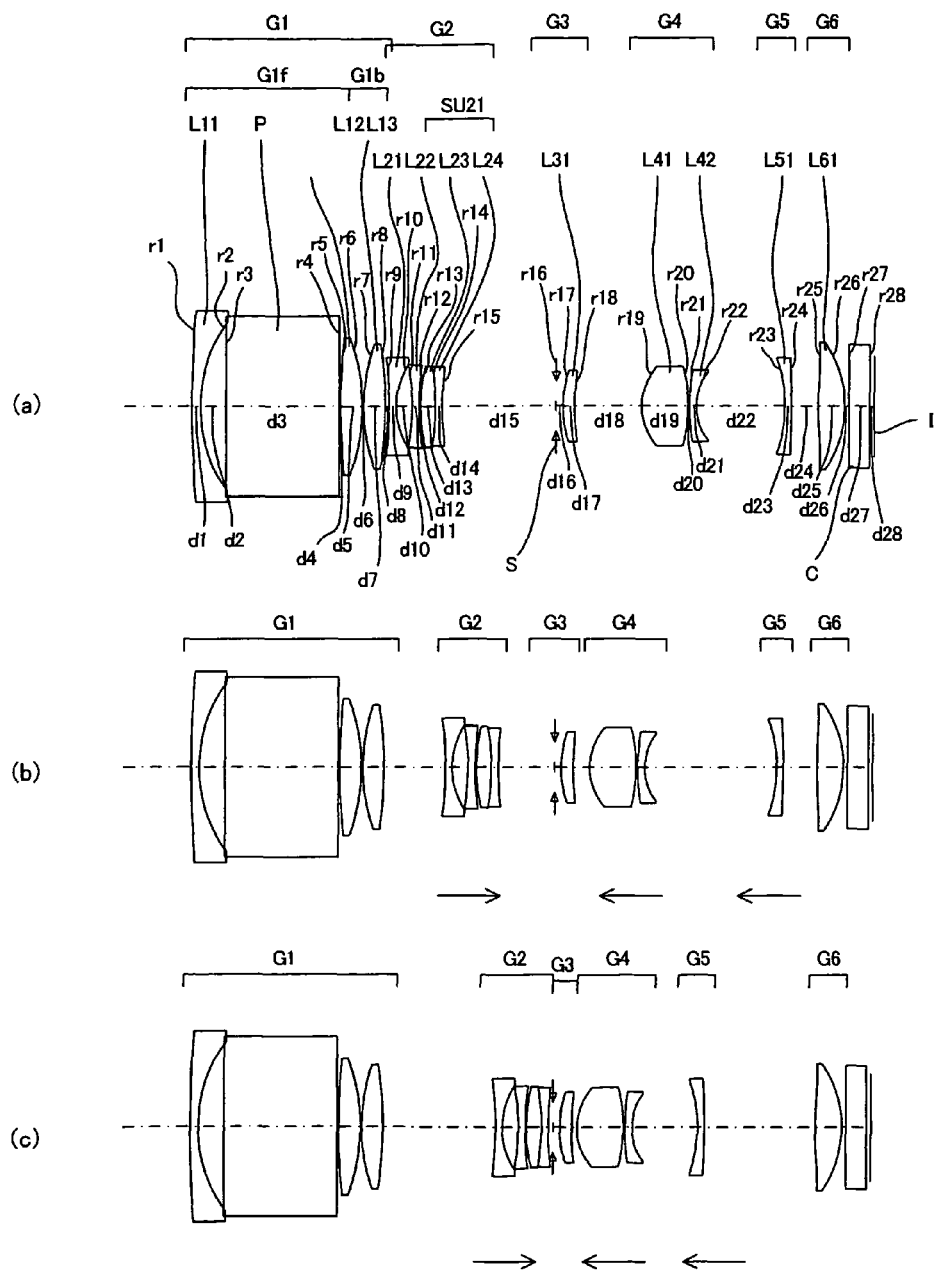
FIG. 8 is a sectional view, as taken along the optical axis, of the optical arrangements of the zoom lens according to Example 8 upon focusing on an infinite object (a) at the wide-angle end, (b) in an intermediate setting, and (c) at the telephoto end.

The imaging optical system or zoom lens according to Example 8 is now explained. FIG. 8 is a sectional view, as taken along the optical axis, of the optical construction of the zoom lens according to Example 8 (a) at the wide-angle end, (b) in the intermediate focal length setting, and (c) at the telephoto end, respectively.

As shown in FIG. 8, the imaging optical system or zoom lens according to Example 8 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 here cooperate together to form a rear subgroup G1b having positive refracting power.

The second lens group G2 is made up of, in order from the object side, a double-concave negative lens L21 and a cemented lens SU21 of a double-concave negative lens L22, a double-convex positive lens L23 and a double-concave negative lens L24, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a negative meniscus lens L42 convex on its object side, and has positive refracting power throughout.

The fifth lens group G5 is made up of a negative meniscus lens L51 convex on its object side, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Six aspheric surfaces are applied: one to the image-side surface r2 of the negative meniscus lens L11 in the first lens group G1, the image-side surface r10 of the double-concave negative lens L21 in and on the most object side of the second lens group G2, one to the object-side surface r17 of the positive meniscus lens L31 in the third lens group G3, one to the object-side surface r19 of the double-convex positive lens L41 in the fourth lens group G4, one to the image-side surface r22 of the negative meniscus lens L42 in the fourth lens group G4, and one to the object-side surface r25 of the double-convex positive lens L61 forming the sixth lens group G6.

Figure 9:
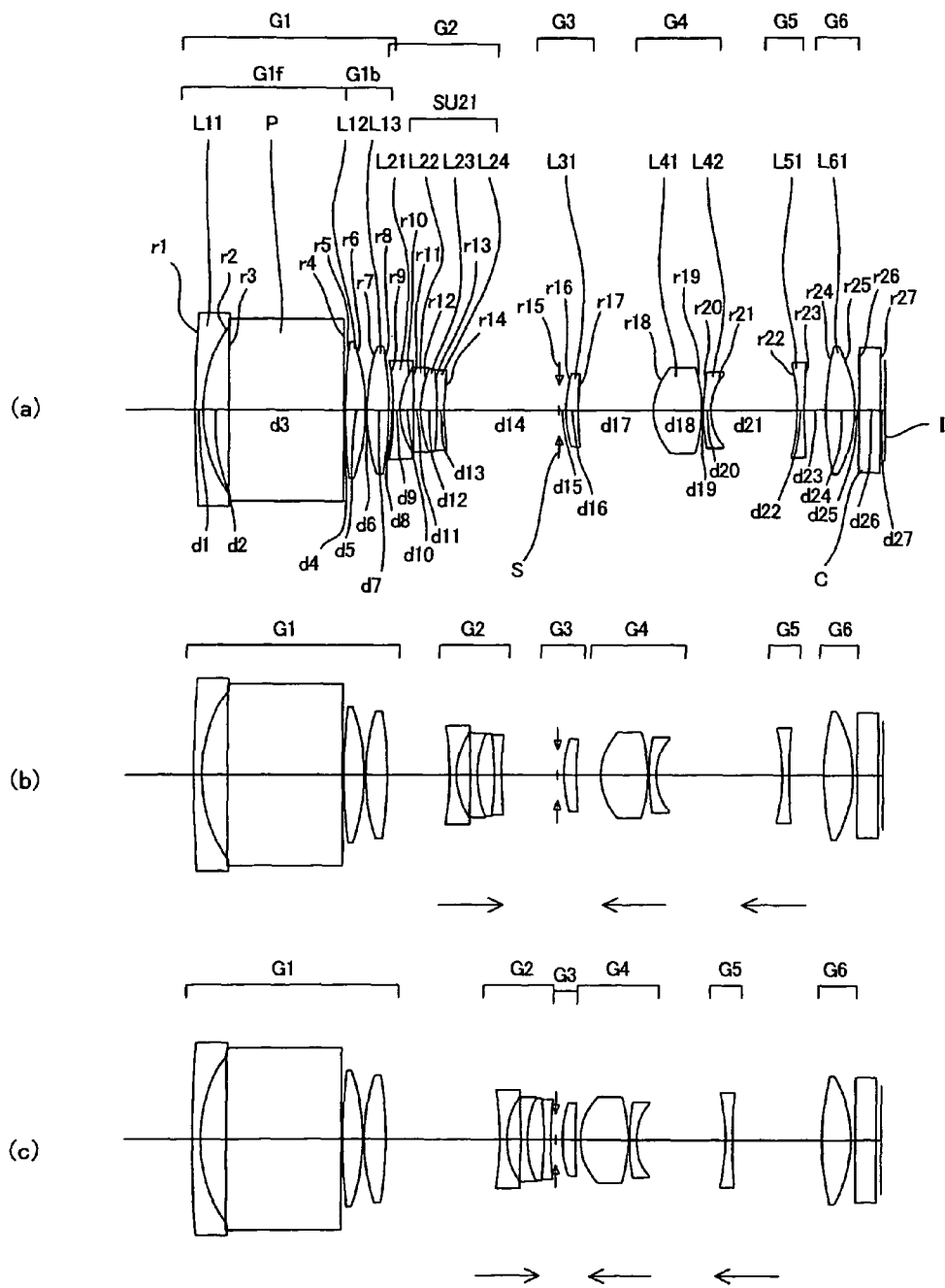
FIG. 9 is a sectional view, as taken along the optical axis, of the optical arrangements of the zoom lens according to Example 9 upon focusing on an infinite object (a) at the wide-angle end, (b) in an intermediate setting, and (c) at the telephoto end.

The imaging optical system or zoom lens according to Example 9 is now explained. FIG. 9 is a sectional view, as taken along the optical axis, of the optical construction of the zoom lens according to Example 9 (a) at the wide-angle end, (b) in the intermediate focal length setting, and (c) at the telephoto end, respectively.

As shown in FIG. 9, the imaging optical system or zoom lens according to Example 9 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 here cooperate together to form a rear subgroup G1b having positive refracting power.

The second lens group G2 is made up of, in order from the object side, a double-concave negative lens L21 and a cemented lens SU21 of a double-concave negative lens L22, a double-convex positive lens L23 and a double-concave negative lens L24, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a negative meniscus lens L42 convex on its object side, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Seven aspheric surfaces are applied: one to the image-side surface r2 of the negative meniscus lens L11 in the first lens group G1, one to the image-side surface r10 of the double-concave negative lens L21 in and on the most object side of the second lens group G2, one to the image-side surface r14 of the image-side double-concave negative lens L24 forming a part of the cemented lens SU21 in the second lens group G2, one to the object-side surface r16 of the positive meniscus lens L31 in the third lens group G3, one to the object-side surface r18 of the double-convex positive lens L41 in the fourth lens group G4, one to the image-side surface r21 of the negative meniscus lens L42 in the fourth lens group G4, and one to the object-side surface r24 of the double-convex positive lens L61 forming the sixth lens group G6.

Figure 10:
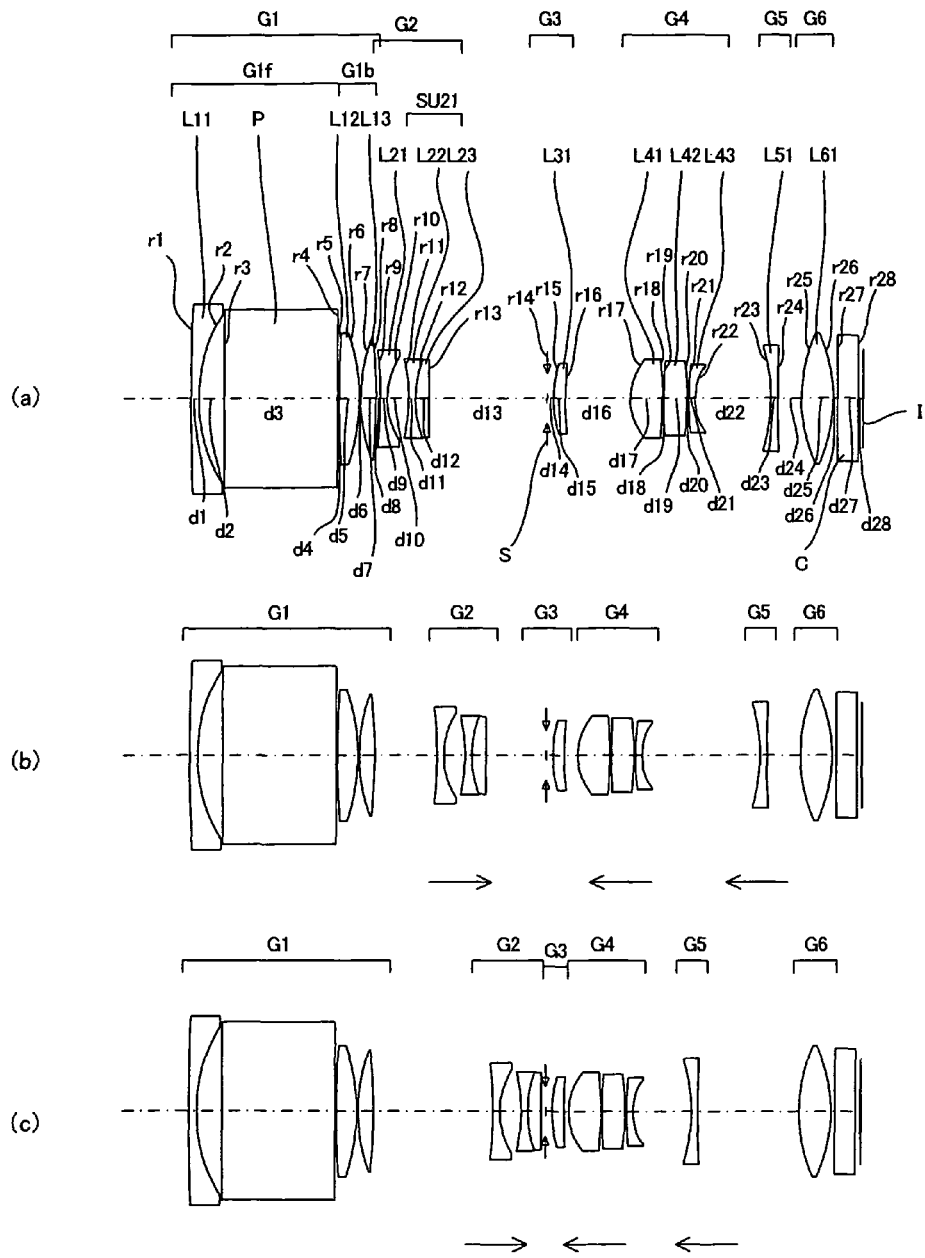
FIG. 10 is a sectional view, as taken along the optical axis, of the optical arrangements of the zoom lens according to Example 10 upon focusing on an infinite object (a) at the wide-angle end, (b) in an intermediate setting, and (c) at the telephoto end.

The imaging optical system or zoom lens according to Example 10 is now explained. FIG. 10 is a sectional view, as taken along the optical axis, of the optical construction of the zoom lens according to Example 10 (a) at the wide-angle end, (b) in the intermediate focal length setting, and (c) at the telephoto end, respectively.

As shown in FIG. 10, the imaging optical system or zoom lens according to Example 10 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 here cooperate together to form a rear subgroup G1b having positive refracting power.

The second lens group G2 is made up of, in order from the object side, a double-concave negative lens L21 and a cemented lens SU21 of a double-concave negative lens L22 and a positive meniscus lens L23 convex on its object side, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41, a double-convex positive lens L42 and a negative meniscus lens L43 convex on its object side, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Five aspheric surfaces are applied: one to the image-side surface r2 of the negative meniscus lens L11 in the first lens group G1, the image-side surface r10 of the double-concave negative lens L21 in the second lens group G2, one to the object-side surface r15 of the positive meniscus lens L31 in the third lens group G3, one to the object-side surface r17 of the object-side double-convex positive lens L41 in the fourth lens group G4, and one to the image-side surface r22 of the negative meniscus lens L43 in the fourth lens group G4.

Figure 11:
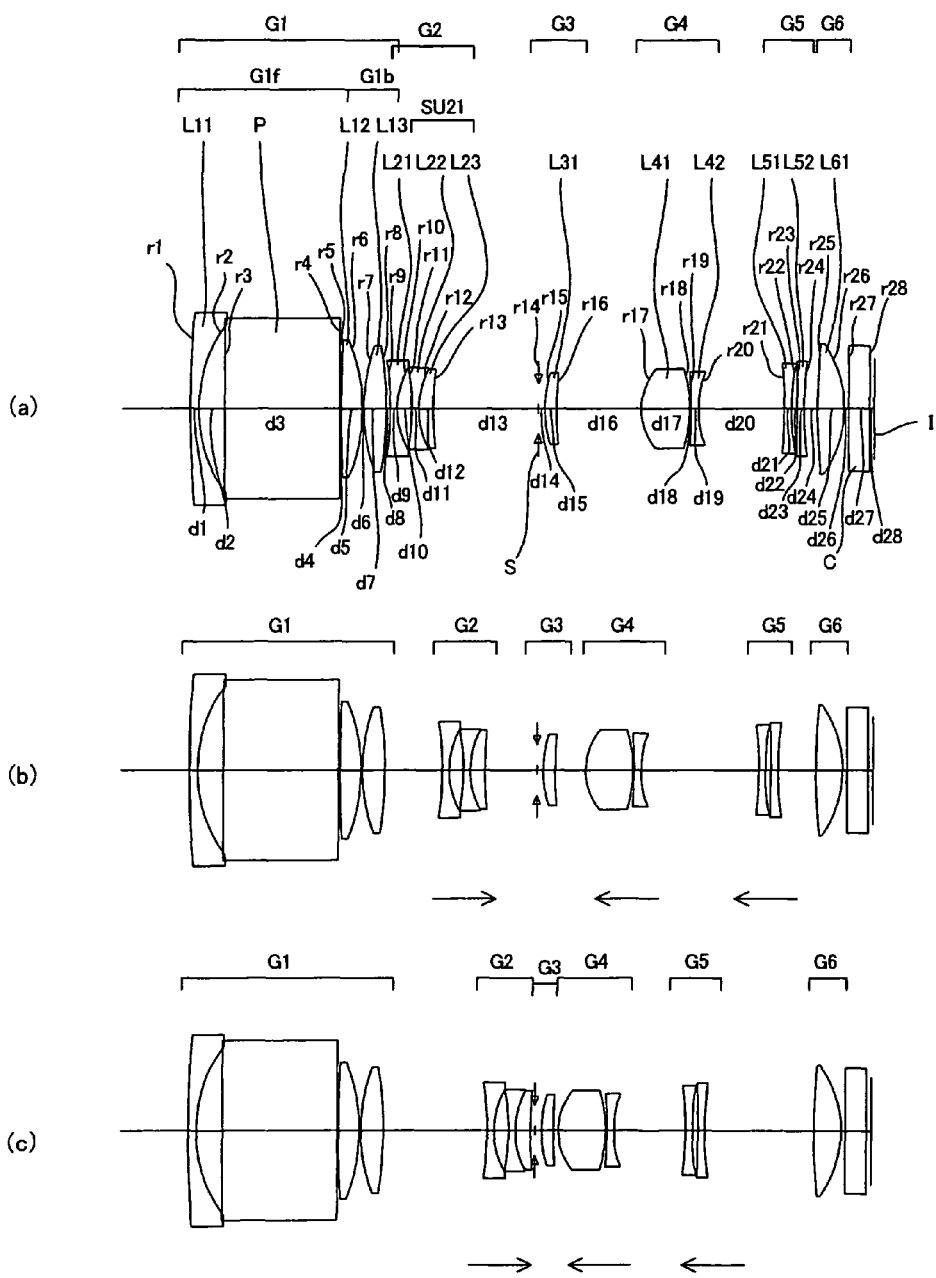
FIG. 11 is a sectional view, as taken along the optical axis, of the optical arrangements of the zoom lens according to Example 11 upon focusing on an infinite object (a) at the wide-angle end, (b) in an intermediate setting, and (c) at the telephoto end.

The imaging optical system or zoom lens according to Example 11 is now explained. FIG. 11 is a sectional view, as taken along the optical axis, of the optical construction of the zoom lens according to Example 11 (a) at the wide-angle end, (b) in the intermediate focal length setting, and (c) at the telephoto end, respectively.

As shown in FIG. 11, the imaging optical system or zoom lens according to Example 11 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 here cooperate together to form a rear subgroup G1b having positive refracting power.

The second lens group G2 is made up of, in order from the object side, a double-concave negative lens L21 and a cemented lens SU21 of a double-concave negative lens L22 and a positive meniscus lens L23 convex on its object side, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a double-concave negative lens L42, and has positive refracting power throughout.

The fifth lens group G5 is made up of a double-concave negative lens L51 and a double-concave negative lens L52, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with widening of the separation between it and the sixth lens group G6 from the wide-angle end to the telephoto end.

Seven aspheric surfaces are applied: one to the image-side surface r2 of the negative meniscus lens L11 in the first lens group G1, the image-side surface r10 of the double-concave negative lens L21 in the second lens group 2, one to the object-side surface r15 of the positive meniscus lens L31 in the third lens group G3, one to the object-side surface r17 of the double-convex positive lens L41 in the fourth lens group 4, one to the image-side surface r20 of the double-concave negative lens L42 in the fourth lens group G4, one to the image-side surface r22 of the object-side double-concave negative lens L51 in the fifth lens group G5, and one to the image-side surface r23 of the image-side double concave negative lens L52 in the fifth lens group G5.

Figure 12:
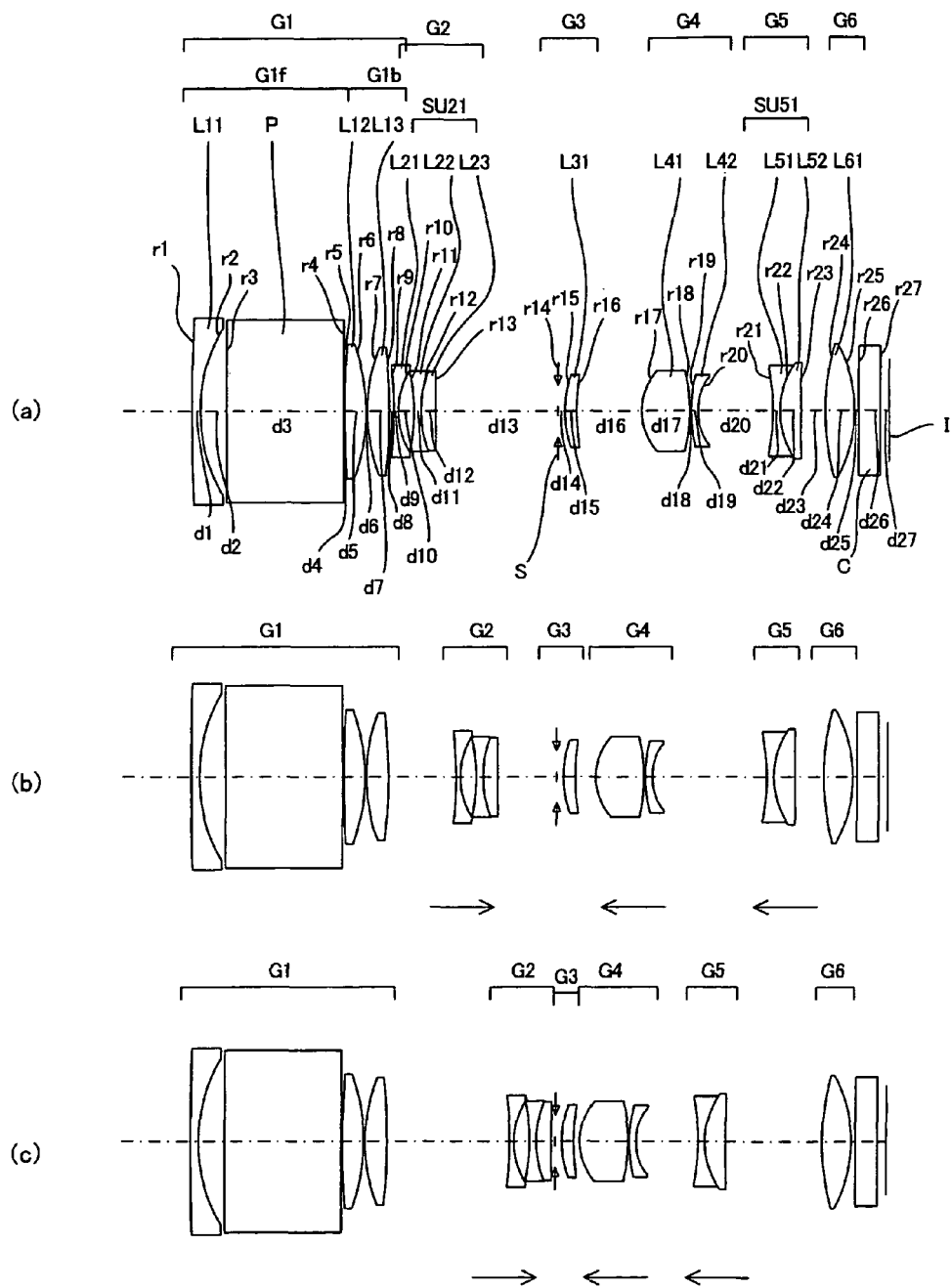
FIG. 12 is a sectional view, as taken along the optical axis, of the optical arrangements of the zoom lens according to Example 12 upon focusing on an infinite object (a) at the wide-angle end, (b) in an intermediate setting, and (c) at the telephoto end.

The imaging optical system or zoom lens according to Example 12 is now explained. FIG. 12 is a sectional view, as taken along the optical axis, of the optical construction of the zoom lens according to Example 12 (a) at the wide-angle end, (b) in the intermediate focal length setting, and (c) at the telephoto end, respectively.

As shown in FIG. 12, the imaging optical system or zoom lens according to Example 12 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 here cooperate together to form a rear subgroup G1b having positive refracting power.

The second lens group G2 is made up of, in order from the object side, a double-concave negative lens L21 and a cemented lens SU21 of a double-concave negative lens L22 and a plano-convex positive lens L23 convex on its object side, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a negative meniscus lens L42 convex on its object side, and has positive refracting power throughout.

The fifth lens group G5 is made up of a cemented lens SU 51 of, in order from the object side, a double-concave negative lens L51 and a positive meniscus lens L52 convex on its object side, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Five aspheric surfaces are applied: one to the image-side surface r2 of the negative meniscus lens L11 in the first lens group G1, one to the image-side surface r10 of the object-side double-concave negative lens L21 in the second lens group G2, one to the object-side surface r15 of the positive meniscus lens L31 in the third lens group G3, one to the object-side surface r17 of the double-convex positive lens L41 in the fourth lens group G4, and one to the image-side surface r20 of the negative meniscus lens L42 in the fourth lens group G4.

Figure 13:
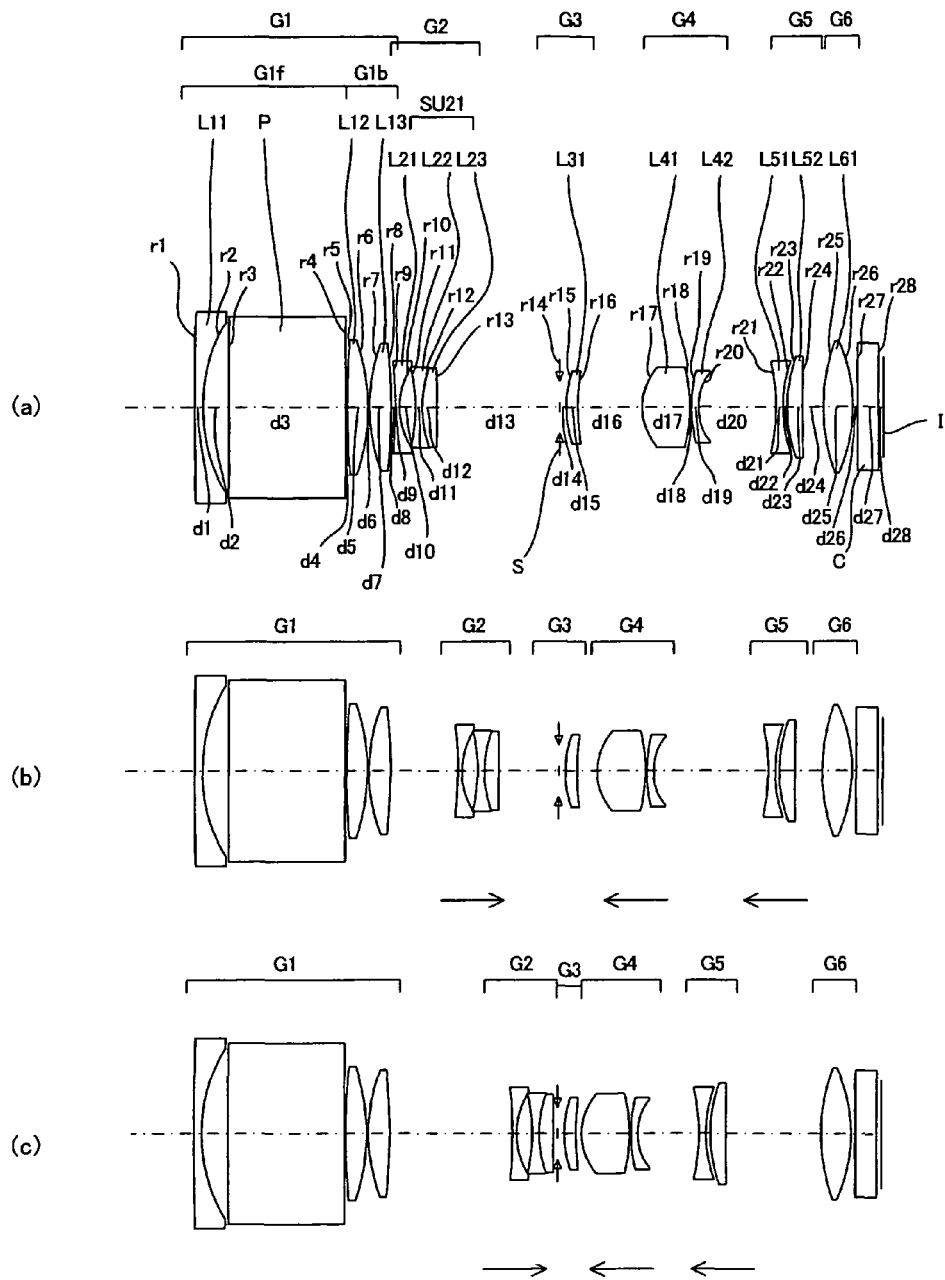
FIG. 13 is a sectional view, as taken along the optical axis, of the optical arrangements of the zoom lens according to Example 13 upon focusing on an infinite object (a) at the wide-angle end, (b) in an intermediate setting, and (c) at the telephoto end.

The imaging optical system or zoom lens according to Example 13 is now explained. FIG. 13 is a sectional view, as taken along the optical axis, of the optical construction of the zoom lens according to Example 13 (a) at the wide-angle end, (b) in the intermediate focal length setting, and (c) at the telephoto end, respectively.

As shown in FIG. 13, the imaging optical system or zoom lens according to Example 13 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 here cooperate together to form a rear subgroup G1b having positive refracting power.

The second lens group G2 is made up of, in order from the object side, a double-concave negative lens L21 and a cemented lens SU21 of a double-concave negative lens L22 and a double-convex positive lens L23, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a negative meniscus lens L42 convex on its object side, and has positive refracting power throughout.

The fifth lens group G5 is made up of a double-concave negative lens L51 and a positive meniscus lens L52 convex on its object side, and has negative refracting power.

The sixth lens group G6 is made up of a double-convex positive lens L61, and has positive refracting power.

The first G1, the third G3, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Five aspheric surfaces are used: one to the image-side surface r2 of the negative meniscus lens L11 in the first lens group G1, one to the image-side surface r10 of the object-side double-concave negative lens L21 in the second lens group G2, one to the object-side surface r15 of the positive meniscus lens L31 in the third lens group G3, one to the object-side surface r17 of the double-convex positive lens L41 in the fourth lens group G4, and one to the image-side surface r20 of the negative meniscus lens L42 in the fourth lens group G4.

Figure 14:
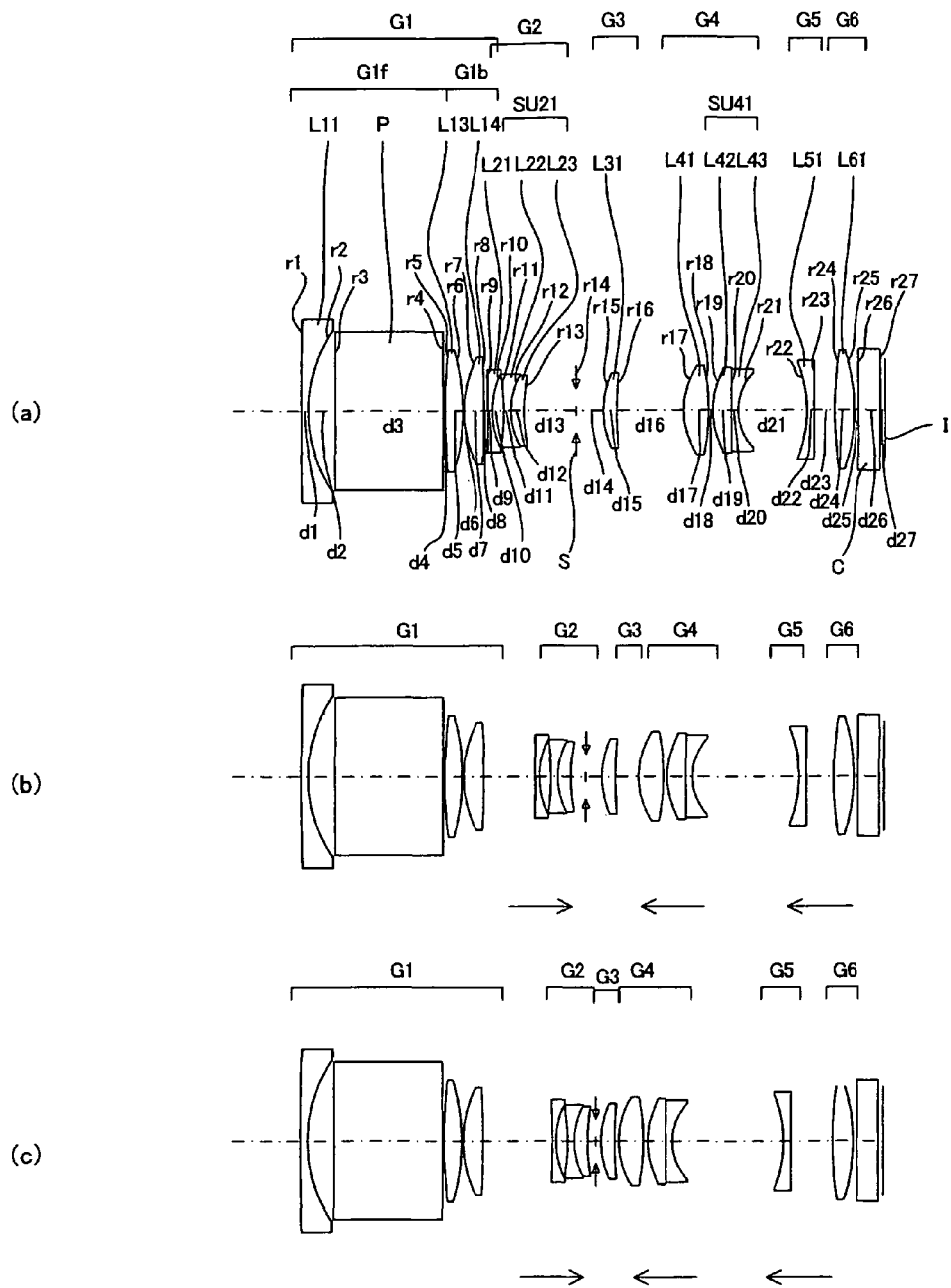
FIG. 14 is a sectional view, as taken along the optical axis, of the optical arrangements of the zoom lens according to Example 14 upon focusing on an infinite object (a) at the wide-angle end, (b) in an intermediate setting, and (c) at the telephoto end.

The imaging optical system or zoom lens according to Example 14 is now explained. FIG. 14 is a sectional view, as taken along the optical axis, of the optical construction of the zoom lens according to Example 14 (a) at the wide-angle end, (b) in the intermediate focal length setting, and (c) at the telephoto end, respectively.

As shown in FIG. 14, the imaging optical system or zoom lens according to Example 14 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 here cooperate together to form a rear subgroup G1b having positive refracting power.

The second lens group G2 is made up of, in order from the object side, a double-concave negative lens L21 and a cemented lens SU21 of a double-concave negative lens L22 and a positive meniscus lens L23 convex on its object side, and has negative refracting power throughout.

The third lens group G3 is made up of, in order from the object side, a stop S and a positive meniscus lens L31 convex on its object side, and has positive refracting power throughout.

The fourth lens group G4 is made up of, in order from the object side, a double-convex positive lens L41 and a cemented lens SU41 of a plano-convex positive lens L42 convex on its object side and a plano-concave negative lens L43 concave on its image side, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Four aspheric surfaces are applied: one to the image-side surface r2 of the negative meniscus lens L11 in the first lens group G1, one to the object-side surface r15 of the positive meniscus lens L31 in the third lens group G3, one to the image-side surface r19 of the plano-convex positive lens L41 forming a part of the cemented lens SU41 in the fourth lens group G4, and one to the image-side surface r21 of the plano-concave negative lens L42 forming a part of the cemented lens SU41 in the fourth lens group G4.

Figure 15:
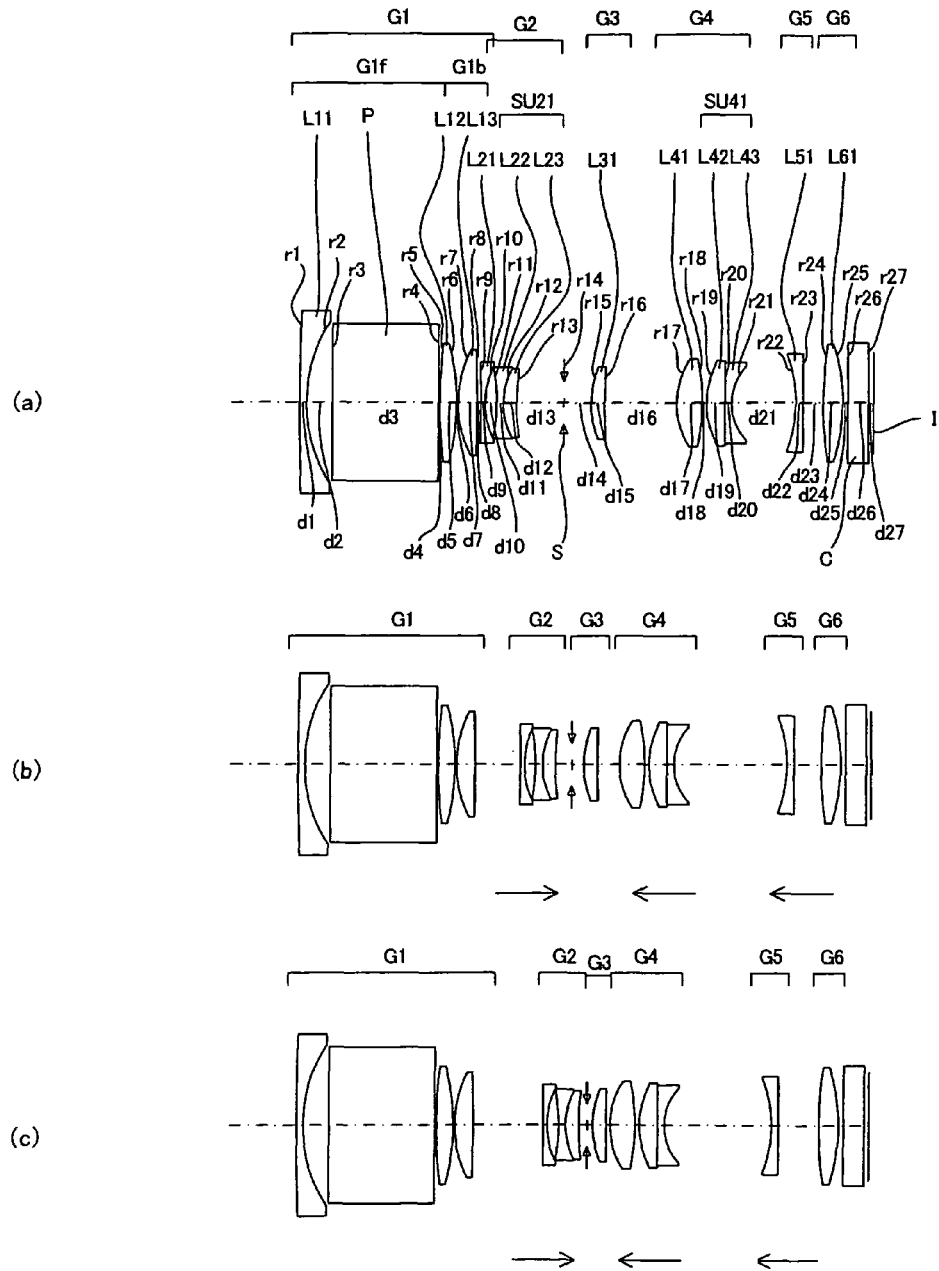
FIG. 15 is a sectional view, as taken along the optical axis, of the optical arrangements of the zoom lens according to Example 15 upon focusing on an infinite object (a) at the wide-angle end, (b) in an intermediate setting, and (c) at the telephoto end.
Figure 16:
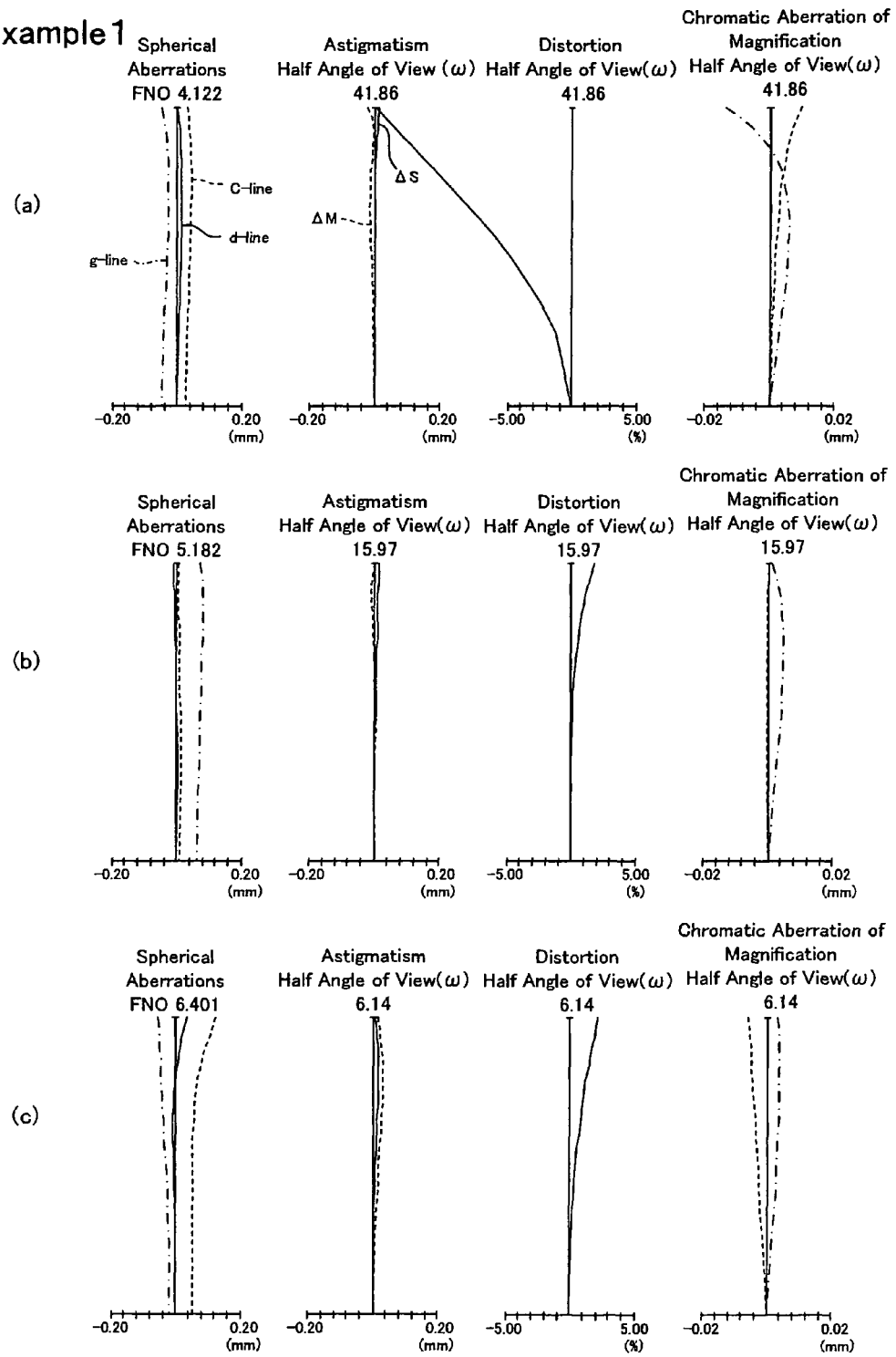
FIG. 16 is a set of aberration diagrams (a) at the wide-angle end, (b) in an intermediate setting and (c) at the telephoto end for spherical aberrations, astigmatism, distortion and chromatic aberration of magnification of the imaging optical system according to Example 1 upon focusing on an infinite object.
Figure 17:
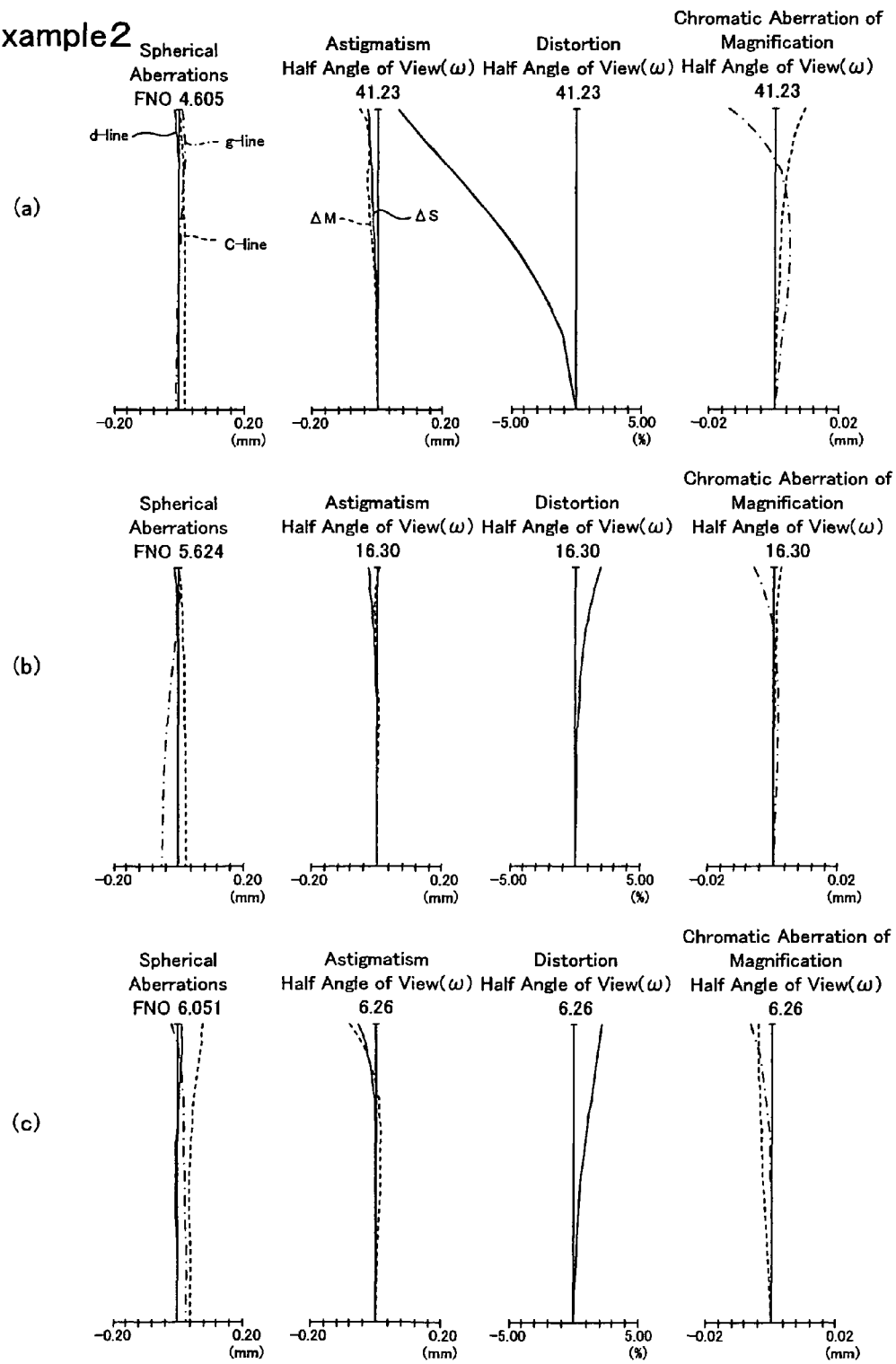
FIG. 17 is a set of aberration diagrams (a) at the wide-angle end, (b) in an intermediate setting and (c) at the telephoto end for spherical aberrations, astigmatism, distortion and chromatic aberration of magnification of the imaging optical system according to Example 2 upon focusing on an infinite object.
Figure 18:
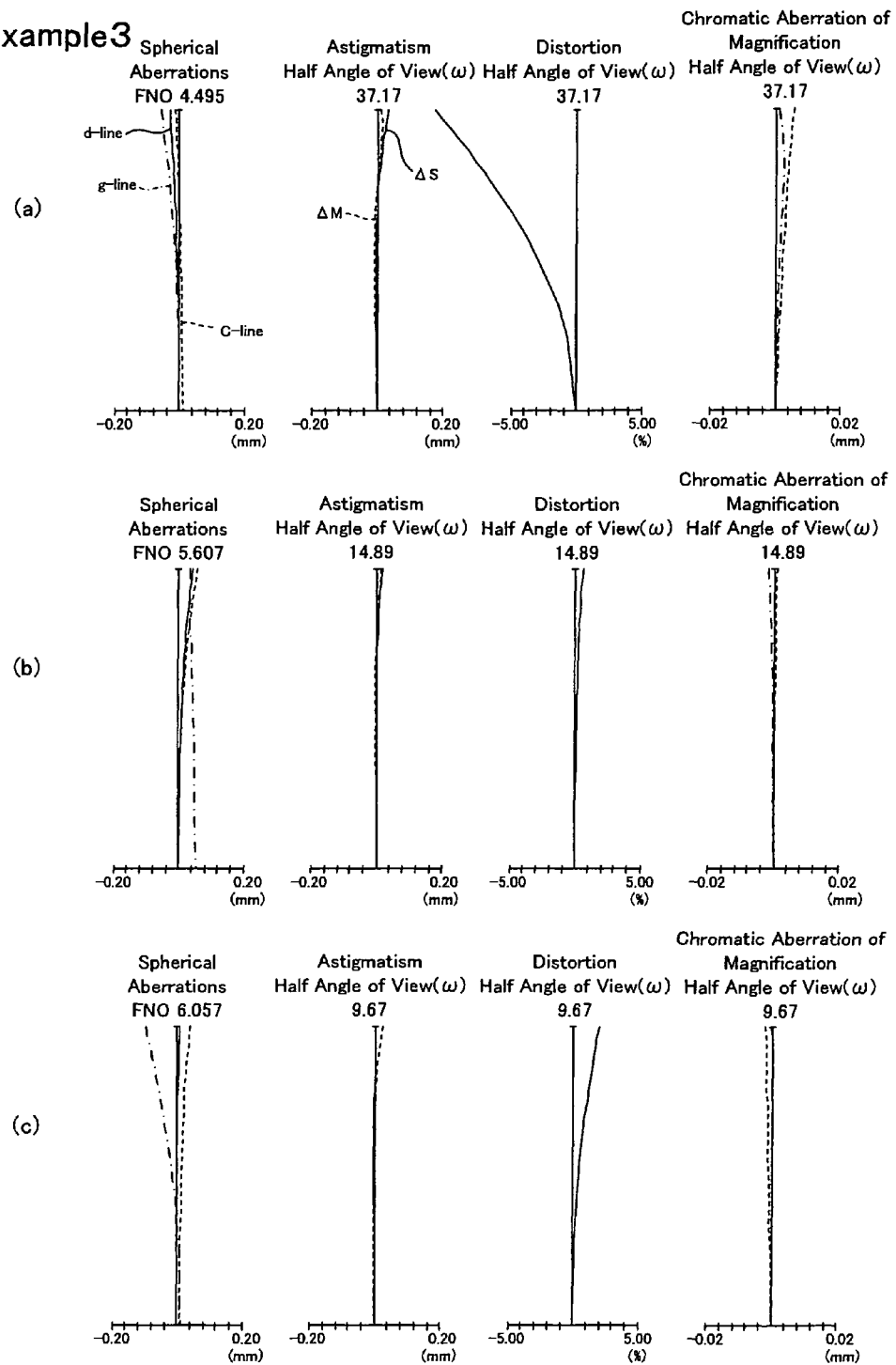
FIG. 18 is a set of aberration diagrams (a) at the wide-angle end, (b) in an intermediate setting and (c) at the telephoto end for spherical aberrations, astigmatism, distortion and chromatic aberration of magnification of the imaging optical system according to Example 3 upon focusing on an infinite object.
Figure 19:
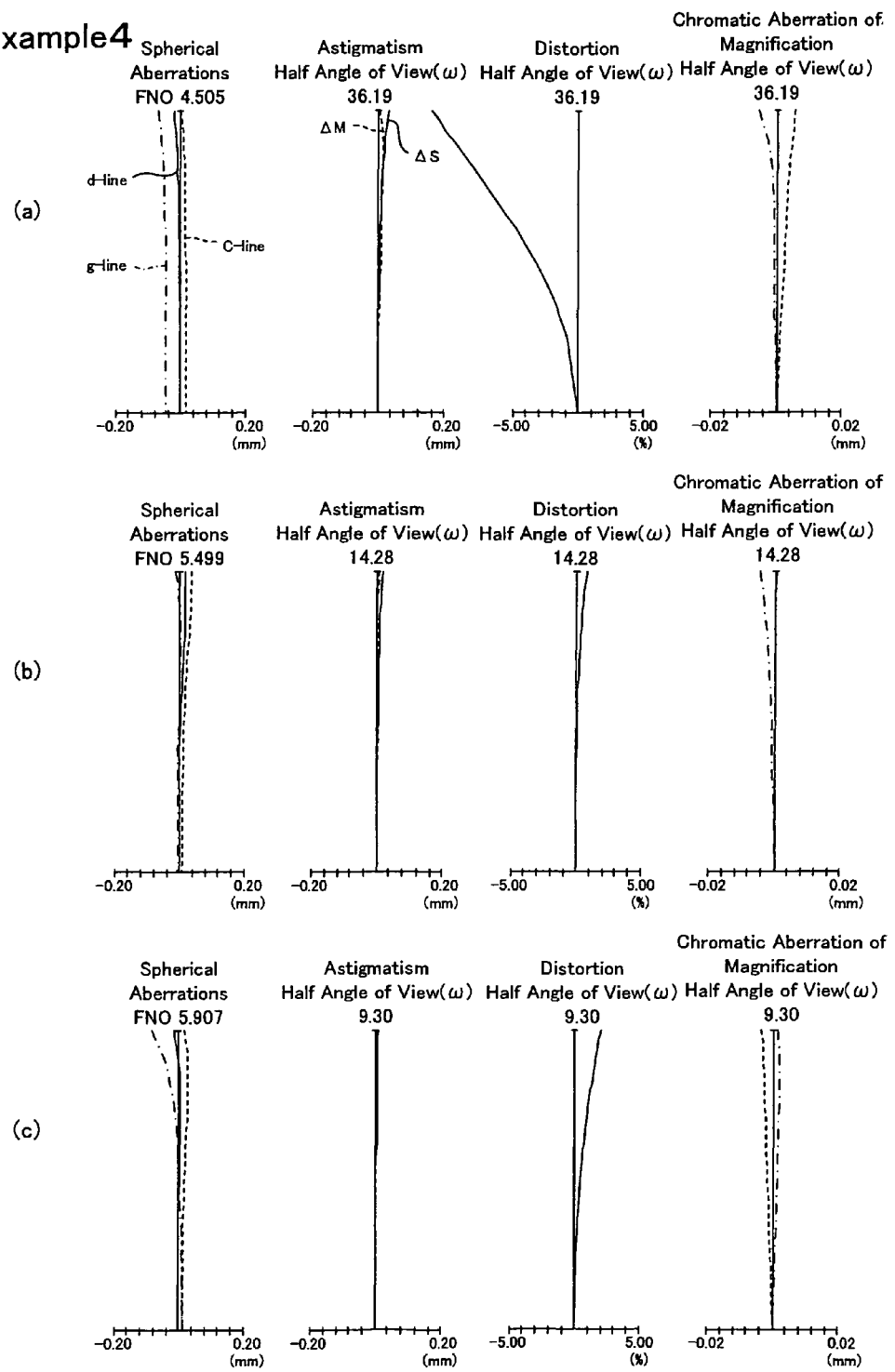
FIG. 19 is a set of aberration diagrams (a) at the wide-angle end, (b) in an intermediate setting and (c) at the telephoto end for spherical aberrations, astigmatism, distortion and chromatic aberration of magnification of the imaging optical system according to Example 4 upon focusing on an infinite object.
Figure 20:
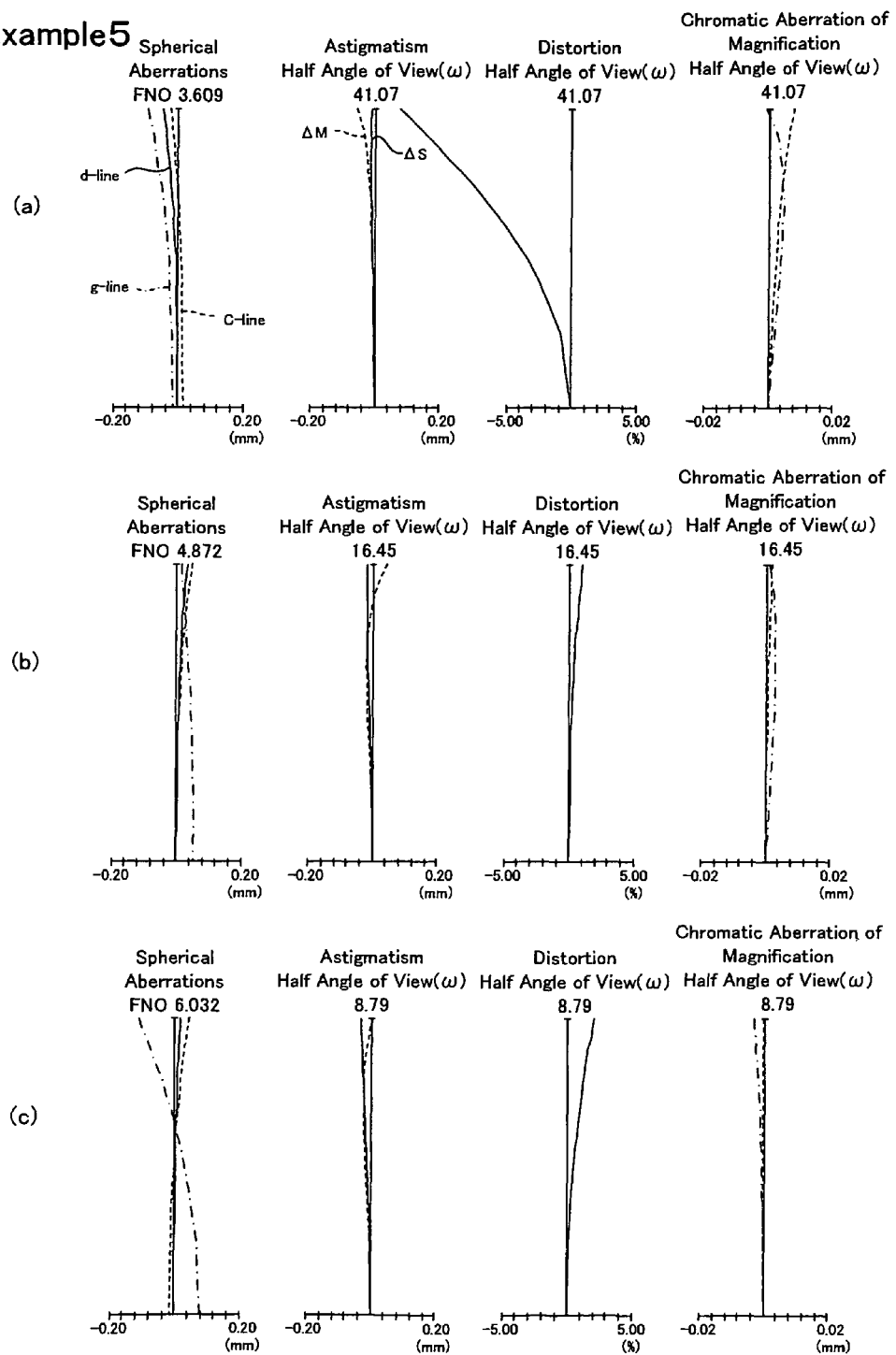
FIG. 20 is a set of aberration diagrams (a) at the wide-angle end, (b) in an intermediate setting and (c) at the telephoto end for spherical aberrations, astigmatism, distortion and chromatic aberration of magnification of the imaging optical system according to Example 5 upon focusing on an infinite object.
Figure 21:
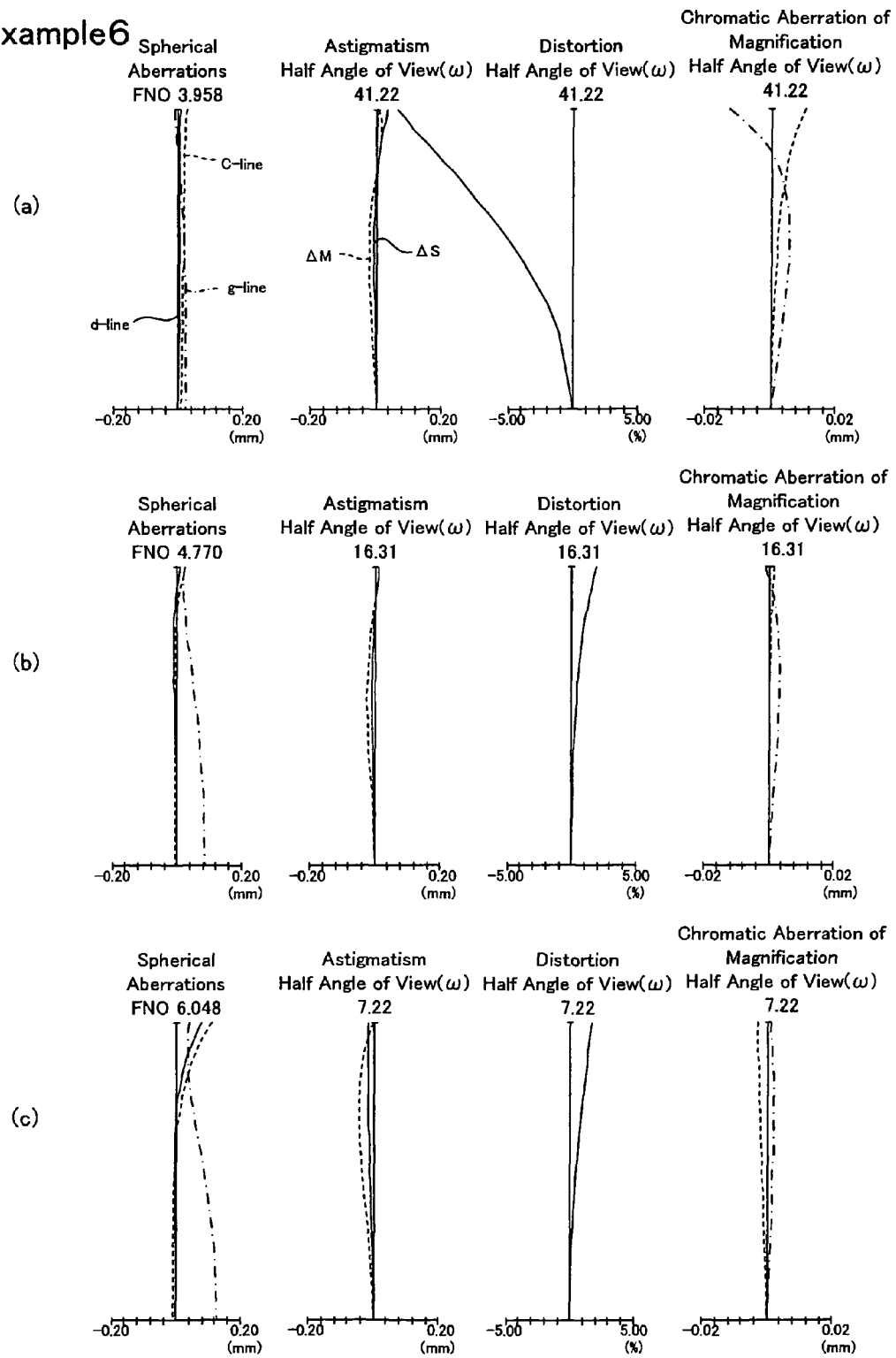
FIG. 21 is a set of aberration diagrams (a) at the wide-angle end, (b) in an intermediate setting and (c) at the telephoto end for spherical aberrations, astigmatism, distortion and chromatic aberration of magnification of the imaging optical system according to Example 6 upon focusing on an infinite object.
Figure 22:
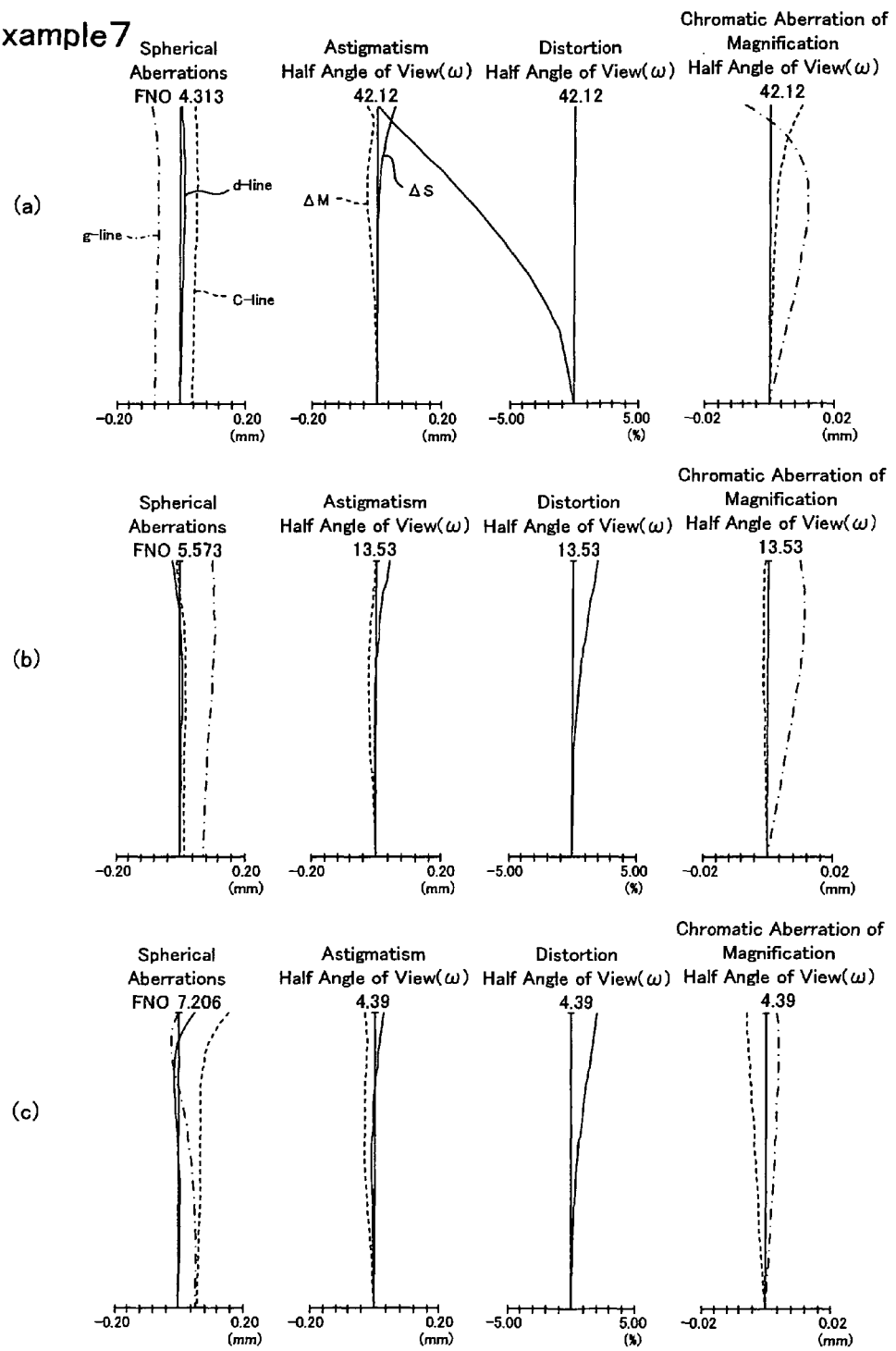
FIG. 22 is a set of aberration diagrams (a) at the wide-angle end, (b) in an intermediate setting and (c) at the telephoto end for spherical aberrations, astigmatism, distortion and chromatic aberration of magnification of the imaging optical system according to Example 7 upon focusing on an infinite object.
Figure 23:
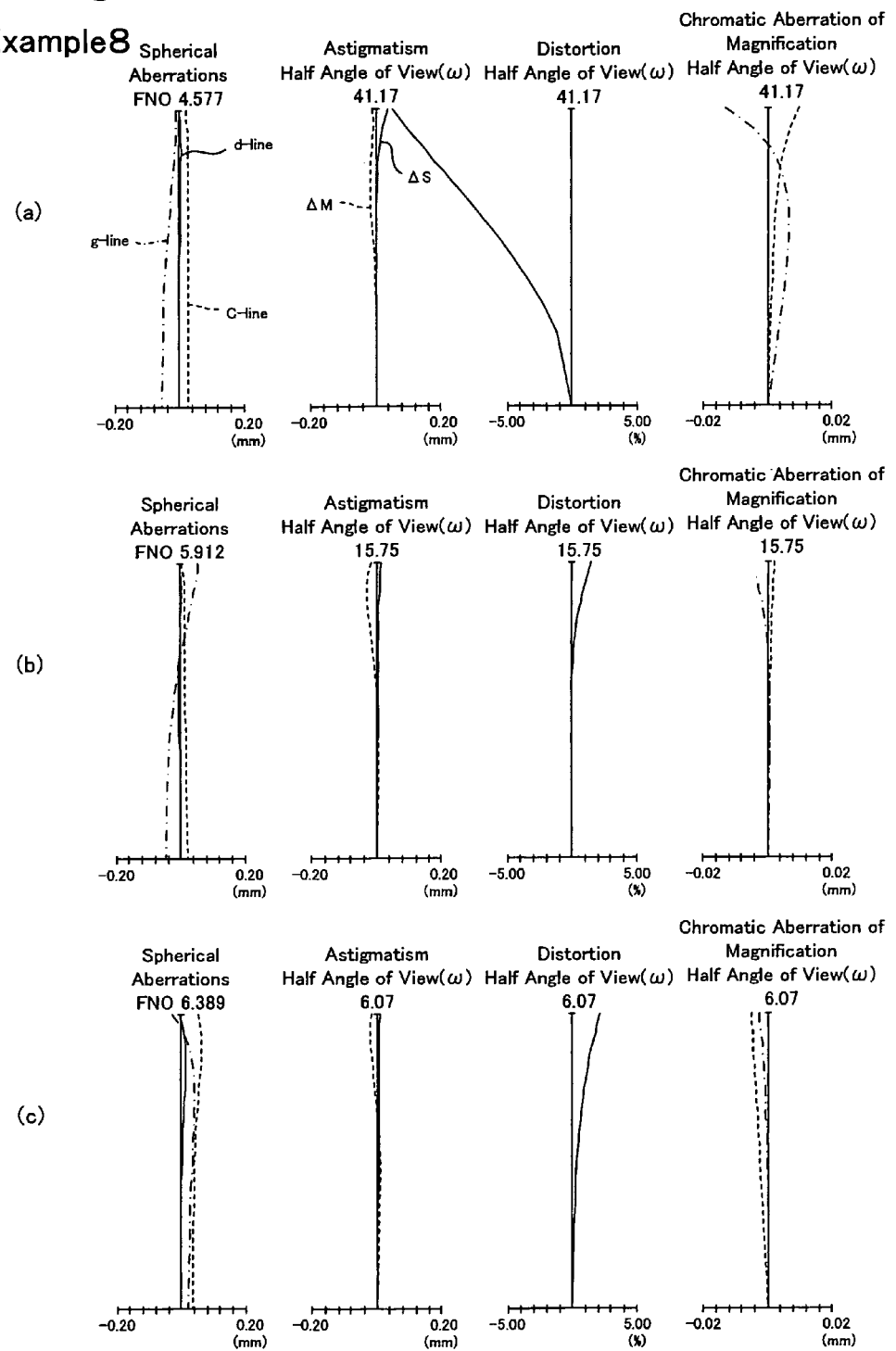
FIG. 23 is a set of aberration diagrams (a) at the wide-angle end, (b) in an intermediate setting and (c) at the telephoto end for spherical aberrations, astigmatism, distortion and chromatic aberration of magnification of the imaging optical system according to Example 8 upon focusing on an infinite object.
Figure 24:
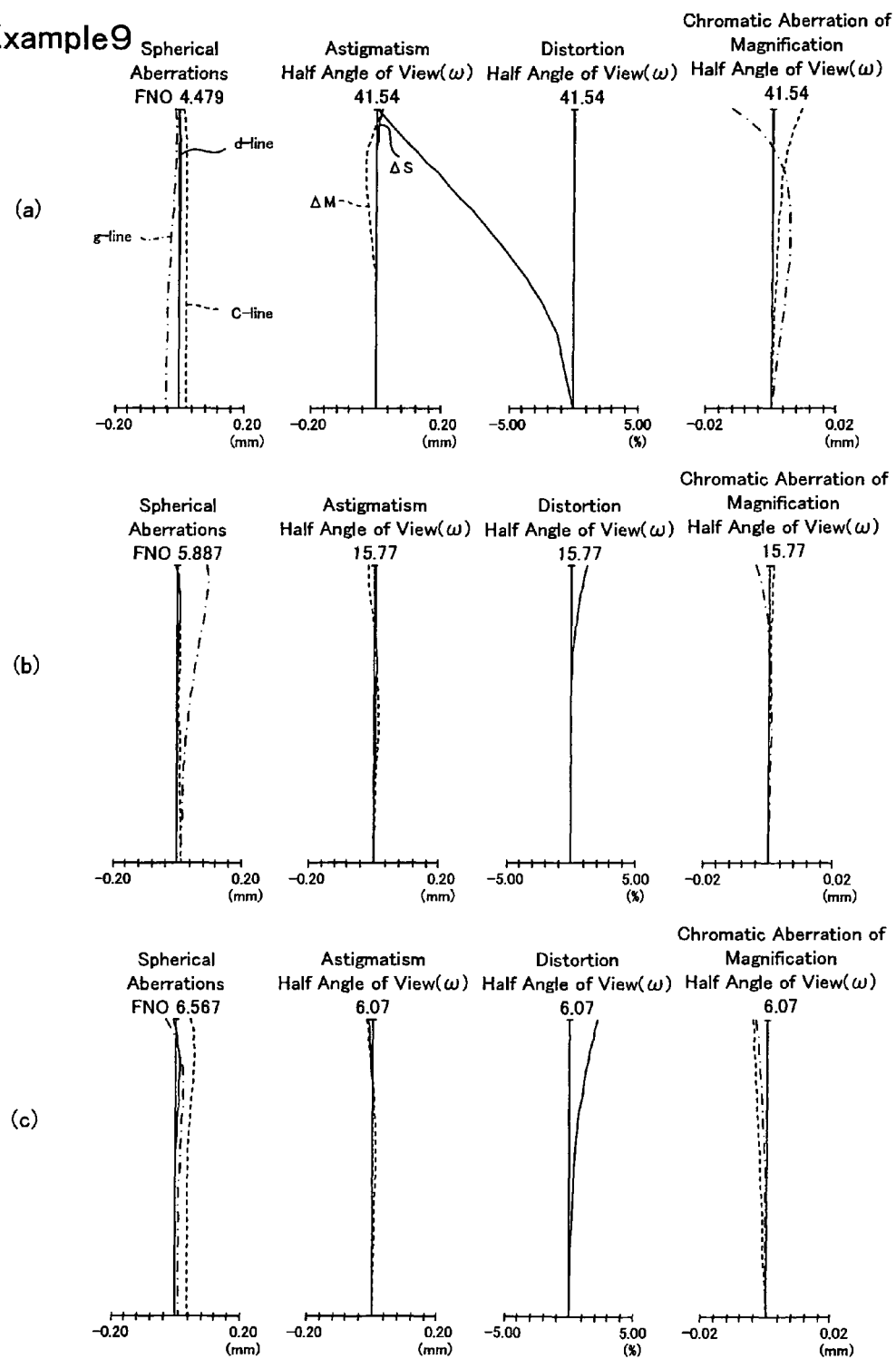
FIG. 24 is a set of aberration diagrams (a) at the wide-angle end, (b) in an intermediate setting and (c) at the telephoto end for spherical aberrations, astigmatism, distortion and chromatic aberration of magnification of the imaging optical system according to Example 9 upon focusing on an infinite object.
Figure 25:
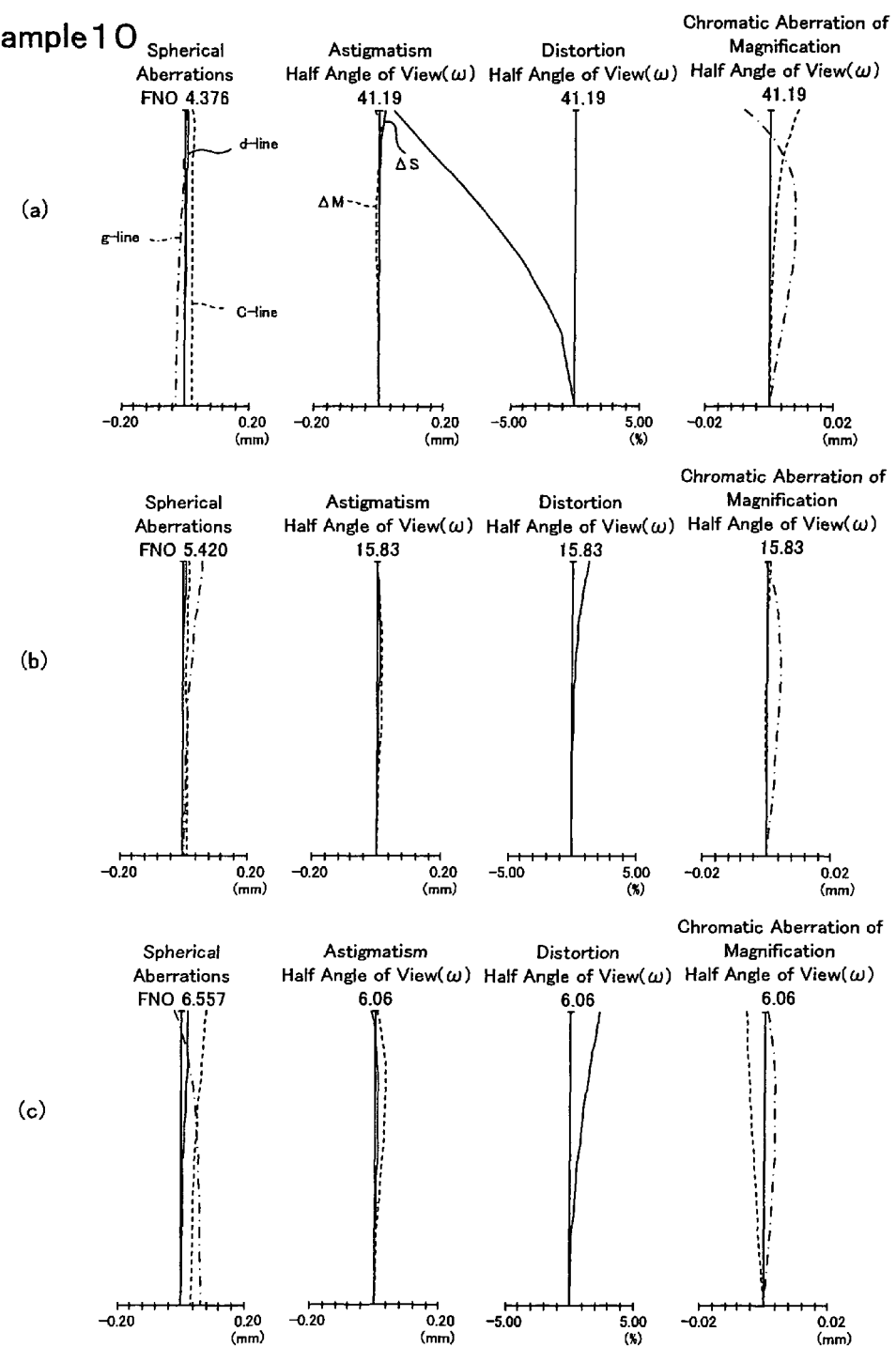
FIG. 25 is a set of aberration diagrams (a) at the wide-angle end, (b) in an intermediate setting and (c) at the telephoto end for spherical aberrations, astigmatism, distortion and chromatic aberration of magnification of the imaging optical system according to Example 10 upon focusing on an infinite object.
Figure 26:
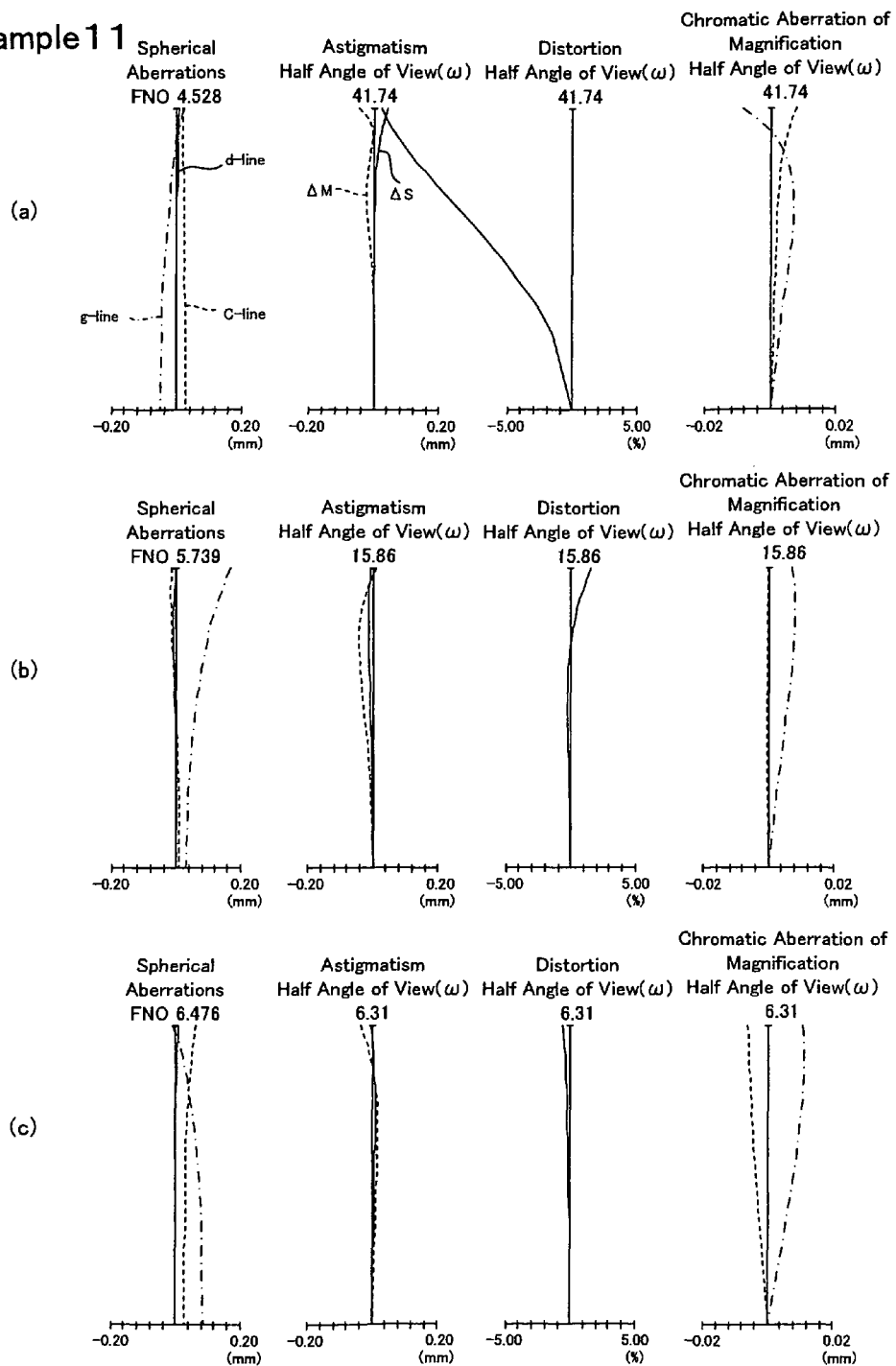
FIG. 26 is a set of aberration diagrams (a) at the wide-angle end, (b) in an intermediate setting and (c) at the telephoto end for spherical aberrations, astigmatism, distortion and chromatic aberration of magnification of the imaging optical system according to Example 11 upon focusing on an infinite object.
Figure 27:
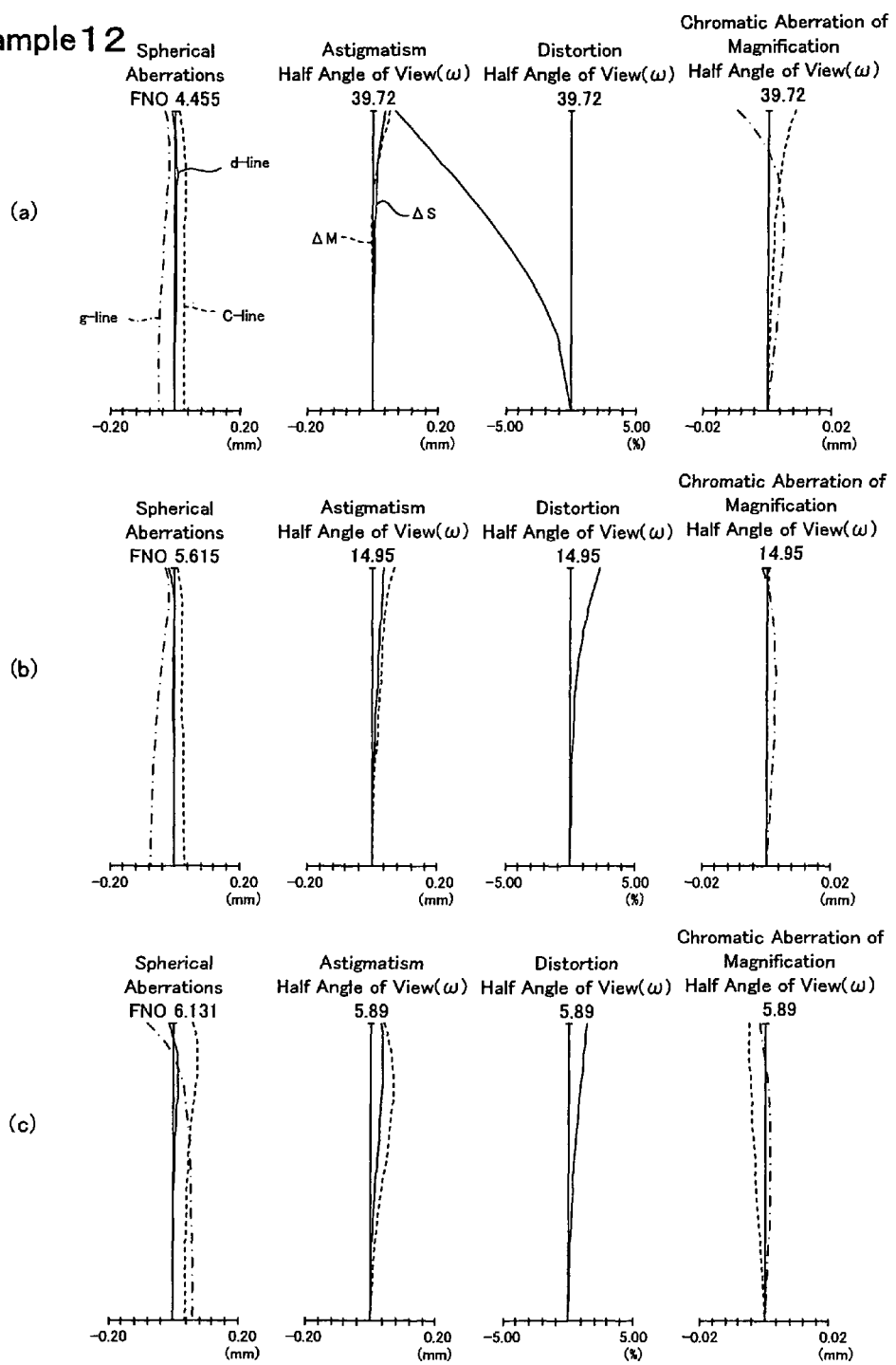
FIG. 27 is a set of aberration diagrams (a) at the wide-angle end, (b) in an intermediate setting and (c) at the telephoto end for spherical aberrations, astigmatism, distortion and chromatic aberration of magnification of the imaging optical system according to Example 12 upon focusing on an infinite object.
Figure 28:
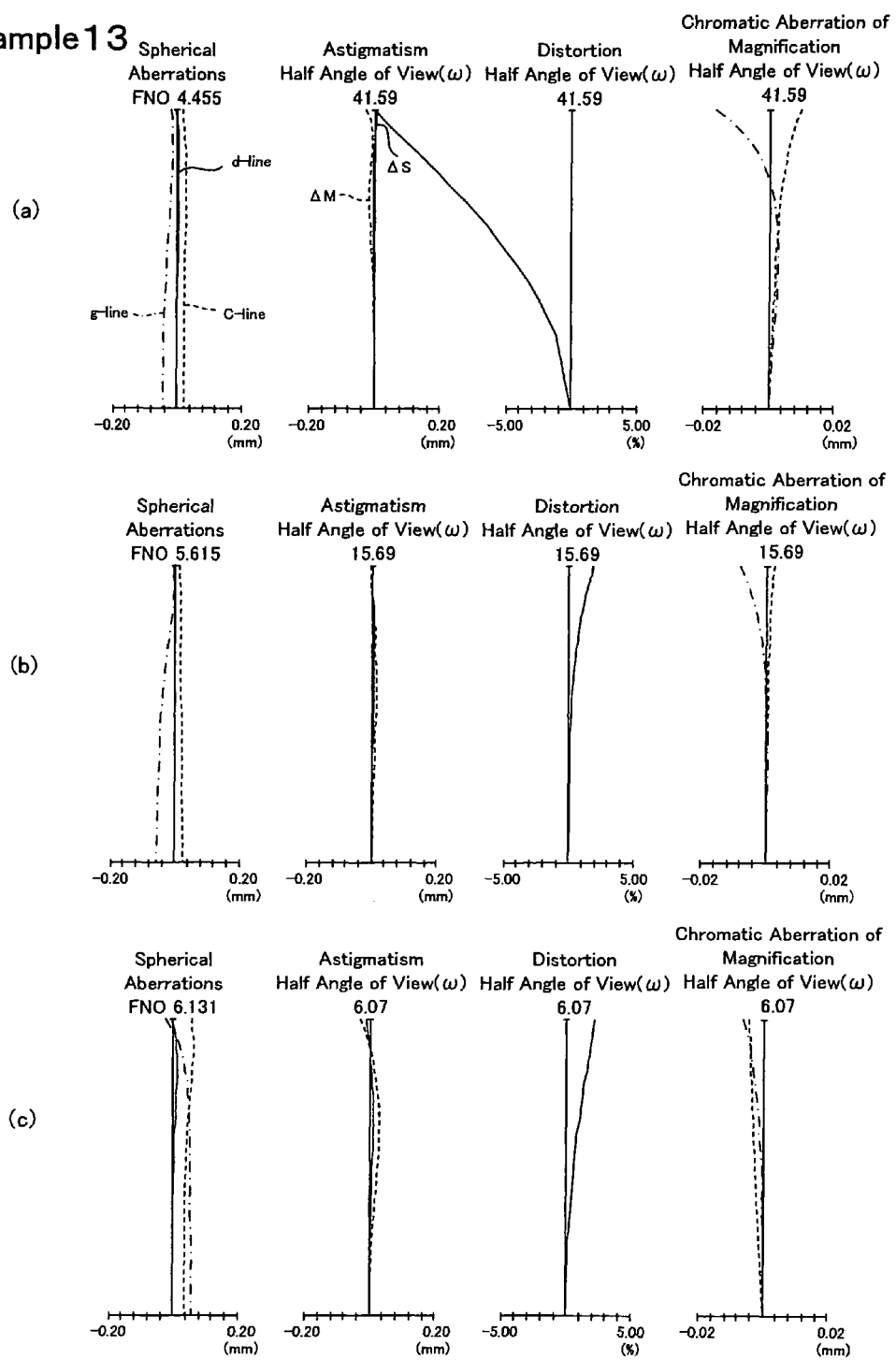
FIG. 28 is a set of aberration diagrams (a) at the wide-angle end, (b) in an intermediate setting and (c) at the telephoto end for spherical aberrations, astigmatism, distortion and chromatic aberration of magnification of the imaging optical system according to Example 13 upon focusing on an infinite object.
Figure 29:
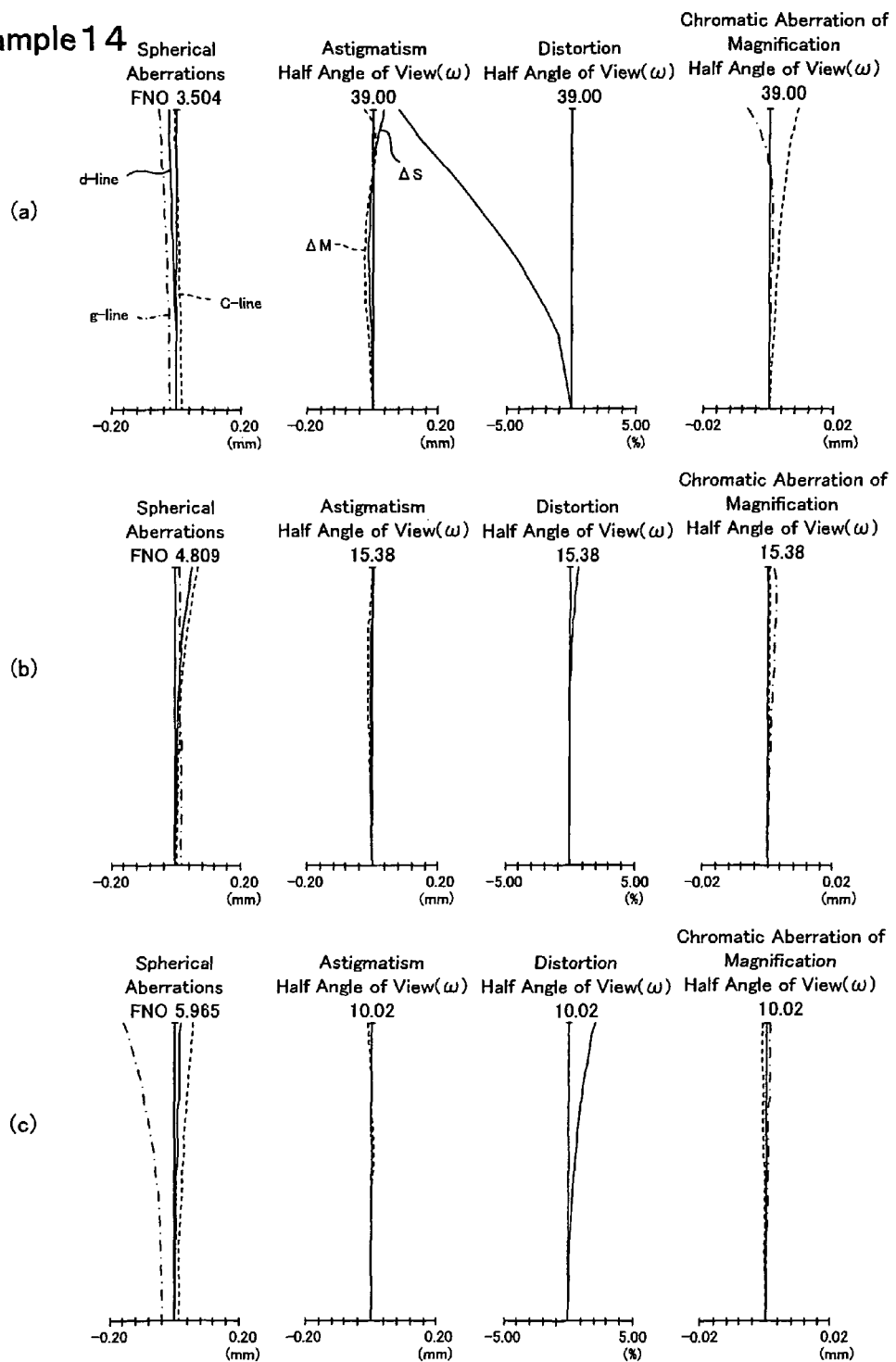
FIG. 29 is a set of aberration diagrams (a) at the wide-angle end, (b) in an intermediate setting and (c) at the telephoto end for spherical aberrations, astigmatism, distortion and chromatic aberration of magnification of the imaging optical system according to Example 14 upon focusing on an infinite object.
Figure 30:
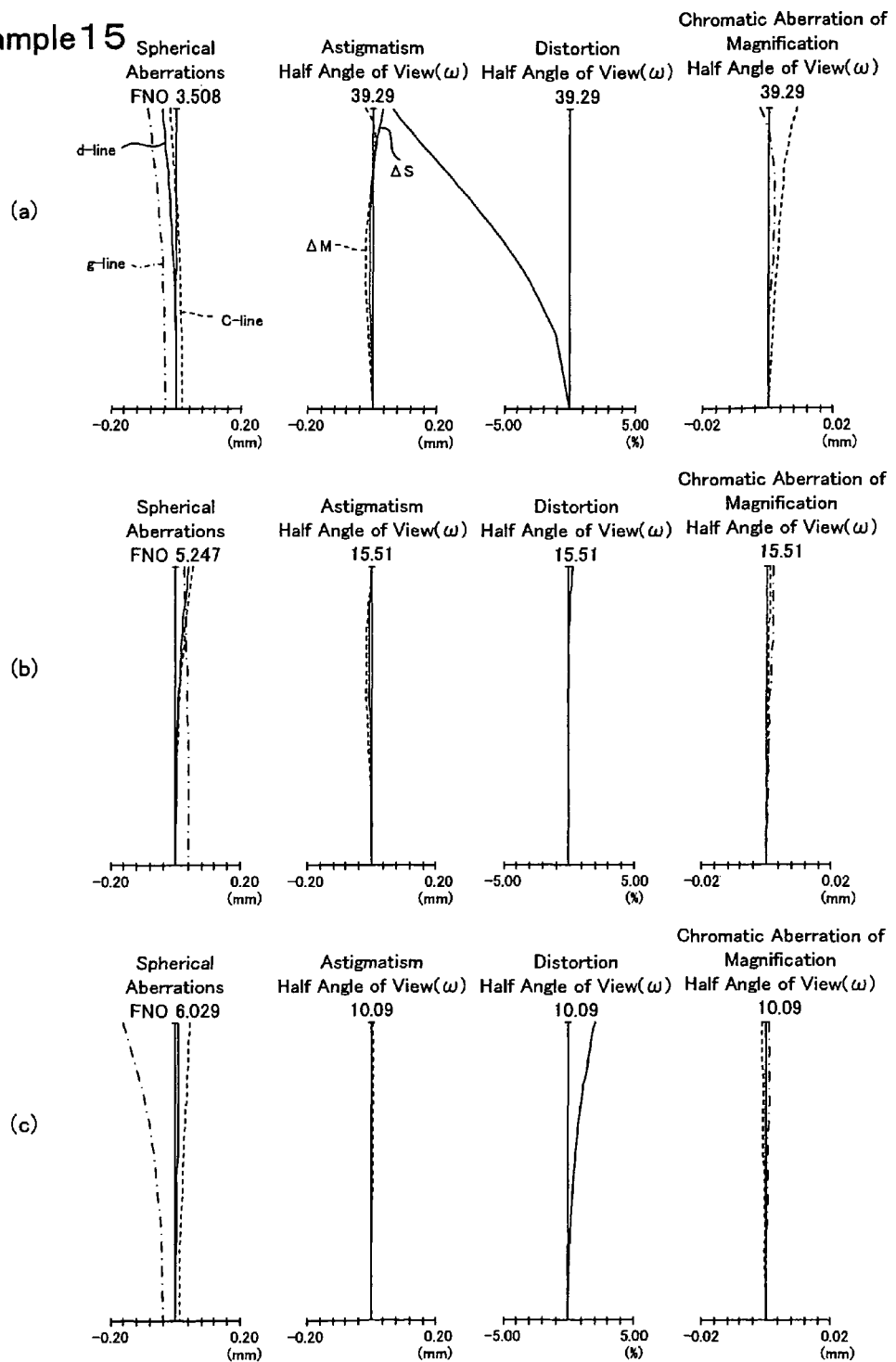
FIG. 30 is a set of aberration diagrams (a) at the wide-angle end, (b) in an intermediate setting and (c) at the telephoto end for spherical aberrations, astigmatism, distortion and chromatic aberration of magnification of the imaging optical system according to Example 15 upon focusing on an infinite object.

The imaging optical system or zoom lens according to Example 15 is now explained. FIG. 15 is a sectional view, as taken along the optical axis, of the optical construction of the zoom lens according to Example 15 (a) at the wide-angle end, (b) in the intermediate focal length setting, and (c) at the telephoto end, respectively.

As shown in FIG. 15, the imaging optical system or zoom lens according to Example 15 is built up of, in order from the object side, the first lens group G1 having positive refracting power, the second lens group G2 having negative refracting power, the third lens group G3 having positive refracting power, the fourth lens group G4 having positive refracting power, the fifth lens group G5 having negative refracting power, and the sixth lens group G6 having positive refracting power.

The first lens group G1 is made up of, in order from the object side, a negative meniscus lens L11 convex on its object side, the prism P that is the reflective optical element, a double-convex positive lens L12 and a double-convex positive lens L13, and has positive refracting power throughout. The negative meniscus lens L11 and prism P here cooperate together to form a front subgroup G1f having negative refracting power, and the double-convex positive lenses L12 and L13 here cooperate together to form a rear subgroup G1b having positive refracting power.

The second lens group G2 is made up of, in order from the object side, a double-concave negative lens L21 and a cemented lens SU21 of a double-concave negative lens L22 and a double-convex positive lens L23 and a positive meniscus lens L23 convex on its object side, and has negative refracting power throughout.

The third lens group G3 is made up of, in order from the object side, a stop S and a positive meniscus lens convex L31 on its object side, and has positive refracting power throughout.

The fourth lens group G4 is made up of, in order from the object side, a double-convex positive lens L41 and a cemented lens SU41 of a plano-convex positive lens L42 convex on its object side and a plano-concave negative lens L43 concave on its image side, and has positive refracting power throughout.

The fifth lens group G5 is made up of a double-concave negative lens L51, and has negative refracting power.

The sixth lens group G6 is made up of a double-convex positive lens L61, and has positive refracting power.

The first G1, and the sixth lens group G6 remains constantly fixed. Upon zooming from the wide-angle end to the telephoto end, the second lens group G2 moves toward the image side with a narrowing of the separation between it and the third lens group G3. The fourth lens group G4 moves toward the object side with a narrowing of the separation between it and the third lens group G3 from the wide-angle end to the telephoto end. The fifth lens group G5 moves toward the object side with a widening of the separation between it and the sixth lens group G6 from the wide-angle end to the telephoto end.

Four aspheric surfaces are applied: one to the image-side surface r2 of the negative meniscus lens L11 in the first lens group G1, one to the object-side surface r15 of the positive meniscus lens L31 in the third lens group G3, one to the object-side surface r19 of the plano-convex positive lens L41 forming a part of the cemented lens 41 in the fourth lens group G4, and one to the image-side surface r21 of the plano-concave negative lens L42 forming a part of the cemented lens SU41.

Tabulated below are the numeral data on the optical components forming the imaging optical systems or zoom lenses of Examples 1 to 15. In the numeral data in the respective examples, r1, r2, . . . are the radii of curvatures of the respective lens surfaces; d1, d2, . . . are the thicknesses or air separations of the respective lenses; nd1, nd2, . . . are the d-line ($\lambda$=587.56 nm) refractive indices of the respective lenses; νd1, νd2, . . . are the d-line ($\lambda$=587.56 nm) Abbe constants of the respective lenses; Fno. is the F-number; and ω is the half angle of view (°). The "stop" referred to means an apertures stop.

Here let z be the optical axis direction, y be the direction orthogonal to the optical axis, K be the conic coefficient, and A4, A6, A8 and A10 be the aspheric coefficients. Aspheric shape is then given by the following formula (I):

$$z=(y^2/r)/[1+\{1-(1+K)(y/r)^2\}^{1/2}]+A4y^4+A6y^6+A8y^8+A10y^{10} \quad (I)$$

It is here to be noted that E stands for a power of 10, and that the symbols of these values are common to the numeral data on the examples, given later.

NUMERAL EXAMPLE 1

Unit mm

Surface Data

| Surface No. | r | d | nd | νd |
|---|---|---|---|---|
| 1 | 104.846 | 0.60 | 1.82115 | 24.06 |
| 2 (Aspheric Surface) | 12.929 | 1.90 | | |
| 3 | ∞ | 8.40 | 1.88300 | 40.76 |
| 4 | ∞ | 0.10 | | |
| 5 | 166.189 | 1.48 | 1.49700 | 81.61 |
| 6 | −14.594 | 0.10 | | |
| 7 | 13.802 | 1.63 | 1.64000 | 60.08 |
| 8 | −32.350 | D8 | | |
| 9 | −24.439 | 0.50 | 1.80610 | 40.92 |
| 10 (Aspheric Surface) | 4.900 | 1.20 | | |
| 11 | −13.172 | 0.50 | 1.77250 | 49.60 |
| 12 | 8.464 | 1.07 | 1.92286 | 18.90 |
| 13 | −180.485 | D13 | | |
| 14 (Stop) | ∞ | 0.50 | | |
| 15 (Aspheric Surface) | 6.794 | 0.94 | 1.69350 | 53.21 |
| 16 | 15.121 | D16 | | |
| 17 (Aspheric Surface) | 4.658 | 1.82 | 1.49700 | 81.61 |
| 18 | −16.502 | 1.06 | | |
| 19 | 12.737 | 1.13 | 1.59270 | 35.31 |
| 20 | −12.769 | 0.50 | 1.82115 | 24.06 |
| 21 (Aspheric Surface) | 5.889 | D21 | | |
| 22 | −13.689 | 0.50 | 1.88300 | 40.80 |
| 23 | 38.683 | D23 | | |
| 24 | 12.178 | 2.75 | 1.52542 | 55.78 |
| 25 (Aspheric Surface) | −7.338 | 0.30 | | |
| 26 | ∞ | 1.55 | 1.51633 | 64.14 |
| 27 | ∞ | 0.34 | | |
| Image Plane | ∞ | | | |

Aspheric Data

2nd Surface

K = 0.487, A4 = 1.24587E−04
10th Surface

K = 0.000, A4 = −8.51761E−04, A6 = −1.93183E−05
15th Surface

K = −1.001, A4 = 2.68004E−05
17th Surface

K = −0.300, A4 = −2.65386E−04, A6 = −1.10160E−05,
A8 = −9.76481E−07
21th Surface K = 0.000, A4 = 2.95596E−03, A6 = 1.42760E−04, A8 = 1.01377E−05,
A10 = −3.45914E−07
25th Surface K = 0.000, A4 = 9.47414E−04, A6 = −1.34041E−05, A8 = 3.29870E−07,
A10 = −1.03360E−09

Unit mm

Zoom Data
Zoom Ratio 6.93

| | Wide-Angle | Intermediate | Telephoto |
|---|---|---|---|
| Focal Length | 5.04 | 13.18 | 34.95 |
| FNO. | 4.12 | 5.18 | 6.40 |
| Angle of View (2ω) | 83.72 | 31.94 | 12.28 |
| Image Hight | 3.84 | 3.84 | 3.84 |
| Full Lens Length | 49.73 | 49.73 | 49.73 |
| BF (in air) | 1.67 | 1.67 | 1.64 |
| D8 | 0.32 | 4.47 | 7.71 |
| D13 | 7.69 | 3.54 | 0.30 |
| D16 | 6.40 | 2.88 | 0.50 |
| D21 | 3.79 | 8.42 | 8.96 |
| D23 | 3.20 | 2.10 | 3.95 |

NUMERAL EXAMPLE 2

Unit mm

Surface Data

| Surface No. | r | d | nd | νd |
|---|---|---|---|---|
| 1 | 100.000 | 0.60 | 1.84666 | 23.78 |
| 2 (Aspheric Surface) | 12.773 | 1.90 | | |
| 3 | ∞ | 8.50 | 1.88300 | 40.76 |
| 4 | ∞ | 0.10 | | |
| 5 | 47.513 | 1.59 | 1.49700 | 81.61 |
| 6 | −15.875 | 0.10 | | |
| 7 | 14.242 | 1.55 | 1.65160 | 58.55 |
| 8 | −43.375 | D8 | | |
| 9 | −34.073 | 0.30 | 1.80610 | 40.92 |
| 10 (Aspheric Surface) | 5.225 | 1.27 | | |
| 11 | −11.529 | 0.50 | 1.77250 | 49.60 |
| 12 | 9.772 | 1.08 | 1.92286 | 18.90 |
| 13 | −59.500 | D13 | | |
| 14 (Stop) | ∞ | 0.50 | | |
| 15 (Aspheric Surface) | 7.877 | 0.83 | 1.74320 | 49.34 |
| 16 | 15.992 | D16 | | |
| 17 (Aspheric Surface) | 4.468 | 3.50 | 1.49700 | 81.61 |
| 18 | −12.269 | 0.10 | | |
| 19 | 12.491 | 0.50 | 1.84666 | 23.78 |
| 20 (Aspheric Surface) | 4.991 | D20 | | |
| 21 | −26.168 | 0.50 | 1.84666 | 23.78 |
| 22 | 20.050 | D22 | | |
| 23 | 11.138 | 2.59 | 1.52542 | 55.78 |
| 24 | −12.189 | 0.30 | | |
| 25 | ∞ | 1.55 | 1.51633 | 64.14 |
| 26 | ∞ | 0.34 | | |
| Image Plane | ∞ | | | |

Aspheric Data

2nd Surface

K = 0.238, A4 = 9.12122E−05
10th Surface

K = 0.000, A4 = −5.55094E−04, A6 = −4.10307E−06
15th Surface

K = 0.000, A4 = −1.96098E−04
17th Surface

K = −0.714, A4 = 5.59580E−04, A6 = −7.37981E−06
20th Surface

K = 0.000, A4 = 2.64723E−03, A6 = 1.30494E−04, A8 = 2.02589E−05

-continued

Unit mm

Zoom Data
Zoom Ratio 6.76

| | Wide-Angle | Intermediate | Telephoto |
|---|---|---|---|
| Focal Length | 5.07 | 12.88 | 34.27 |
| FNO. | 4.60 | 5.62 | 6.05 |
| Angle of View (2ω) | 82.46 | 32.60 | 12.52 |
| Image Hight | 3.84 | 3.84 | 3.84 |
| Full Lens Length | 49.73 | 49.74 | 49.73 |
| BF (in air) | 1.67 | 1.68 | 1.67 |
| D8 | 0.31 | 4.71 | 8.71 |
| D13 | 8.69 | 4.28 | 0.30 |
| D16 | 4.36 | 1.42 | 0.44 |
| D20 | 5.30 | 8.66 | 4.22 |
| D22 | 3.39 | 2.98 | 8.39 |

NUMERAL EXAMPLE 3

Unit mm

Surface Data

| Surface No. | r | d | nd | νd |
|---|---|---|---|---|
| 1 | 41.456 | 0.50 | 1.84666 | 23.78 |
| 2 | 12.000 | 1.90 | | |
| 3 | ∞ | 8.20 | 1.88300 | 40.76 |
| 4 | ∞ | 0.10 | | |
| 5 | 17.992 | 1.55 | 1.49700 | 81.61 |
| 6 | −21.572 | 0.10 | | |
| 7 | 9.614 | 1.10 | 1.77250 | 49.60 |
| 8 | 22.476 | D8 | | |
| 9 | −186.728 | 0.30 | 1.88300 | 40.76 |
| 10 | 6.430 | 1.05 | | |
| 11 | −9.871 | 0.50 | 1.77250 | 49.60 |
| 12 | 8.957 | 1.00 | 1.92286 | 18.90 |
| 13 | −387.688 | D13 | | |
| 14 (Stop) | ∞ | 0.50 | | |
| 15 (Aspheric Surface) | 7.357 | 0.89 | 1.52542 | 55.78 |
| 16 | 606.154 | D16 | | |
| 17 (Aspheric Surface) | 9.024 | 1.43 | 1.49700 | 81.61 |
| 18 (Aspheric Surface) | −8.804 | 0.30 | | |
| 19 | 7.272 | 1.09 | 1.81600 | 46.62 |
| 20 | 30.000 | 0.53 | 1.84666 | 23.78 |
| 21 | 4.514 | D21 | | |
| 22 | −10.000 | 0.50 | 1.80610 | 40.92 |
| 23 | −41.277 | D23 | | |
| 24 | 40.000 | 1.50 | 1.58313 | 59.38 |
| 25 | −15.000 | 0.30 | | |
| 26 | ∞ | 1.55 | 1.51633 | 64.14 |
| 27 | ∞ | 0.34 | | |
| Image Plane | ∞ | | | |

Aspheric Data

15th Surface

K = 0.000, A4 = −6.14798E−04
17th Surface

K = 0.075, A4 = −5.58747E−04, A6 = 2.03144E−05
18th Surface

K = 0.000, A4 = 5.50925E−04, A6 = 2.31829E−05

Zoom Data
Zoom Ratio 3.89

| | Wide-Angle | Intermediate | Telephoto |
|---|---|---|---|
| Focal Length | 5.68 | 14.36 | 22.09 |
| FNO. | 4.50 | 5.61 | 6.06 |

-continued

Unit mm

| | | | |
|---|---|---|---|
| Angle of View (2ω) | 74.34 | 29.78 | 19.34 |
| Image Hight | 3.84 | 3.84 | 3.84 |
| Full Lens Length | 41.76 | 41.71 | 41.75 |
| BF (in air) | 1.70 | 1.65 | 1.69 |
| D8 | 0.51 | 4.54 | 6.24 |
| D13 | 6.02 | 2.00 | 0.30 |
| D16 | 3.96 | 1.10 | 0.30 |
| D21 | 5.44 | 6.80 | 5.97 |
| D23 | 1.06 | 2.57 | 4.20 |

NUMERAL EXAMPLE 4

Unit mm

Surface Data

| Surface No. | r | d | nd | νd |
|---|---|---|---|---|
| 1 | 115.585 | 0.50 | 1.63493 | 23.90 |
| 2 (Aspheric Surface) | 12.000 | 1.90 | | |
| 3 | ∞ | 7.60 | 1.88300 | 40.76 |
| 4 | ∞ | 1.20 | 1.49700 | 81.61 |
| 5 | −16.066 | 0.10 | | |
| 6 | 9.942 | 1.34 | 1.65160 | 58.55 |
| 7 | −296.813 | D7 | | |
| 8 | 34.416 | 0.30 | 1.88300 | 40.76 |
| 9 | 5.764 | 1.18 | | |
| 10 | −7.294 | 0.50 | 1.77250 | 49.60 |
| 11 | 10.243 | 0.97 | 1.92286 | 18.90 |
| 12 | −116.268 | D12 | | |
| 13 (Stop) | ∞ | 0.50 | | |
| 14 (Aspheric Surface) | 7.261 | 0.94 | 1.52542 | 55.78 |
| 15 | −456.096 | D15 | | |
| 16 (Aspheric Surface) | 5.174 | 1.54 | 1.49700 | 81.61 |
| 17 | −10.861 | 0.10 | | |
| 18 | 10.475 | 0.90 | 1.82115 | 24.06 |
| 19 (Aspheric Surface) | 4.813 | D19 | | |
| 20 | −10.000 | 0.50 | 1.63493 | 23.90 |
| 21 | −1337.625 | D21 | | |
| 22 | 40.000 | 1.33 | 1.52542 | 55.78 |
| 23 | −15.000 | 0.30 | | |
| 24 | ∞ | 1.55 | 1.51633 | 64.14 |
| 25 | ∞ | 0.34 | | |
| Image Plane | ∞ | | | |

Aspheric Data

2nd Surface

K = 0.000, A4 = 7.37113E−05
14th Surface

K = 0.000, A4 = −6.26483E−04
16th Surface

K = 0.000, A4 = −3.05948E−04, A6 = −7.09887E−05
19th Surface

K = 0.000, A4 = 1.78274E−03, A6 = 4.88520E−05

Zoom Data
Zoom Ratio 3.89

| | Wide-Angle | Intermediate | Telephoto |
|---|---|---|---|
| Focal Length | 5.91 | 14.97 | 22.99 |
| FNO. | 4.50 | 5.50 | 5.91 |
| Angle of View (2ω) | 72.38 | 28.56 | 18.60 |
| Image Hight | 3.84 | 3.84 | 3.84 |
| Full Lens Length | 41.76 | 41.73 | 41.74 |
| BF (in air) | 2.83 | 2.80 | 2.81 |

-continued

| Unit mm | | | |
|---|---|---|---|
| D7 | 0.30 | 4.33 | 5.99 |
| D12 | 5.98 | 1.94 | 0.30 |
| D15 | 4.26 | 1.14 | 0.30 |
| D19 | 5.44 | 8.10 | 7.93 |
| D21 | 1.54 | 2.00 | 3.00 |

NUMERAL EXAMPLE 5

| Unit mm | | | | |
|---|---|---|---|---|
| Surface Data | | | | |
| Surface No. | r | d | nd | vd |
| 1 | 86.955 | 0.50 | 2.00069 | 25.46 |
| 2 | 12.353 | 1.90 | | |
| 3 | ∞ | 8.50 | 1.88300 | 40.76 |
| 4 | ∞ | 0.10 | | |
| 5 | 32.817 | 1.63 | 1.49700 | 81.61 |
| 6 | −17.824 | 0.10 | | |
| 7 | 12.429 | 1.30 | 1.65160 | 58.55 |
| 8 | 1782.737 | D8 | | |
| 9 | −333.713 | 0.30 | 1.88300 | 40.76 |
| 10 | 7.455 | 1.20 | | |
| 11 | −12.505 | 0.50 | 1.77250 | 49.60 |
| 12 | 9.654 | 1.20 | 1.92286 | 18.90 |
| 13 | −974.902 | D13 | | |
| 14 (Stop) | ∞ | 0.50 | | |
| 15 (Aspheric Surface) | 8.741 | 0.88 | 1.52542 | 55.78 |
| 16 | 30.986 | D16 | | |
| 17 (Aspheric Surface) | 8.446 | 3.34 | 1.49700 | 81.61 |
| 18 (Aspheric Surface) | −9.618 | 0.20 | | |
| 19 | 5.781 | 1.44 | 1.60562 | 43.70 |
| 20 | 46.686 | 0.50 | 1.80518 | 25.42 |
| 21 | 4.436 | D21 | | |
| 22 | −10.000 | 0.50 | 1.84666 | 23.78 |
| 23 | −24.983 | D23 | | |
| 24 | 30.000 | 1.43 | 1.52542 | 55.78 |
| 25 | −16.983 | 0.30 | | |
| 26 | ∞ | 1.55 | 1.51633 | 64.14 |
| 27 | ∞ | 0.34 | | |
| Image Plane | ∞ | | | |

Aspheric Data

15th Surface

K = 0.000, A4 = −3.21582E−04, A6 = −6.96160E−07
17th Surface

K = −0.673, A4 = −1.55100E−04, A6 = 4.01752E−06
18th Surface

K = 0.000, A4 = 5.12228E−04, A6 = 2.51481E−06

Zoom Data
Zoom Ratio 4.78

| | Wide-Angle | Intermediate | Telephoto |
|---|---|---|---|
| Focal Length | 5.09 | 12.87 | 24.33 |
| FNO. | 3.61 | 4.87 | 6.03 |
| Angle of View (2ω) | 82.14 | 32.90 | 17.58 |
| Image Hight | 3.84 | 3.84 | 3.84 |
| Full Lens Length | 49.77 | 49.71 | 49.73 |
| BF (in air) | 1.61 | 1.65 | 1.67 |
| D8 | 0.32 | 4.90 | 7.49 |
| D13 | 7.46 | 2.87 | 0.30 |
| D16 | 6.80 | 2.86 | 0.30 |
| D21 | 5.37 | 7.08 | 8.72 |
| D23 | 2.08 | 4.31 | 5.22 |

NUMERAL EXAMPLE 6

| Unit mm | | | | |
|---|---|---|---|---|
| Surface Data | | | | |
| Surface No. | r | d | nd | vd |
| 1 | 113.965 | 0.50 | 1.82115 | 24.06 |
| 2 (Aspheric Surface) | 13.561 | 1.90 | | |
| 3 | ∞ | 8.50 | 1.88300 | 40.76 |
| 4 | ∞ | 0.10 | | |
| 5 | 28.210 | 1.50 | 1.49700 | 81.61 |
| 6 | −21.607 | 0.10 | | |
| 7 | 21.753 | 1.33 | 1.69680 | 55.53 |
| 8 | −33.615 | D8 | | |
| 9 | −29.517 | 0.30 | 1.80610 | 40.92 |
| 10 (Aspheric Surface) | 5.594 | 1.09 | | |
| 11 | −38.904 | 0.50 | 1.77250 | 49.60 |
| 12 | 7.621 | 1.20 | 1.92286 | 18.90 |
| 13 | 49.043 | D13 | | |
| 14 (Stop) | ∞ | 0.50 | | |
| 15 (Aspheric Surface) | 5.642 | 0.89 | 1.52542 | 55.78 |
| 16 | 11.500 | D16 | | |
| 17 (Aspheric Surface) | 6.552 | 3.11 | 1.49700 | 81.61 |
| 18 (Aspheric Surface) | −9.612 | 0.20 | | |
| 19 | 6.397 | 1.34 | 1.58144 | 40.75 |
| 20 | 17849.043 | 0.50 | 1.80518 | 25.42 |
| 21 | 4.181 | D21 | | |
| 22 | −10.000 | 0.50 | 1.84666 | 23.78 |
| 23 | −24.983 | D23 | | |
| 24 | 50.000 | 1.44 | 1.83400 | 37.16 |
| 25 | −15.000 | 0.30 | | |
| 26 | ∞ | 1.55 | 1.51633 | 64.14 |
| 27 | ∞ | 0.34 | | |
| Image Plane | ∞ | | | |

Aspheric Data

2nd Surface

K = 0.000, A4 = 9.85824E−05, A6 = 6.58595E−07, A8 = −8.10558E−09
10th Surface

K = 0.000, A4 = −6.34676E−04, A6 = −1.11374E−05
15th Surface

K = 0.000, A4 = −6.23300E−04, A6 = −1.35901E−05
17th Surface

K = −0.300, A4 = −4.25303E−04, A6 = 2.05390E−05
18th Surface

K = 0.000, A4 = 9.11772E−04, A6 = 2.30953E−05

Zoom Data
Zoom Ratio 5.88

| | Wide-Angle | Intermediate | Telephoto |
|---|---|---|---|
| Focal Length | 5.07 | 12.87 | 29.81 |
| FNO. | 3.96 | 4.77 | 6.05 |
| Angle of View (2ω) | 82.44 | 32.62 | 14.44 |
| Image Hight | 3.84 | 3.84 | 3.84 |
| Full Lens Length | 49.73 | 49.73 | 49.71 |
| BF (in air) | 1.67 | 1.67 | 1.65 |
| D8 | 0.30 | 5.27 | 8.41 |
| D13 | 8.44 | 3.48 | 0.33 |
| D16 | 6.14 | 3.01 | 0.30 |
| D21 | 4.17 | 8.80 | 9.48 |
| D23 | 3.50 | 1.99 | 4.03 |

NUMERAL EXAMPLE 7

Unit mm

Surface Data

| Surface No. | r | d | nd | vd |
|---|---|---|---|---|
| 1 | ∞ | 0.60 | 1.82115 | 24.06 |
| 2 (Aspheric Surface) | 16.412 | 1.90 | | |
| 3 | ∞ | 8.40 | 1.88300 | 40.76 |
| 4 | ∞ | 0.10 | | |
| 5 | 44.886 | 1.90 | 1.49700 | 81.61 |
| 6 | −15.759 | 0.10 | | |
| 7 | 12.511 | 1.79 | 1.57967 | 60.00 |
| 8 | −95.800 | D8 | | |
| 9 | −47.440 | 0.50 | 1.80610 | 40.92 |
| 10 (Aspheric Surface) | 4.491 | 1.20 | | |
| 11 | −11.015 | 0.50 | 1.77250 | 49.60 |
| 12 | 7.975 | 1.10 | 1.92286 | 18.90 |
| 13 | −146.256 | D13 | | |
| 14 (Stop) | ∞ | 0.50 | | |
| 15 (Aspheric Surface) | 7.498 | 0.94 | 1.69350 | 53.21 |
| 16 | 18.054 | D16 | | |
| 17 (Aspheric Surface) | 5.066 | 1.90 | 1.49700 | 81.61 |
| 18 (Aspheric Surface) | −21.380 | 1.50 | | |
| 19 | 20.244 | 1.14 | 1.59270 | 35.31 |
| 20 | −8.488 | 0.50 | 1.82115 | 24.06 |
| 21 (Aspheric Surface) | 9.236 | D21 | | |
| 22 | −15.848 | 0.50 | 1.80610 | 40.92 |
| 23 | 215.413 | D23 | | |
| 24 | 27.931 | 2.47 | 1.51000 | 60.00 |
| 25 (Aspheric Surface) | −6.937 | 0.30 | | |
| 26 | ∞ | 1.55 | 1.51633 | 64.14 |
| 27 | ∞ | 0.34 | | |
| Image Plane | ∞ | | | |

Aspheric Data

2nd Surface $K = 0.000, A4 = 9.13348E{-}05, A6 = 1.43222E{-}07, A8 = -9.18067E{-}10$ 10th Surface $K = 0.000, A4 = -6.66705E{-}04, A6 = -3.13125E{-}05,$
$A8 = -2.13641E{-}07, A10 = 2.52527E{-}07$ 15th Surface $K = -1.004, A4 = 2.68471E{-}05$ 17th Surface $K = 0.000, A4 = -3.16813E{-}04, A6 = -2.84537E{-}06,$
$A8 = 2.10723E{-}07$ 18th Surface $K = 0.000, A4 = 1.47368E{-}04, A6 = 1.65817E{-}05$ 21th Surface $K = 0.000, A4 = 2.08213E{-}03, A6 = 6.78512E{-}05, A8 = 1.85266E{-}06,$
$A10 = 1.00078E{-}06$ 25th Surface $K = 0.000, A4 = 1.38985E{-}03, A6 = -2.00951E{-}05, A8 = 2.97973E{-}07$ Zoom Data
Zoom Ratio 9.80

| | Wide-Angle | Intermediate | Telephoto |
|---|---|---|---|
| Focal Length | 5.00 | 15.65 | 49.00 |
| FNO. | 4.31 | 5.57 | 7.21 |
| Angle of View (2ω) | 84.24 | 27.06 | 8.78 |
| Image Hight | 3.84 | 3.84 | 3.84 |
| Full Lens Length | 55.73 | 55.73 | 55.73 |
| BF (in air) | 1.69 | 1.66 | 1.61 |
| D8 | 0.34 | 5.54 | 9.16 |
| D13 | 9.12 | 3.92 | 0.30 |
| D16 | 8.32 | 3.85 | 0.47 |
| D21 | 1.77 | 8.76 | 9.67 |
| D23 | 6.94 | 4.45 | 6.95 |

NUMERAL EXAMPLE 8

Unit mm

Surface Data

| Surface No. | r | d | nd | vd |
|---|---|---|---|---|
| 1 | 102.491 | 0.60 | 1.84666 | 23.78 |
| 2 (Aspheric Surface) | 12.335 | 1.90 | | |
| 3 | ∞ | 8.30 | 1.88300 | 40.76 |
| 4 | ∞ | 0.10 | | |
| 5 | 50.998 | 1.59 | 1.49700 | 81.61 |
| 6 | −15.512 | 0.10 | | |
| 7 | 14.983 | 1.56 | 1.65160 | 58.55 |
| 8 | −33.213 | D8 | | |
| 9 | −29.687 | 0.50 | 1.80610 | 40.92 |
| 10 (Aspheric Surface) | 5.700 | 1.20 | | |
| 11 | −17.270 | 0.50 | 1.77250 | 49.60 |
| 12 | 20.624 | 0.10 | | |
| 13 | 13.424 | 1.12 | 1.92286 | 18.90 |
| 14 | −17.759 | 0.50 | 1.88300 | 40.80 |
| 15 | 27.607 | D15 | | |
| 16 (Stop) | ∞ | 0.50 | | |
| 17 (Aspheric Surface) | 8.514 | 0.88 | 1.74320 | 49.34 |
| 18 | 23.328 | D18 | | |
| 19 (Aspheric Surface) | 4.500 | 3.40 | 1.49700 | 81.54 |
| 20 | −11.971 | 0.10 | | |
| 21 | 17.674 | 0.55 | 1.84666 | 23.78 |
| 22 (Aspheric Surface) | 5.295 | D22 | | |
| 23 | −10.891 | 0.50 | 1.84666 | 23.78 |
| 24 | −66.664 | D24 | | |
| 25 (Aspheric Surface) | 36.386 | 1.93 | 1.52542 | 55.78 |
| 26 | −8.647 | 0.30 | | |
| 27 | ∞ | 1.55 | 1.51633 | 64.14 |
| 28 | ∞ | 0.34 | | |
| Image Plane | ∞ | | | |

Aspheric Data

2nd Surface $K = 0.322, A4 = 1.15151e{-}04$

10th Surface $K = 0.000, A4 = -4.78953e{-}04, A6 = -2.99590e{-}06$

17th Surface $K = 0.000, A4 = -2.02240e{-}04$

19th Surface $K = -0.972, A4 = 9.86241e{-}04, A6 = -1.83150e{-}06$

22th Surface $K = 0.000, A4 = 2.65371e{-}03, A6 = 1.32567e{-}04, A8 = 1.62784e{-}05$ 25th Surface $K = 0.000, A4 = -3.01230e{-}04, A6 = -4.99648e{-}06$ Zoom Data
Zoom Ratio 6.93

| | Wide-Angle | Intermediate | Telephoto |
|---|---|---|---|
| Focal Length | 5.10 | 13.42 | 35.32 |
| FNO. | 4.58 | 5.91 | 6.39 |
| Angle of View (2ω) | 82.34 | 31.50 | 12.14 |
| Image Hight | 3.84 | 3.84 | 3.84 |
| Full Lens Length | 49.71 | 49.73 | 49.72 |

-continued

Unit mm

| | | | |
|---|---|---|---|
| BF (in air) | 1.67 | 1.67 | 1.66 |
| D8 | 0.30 | 4.54 | 8.35 |
| D15 | 8.41 | 4.18 | 0.36 |
| D18 | 4.93 | 1.23 | 0.40 |
| D22 | 6.47 | 9.70 | 4.82 |
| D24 | 2.00 | 2.49 | 8.21 |

NUMERAL EXAMPLE 9

Unit mm

Surface Data

| Surface No. | r | d | nd | νd |
|---|---|---|---|---|
| 1 | 101.461 | 0.60 | 1.84666 | 23.78 |
| 2 (Aspheric Surface) | 12.386 | 1.90 | | |
| 3 | ∞ | 8.45 | 1.88300 | 40.76 |
| 4 | ∞ | 0.10 | | |
| 5 | 42.898 | 1.44 | 1.49700 | 81.61 |
| 6 | −16.474 | 0.10 | | |
| 7 | 16.176 | 1.54 | 1.65160 | 58.55 |
| 8 | −30.983 | D8 | | |
| 9 | −23.539 | 0.50 | 1.80610 | 40.92 |
| 10 (Aspheric Surface) | 5.801 | 1.02 | | |
| 11 | −71.178 | 0.50 | 1.77250 | 49.60 |
| 12 | 8.304 | 1.23 | 1.92286 | 20.88 |
| 13 | −25.671 | 0.50 | 1.88300 | 40.80 |
| 14 (Aspheric Surface) | 21.295 | D14 | | |
| 15 (Stop) | ∞ | 0.50 | | |
| 16 (Aspheric Surface) | 8.838 | 0.91 | 1.69350 | 53.21 |
| 17 | 31.222 | D17 | | |
| 18 (Aspheric Surface) | 4.500 | 3.50 | 1.49700 | 81.61 |
| 19 | −11.068 | 0.10 | | |
| 20 | 16.233 | 0.54 | 1.84666 | 23.78 |
| 21 (Aspheric Surface) | 5.135 | D21 | | |
| 22 | −14.685 | 0.50 | 1.90366 | 31.32 |
| 23 | 44.496 | D23 | | |
| 24 (Aspheric Surface) | 18.709 | 2.10 | 1.52542 | 55.78 |
| 25 | −10.055 | 0.30 | | |
| 26 | ∞ | 1.55 | 1.51633 | 64.14 |
| 27 | ∞ | 0.34 | | |
| Image Plane | ∞ | | | |

Aspheric Data

2nd Surface $K = 0.415, A4 = 9.97548E{-}05$

10th Surface $K = 0.000, A4 = -1.61553E{-}04, A6 = 5.74401E{-}07$

14th Surface $K = 0.000, A4 = -3.74968E{-}04, A6 = -3.28683E{-}06$

16th Surface $K = 0.000, A4 = -1.81133E{-}04$

18th Surface $K = -1.021, A4 = 8.90291E{-}04, A6 = -9.88698E{-}06$

21th Surface $K = 0.000, A4 = 2.53044E{-}03, A6 = 1.13174E{-}04, A8 = 1.49435E{-}05$ 24th Surface $K = 0.000, A4 = -2.18983E{-}05, A6 = -5.00000E{-}06$

-continued

Unit mm

Zoom Data
Zoom Ratio 6.93

| | Wide-Angle | Intermediate | Telephoto |
|---|---|---|---|
| Focal Length | 5.10 | 13.42 | 35.34 |
| FNO. | 4.48 | 5.89 | 6.57 |
| Angle of View (2ω) | 83.08 | 31.54 | 12.14 |
| Image Hight | 3.84 | 3.84 | 3.84 |
| Full Lens Length | 49.73 | 49.73 | 49.73 |
| BF (in air) | 1.67 | 1.67 | 1.66 |
| D8 | 0.32 | 4.55 | 8.30 |
| D14 | 8.37 | 4.14 | 0.39 |
| D17 | 5.56 | 1.76 | 0.39 |
| D21 | 6.25 | 9.10 | 6.48 |
| D23 | 1.55 | 2.50 | 6.49 |

NUMERAL EXAMPLE 10

Unit mm

Surface Data

| Surface No. | r | d | nd | νd |
|---|---|---|---|---|
| 1 | 167.099 | 0.60 | 1.84666 | 23.78 |
| 2 (Aspheric Surface) | 13.861 | 1.90 | | |
| 3 | ∞ | 8.50 | 1.88300 | 40.76 |
| 4 | ∞ | 0.10 | | |
| 5 | 76.384 | 1.53 | 1.49700 | 81.61 |
| 6 | −15.731 | 0.10 | | |
| 7 | 14.011 | 1.14 | 1.65160 | 58.55 |
| 8 | −45.334 | D8 | | |
| 9 | −37.012 | 0.50 | 1.80610 | 40.92 |
| 10 (Aspheric Surface) | 5.825 | 1.61 | | |
| 11 | −13.858 | 0.50 | 1.77250 | 49.60 |
| 12 | 8.503 | 1.04 | 1.92286 | 18.90 |
| 13 | 352.038 | D13 | | |
| 14 (Stop) | ∞ | 0.50 | | |
| 15 (Aspheric Surface) | 9.396 | 0.87 | 1.69350 | 53.21 |
| 16 | 30.613 | D16 | | |
| 17 (Aspheric Surface) | 4.637 | 2.39 | 1.49700 | 81.61 |
| 18 | −33.444 | 0.10 | | |
| 19 | 51.291 | 1.70 | 1.49700 | 81.61 |
| 20 | −23.134 | 0.10 | | |
| 21 | 23.688 | 0.50 | 1.84666 | 23.78 |
| 22 (Aspheric Surface) | 5.304 | D22 | | |
| 23 | −14.058 | 0.50 | 1.84666 | 23.78 |
| 24 | 89.645 | D24 | | |
| 25 | 12.580 | 2.41 | 1.52542 | 55.78 |
| 26 | −12.116 | 0.30 | | |
| 27 | ∞ | 1.55 | 1.51633 | 64.14 |
| 28 | ∞ | 0.34 | | |
| Image Plane | ∞ | | | |

Aspheric Data

2nd Surface $K = 0.150, A4 = 9.22313E{-}05$

10th Surface $K = 0.000, A4 = -3.75331E{-}04, A6 = -3.08291E{-}06$

15th Surface $K = 0.000, A4 = -1.53846E{-}04$

17th Surface $K = -1.025, A4 = 8.72375E{-}04, A6 = 4.55839E{-}06$

-continued

Unit mm

22th Surface

K = 0.000, A4 = 2.76271E−03, A6 = 1.47620E−04, A8 = 1.90100E−05

Zoom Data
Zoom Ratio 6.93

|  | Wide-Angle | Intermediate | Telephoto |
| --- | --- | --- | --- |
| Focal Length | 5.10 | 13.38 | 35.36 |
| FNO. | 4.38 | 5.42 | 6.56 |
| Angle of View (2ω) | 82.38 | 31.66 | 12.12 |
| Image Hight | 3.84 | 3.84 | 3.84 |
| Full Lens Length | 49.72 | 49.77 | 49.79 |
| BF (in air) | 1.69 | 1.71 | 1.73 |
| D8 | 0.31 | 4.66 | 8.93 |
| D13 | 8.83 | 4.52 | 0.30 |
| D16 | 4.85 | 1.00 | 0.38 |
| D22 | 5.67 | 8.80 | 4.31 |
| D24 | 1.80 | 2.50 | 7.57 |

NUMERAL EXAMPLE 11

Unit mm

Surface Data

| Surface No. | r | d | nd | vd |
| --- | --- | --- | --- | --- |
| 1 | 100.000 | 0.60 | 1.84666 | 23.78 |
| 2 (Aspheric Surface) | 12.463 | 1.90 | | |
| 3 | ∞ | 8.50 | 1.88300 | 40.76 |
| 4 | ∞ | 0.10 | | |
| 5 | 115.783 | 1.54 | 1.49700 | 81.61 |
| 6 | −14.032 | 0.10 | | |
| 7 | 14.529 | 1.62 | 1.65160 | 58.55 |
| 8 | −30.811 | D8 | | |
| 9 | −25.609 | 0.50 | 1.80610 | 40.92 |
| 10 (Aspheric Surface) | 6.211 | 1.08 | | |
| 11 | −16.799 | 0.50 | 1.77250 | 49.60 |
| 12 | 6.594 | 1.09 | 1.92286 | 18.90 |
| 13 | 30.202 | D13 | | |
| 14 (Stop) | ∞ | 0.50 | | |
| 15 (Aspheric Surface) | 8.922 | 0.88 | 1.74320 | 49.34 |
| 16 | 31.777 | D16 | | |
| 17 (Aspheric Surface) | 4.853 | 3.50 | 1.49700 | 81.61 |
| 18 | −10.626 | 0.10 | | |
| 19 | −38.913 | 0.55 | 1.84666 | 23.78 |
| 20 (Aspheric Surface) | 12.007 | D20 | | |
| 21 | −30.372 | 0.50 | 1.63493 | 23.89 |
| 22 (Aspheric Surface) | 34.707 | 0.40 | | |
| 23 (Aspheric Surface) | −91.640 | 0.50 | 1.63493 | 23.89 |
| 24 | 28.854 | D24 | | |
| 25 | 51.814 | 2.00 | 1.52542 | 55.78 |
| 26 | −8.675 | 0.30 | | |
| 27 | ∞ | 1.55 | 1.51633 | 64.14 |
| 28 | ∞ | 0.34 | | |
| Image Plane | ∞ | | | |

Aspheric Data

2nd Surface

K = 0.305, A4 = 1.40778E−04
10th Surface

K = 0.000, A4 = −4.13164E−04, A6 = −1.91217E−06
15th Surface

K = 0.000, A4 = −2.30379E−04

-continued

Unit mm

17th Surface

K = −0.874, A4 = 1.06427E−03, A6 = 1.84229E−05
20th Surface

K = 0.000, A4 = 2.31062E−03, A6 = 7.39288E−05, A8 = 8.61123E−06
22th Surface

K = 0.000, A4 = 1.05138E−03
23th Surface

K = 0.000, A4 = 5.94263E−04, A6 = −3.96449E−05

Zoom Data
Zoom Ratio 6.93

|  | Wide-Angle | Intermediate | Telephoto |
| --- | --- | --- | --- |
| Focal Length | 5.04 | 13.30 | 34.92 |
| FNO. | 4.53 | 5.74 | 6.48 |
| Angle of View (2ω) | 83.48 | 31.72 | 12.62 |
| Image Hight | 3.84 | 3.84 | 3.84 |
| Full Lens Length | 49.73 | 49.73 | 49.73 |
| BF (in air) | 1.67 | 1.67 | 1.66 |
| D8 | 0.30 | 4.22 | 7.67 |
| D13 | 7.73 | 3.81 | 0.36 |
| D16 | 6.29 | 2.27 | 0.37 |
| D20 | 6.29 | 8.55 | 5.22 |
| D24 | 1.00 | 2.76 | 8.00 |

NUMERAL EXAMPLE 12

Unit mm

Surface Data

| Surface No. | r | d | nd | vd |
| --- | --- | --- | --- | --- |
| 1 | 246.233 | 0.60 | 1.84666 | 23.78 |
| 2 (Aspheric Surface) | 13.798 | 1.90 | | |
| 3 | ∞ | 8.50 | 1.88300 | 40.76 |
| 4 | ∞ | 0.10 | | |
| 5 | 85.653 | 1.53 | 1.49700 | 81.61 |
| 6 | −15.110 | 0.10 | | |
| 7 | 13.824 | 1.58 | 1.65160 | 58.55 |
| 8 | −44.736 | D8 | | |
| 9 | −32.553 | 0.30 | 1.80610 | 40.92 |
| 10 (Aspheric Surface) | 5.673 | 1.16 | | |
| 11 | −13.580 | 0.50 | 1.77250 | 49.60 |
| 12 | 8.618 | 1.09 | 1.92286 | 18.90 |
| 13 | ∞ | D13 | | |
| 14 (Stop) | ∞ | 0.50 | | |
| 15 (Aspheric Surface) | 8.081 | 0.86 | 1.74320 | 49.34 |
| 16 | 17.944 | D16 | | |
| 17 (Aspheric Surface) | 4.500 | 3.50 | 1.49700 | 81.61 |
| 18 | −13.218 | 0.10 | | |
| 19 | 11.880 | 0.50 | 1.84666 | 23.78 |
| 20 (Aspheric Surface) | 5.000 | D20 | | |
| 21 | −16.264 | 0.50 | 1.84666 | 23.78 |
| 22 | 6.500 | 1.52 | 1.63493 | 23.89 |
| 23 | 173.726 | D23 | | |
| 24 | 19.766 | 2.11 | 1.52542 | 55.78 |
| 25 | −10.556 | 0.30 | | |
| 26 | ∞ | 1.55 | 1.51633 | 64.14 |
| 27 | ∞ | 0.34 | | |
| Image Plane | ∞ | | | |

Aspheric Data

2nd Surface

K = −0.084, A4 = 1.09733E−04

-continued

Unit mm

10th Surface

K = 0.000, A4 = −4.22086E−04, A6 = −1.68114E−06

15th Surface

K = 0.000, A4 = −1.88360E−04

17th Surface

K = −0.995, A4 = 9.35350E−04, A6 = −1.82585E−06

20th Surface

K = 0.000, A4 = 2.52148E−03, A6 = 1.31113E−04, A8 = 1.77035E−05

Zoom Data
Zoom Ratio 6.89

|  | Wide-Angle | Intermediate | Telephoto |
|---|---|---|---|
| Focal Length | 5.34 | 14.06 | 36.76 |
| FNO. | 4.46 | 5.61 | 6.13 |
| Angle of View (2ω) | 79.44 | 29.90 | 11.78 |
| Image Hight | 3.84 | 3.84 | 3.84 |
| Full Lens Length | 50.01 | 50.05 | 50.76 |
| BF (in air) | 1.96 | 1.98 | 2.69 |
| D8 | 0.32 | 4.89 | 8.86 |
| D13 | 8.85 | 4.28 | 0.30 |
| D16 | 4.70 | 1.50 | 0.44 |
| D20 | 5.47 | 8.36 | 4.52 |
| D23 | 1.79 | 2.10 | 7.00 |

NUMERAL EXAMPLE 13

Unit mm

Surface Data

| Surface No. | r | d | nd | νd |
|---|---|---|---|---|
| 1 | 306.276 | 0.60 | 1.84666 | 23.78 |
| 2 (Aspheric Surface) | 14.152 | 1.90 | | |
| 3 | ∞ | 8.50 | 1.88300 | 40.76 |
| 4 | ∞ | 0.10 | | |
| 5 | 61.179 | 1.53 | 1.49700 | 81.61 |
| 6 | −15.732 | 0.10 | | |
| 7 | 14.154 | 1.54 | 1.65160 | 58.55 |
| 8 | −46.847 | D8 | | |
| 9 | −34.589 | 0.30 | 1.80610 | 40.92 |
| 10 (Aspheric Surface) | 5.628 | 1.16 | | |
| 11 | −13.256 | 0.50 | 1.77250 | 49.60 |
| 12 | 8.964 | 1.06 | 1.92286 | 18.90 |
| 13 | −224.569 | D13 | | |
| 14 (Stop) | ∞ | 0.50 | | |
| 15 (Aspheric Surface) | 8.343 | 0.85 | 1.74320 | 49.34 |
| 16 | 18.523 | D16 | | |
| 17 (Aspheric Surface) | 4.500 | 3.50 | 1.49700 | 81.61 |
| 18 | −12.673 | 0.10 | | |
| 19 | 12.031 | 0.50 | 1.84666 | 23.78 |
| 20 (Aspheric Surface) | 5.000 | D20 | | |
| 21 | −15.516 | 0.50 | 1.84666 | 23.78 |
| 22 | 10.765 | 0.30 | | |
| 23 | 11.591 | 1.12 | 1.63493 | 23.89 |
| 24 | 246.505 | D24 | | |
| 25 | 14.563 | 2.22 | 1.52542 | 55.78 |
| 26 | −12.035 | 0.31 | | |
| 27 | ∞ | 1.55 | 1.51633 | 64.14 |
| 28 | ∞ | 0.34 | | |
| Image Plane | ∞ | | | |

-continued

Unit mm

Aspheric Data

2nd Surface

K = 0.009, A4 = 1.00582E−04

10th Surface

K = 0.000, A4 = −4.28973E−04, A6 = −2.75574E−06

15th Surface

K = 0.000, A4 = −1.68903E−04

17th Surface

K = −1.008, A4 = 9.18694E−04, A6 = −3.45304E−06

20th Surface

K = 0.000, A4 = 2.45936E−03, A6 = 1.27154E−04, A8 = 1.66957E−05

Zoom Data
Zoom Ratio 6.93

|  | Wide-Angle | Intermediate | Telephoto |
|---|---|---|---|
| Focal Length | 5.10 | 13.43 | 35.34 |
| FNO. | 4.46 | 5.61 | 6.13 |
| Angle of View (2ω) | 83.18 | 31.38 | 12.14 |
| Image Hight | 3.84 | 3.84 | 3.84 |
| Full Lens Length | 49.73 | 49.73 | 49.73 |
| BF (in air) | 1.68 | 1.68 | 1.67 |
| D8 | 0.32 | 4.92 | 8.98 |
| D13 | 8.97 | 4.37 | 0.30 |
| D16 | 4.70 | 1.50 | 0.43 |
| D20 | 5.68 | 8.39 | 4.46 |
| D24 | 1.50 | 2.00 | 6.99 |

NUMERAL EXAMPLE 14

Unit mm

Surface Data

| Surface No. | r | d | nd | νd |
|---|---|---|---|---|
| 1 | 277.498 | 0.50 | 1.63493 | 23.90 |
| 2 (Aspheric Surface) | 12.000 | 1.90 | | |
| 3 | ∞ | 7.80 | 1.81600 | 46.62 |
| 4 | ∞ | 0.10 | | |
| 5 | 42.687 | 1.29 | 1.49700 | 81.61 |
| 6 | −17.015 | 0.10 | | |
| 7 | 9.176 | 1.46 | 1.52542 | 55.78 |
| 8 | −95.983 | D8 | | |
| 9 | 108.490 | 0.30 | 1.88300 | 40.76 |
| 10 | 6.429 | 0.85 | | |
| 11 | −16.840 | 0.50 | 1.74100 | 52.64 |
| 12 | 5.537 | 0.97 | 1.92286 | 18.90 |
| 13 | 15.655 | D13 | | |
| 14 (Stop) | ∞ | D14 | | |
| 15 (Aspheric Surface) | 6.576 | 0.98 | 1.52542 | 55.78 |
| 16 | 33.398 | D16 | | |
| 17 | 6.252 | 1.81 | 1.49700 | 81.61 |
| 18 | −16.372 | 0.30 | | |
| 19 (Aspheric Surface) | 6.002 | 1.33 | 1.52542 | 55.78 |
| 20 | ∞ | 0.50 | 1.63493 | 23.90 |
| 21 (Aspheric Surface) | 4.524 | D21 | | |
| 22 | −10.000 | 0.50 | 1.52542 | 55.78 |
| 23 | 335.543 | D23 | | |
| 24 | 30.000 | 1.45 | 1.52542 | 55.78 |
| 25 | −15.000 | 0.30 | | |
| 26 | ∞ | 1.55 | 1.51633 | 64.14 |
| 27 | ∞ | 0.34 | | |
| Image Plane | ∞ | | | |

Unit mm

Aspheric Data

2nd Surface

K = 0.000, A4 = 9.48568E−05
15th Surface

K = 0.000, A4 = −6.59915E−04, A6 = −5.14679E−06
19th Surface

K = 0.000, A4 = −2.85433E−04, A6 = −4.31777E−05,
A8 = −6.66869E−06
21th Surface

K = 0.000, A4 = 1.81842E−03, A6 = 5.94070E−05, A8 = −1.31834E−05

Zoom Data
Zoom Ratio 3.90

| | Wide-Angle | Intermediate | Telephoto |
|---|---|---|---|
| Focal Length | 5.47 | 13.88 | 21.31 |
| FNO. | 3.50 | 4.81 | 5.96 |
| Angle of View (2ω) | 78.00 | 30.76 | 20.04 |
| Image Hight | 3.84 | 3.84 | 3.84 |
| Full Lens Length | 41.73 | 41.72 | 41.73 |
| BF (in air) | 1.67 | 1.66 | 1.67 |
| D8 | 0.29 | 3.77 | 5.07 |
| D13 | 3.76 | 1.11 | 0.60 |
| D14 | 2.00 | 1.16 | 0.40 |
| D16 | 4.94 | 1.70 | 0.30 |
| D21 | 4.92 | 7.66 | 8.05 |
| D23 | 1.50 | 2.00 | 3.00 |

NUMERAL EXAMPLE 15

Unit mm

Surface Data

| Surface No. | r | d | nd | vd |
|---|---|---|---|---|
| 1 | 220.658 | 0.50 | 1.63493 | 23.90 |
| 2 (Aspheric Surface) | 12.198 | 1.90 | | |
| 3 | ∞ | 7.80 | 1.81600 | 46.62 |
| 4 | ∞ | 0.10 | | |
| 5 | 37.263 | 1.24 | 1.49700 | 81.61 |
| 6 | −17.820 | 0.10 | | |
| 7 | 9.132 | 1.36 | 1.52542 | 55.78 |
| 8 | −151.105 | D8 | | |
| 9 | −133.261 | 0.30 | 1.88300 | 40.76 |
| 10 | 6.357 | 0.85 | | |
| 11 | −14.627 | 0.50 | 1.77250 | 49.60 |
| 12 | 5.667 | 0.97 | 1.92286 | 18.90 |
| 13 | 19.219 | D13 | | |
| 14 (Stop) | ∞ | D14 | | |
| 15 (Aspheric Surface) | 7.141 | 0.99 | 1.52542 | 55.78 |
| 16 | 84.808 | D16 | | |
| 17 | 6.271 | 1.86 | 1.49700 | 81.61 |
| 18 | −16.417 | 0.30 | | |
| 19 (Aspheric Surface) | 6.041 | 1.37 | 1.52542 | 55.78 |
| 20 | ∞ | 0.50 | 1.63493 | 23.90 |
| 21 (Aspheric Surface) | 4.510 | D21 | | |
| 22 | −10.000 | 0.50 | 1.52542 | 55.78 |
| 23 | 483.582 | D23 | | |
| 24 | 30.000 | 1.44 | 1.52542 | 55.78 |
| 25 | −15.000 | 0.36 | | |
| 26 | ∞ | 1.55 | 1.51633 | 64.14 |
| 27 | ∞ | 0.34 | | |
| Image Plane | ∞ | | | |

Unit mm

Aspheric Data

2nd Surface

K = 0.000, A4 = 8.26967E−05
15th Surface

K = 0.000, A4 = −5.95864E−04, A6 = −1.61120E−06
19th Surface

K = 0.000, A4 = −2.87785E−04, A6 = −4.24082E−05,
A8 = −6.46386E−06
21th Surface

K = 0.000, A4 = 1.75984E−03, A6 = 5.35614E−05, A8 = −1.35560E−05

Zoom Data
Zoom Ratio 3.90

| | Wide-Angle | Intermediate | Telephoto |
|---|---|---|---|
| Focal Length | 5.43 | 13.80 | 21.15 |
| FNO. | 3.51 | 5.25 | 6.03 |
| Angle of View (2ω) | 78.58 | 31.02 | 20.18 |
| Image Hight | 3.84 | 3.84 | 3.84 |
| Full Lens Length | 41.73 | 41.71 | 41.71 |
| BF (in air) | 1.73 | 1.71 | 1.72 |
| D8 | 0.30 | 3.32 | 5.18 |
| D13 | 3.53 | 1.21 | 0.60 |
| D14 | 2.00 | 0.89 | 0.40 |
| D16 | 5.33 | 1.63 | 0.30 |
| D21 | 4.74 | 8.36 | 7.92 |
| D23 | 1.50 | 2.00 | 3.00 |

FIGS. 16 to 30 are sets of aberration diagrams for spherical aberration (SA), field curvature (FC), distortion (DT) and chromatic aberration of magnification of the imaging optical systems or zoom lenses of Examples 1 to 15 upon focusing an infinite object point (a) at the wide-angle end, (b) in the intermediate focal length setting, and (c) at the telephoto end, respectively.

Given to spherical aberrations and chromatic aberration of magnification are numeral values at the respective wavelengths of 435.84 nm (g-line: a one-dotted chain line), 587.56 nm (d-line: a solid line), and 656.27 nm (C-line: a broken line). Astigmatism is shown with the sagittal image plane as a solid line and the meridional image plane as a dotted line. Note here that FNO is the F-number, and ω is the half angle of view.

Tabulated below are the values of Conditions (1) to (5) in the examples.

| Condition | Example 1 | Example 2 | Example 3 | Example 4 | Example 5 |
|---|---|---|---|---|---|
| (1) | 8.562 | 18.094 | −3.002 | −27.648 | −3.213 |
| (2) | 0.398 | 0.680 | 0.378 | 0.350 | 0.385 |
| (3) | 2.351 | 1.317 | 2.602 | 1.359 | 3.268 |
| (4) | −0.129 | 0.009 | −0.095 | −0.018 | −0.249 |
| (5) | 0.477 | −0.132 | 1.639 | 1.015 | 2.335 |

| Condition | Example 6 | Example 7 | Example 8 | Example 9 | Example 10 |
|---|---|---|---|---|---|
| (1) | −4.527 | 3.430 | 12.324 | 15.176 | 14.911 |
| (2) | 0.410 | 0.264 | 0.346 | 0.482 | 0.452 |
| (3) | 3.851 | 3.440 | 1.694 | 1.341 | 1.752 |

-continued

| Condition | Example 6 | Example 7 | Example 8 | Example 9 | Example 10 |
|---|---|---|---|---|---|
| (4) | −0.201 | −0.027 | 0.192 | 0.189 | 0.012 |
| (5) | 2.335 | 0.863 | 1.391 | 0.504 | 0.729 |

| Condition | Example 11 | Example 12 | Example 13 | Example 14 | Example 15 |
|---|---|---|---|---|---|
| (1) | 2.356 | 19.000 | 19.000 | −6.237 | −6.124 |
| (2) | 0.433 | 0.530 | 0.513 | 0.377 | 0.378 |
| (3) | 1.340 | 2.067 | 1.692 | 2.592 | 2.624 |
| (4) | 1.751 | −0.053 | −0.026 | −0.463 | −0.462 |
| (5) | −0.026 | 0.829 | 0.882 | 0.942 | 0.959 |

Figure 31:
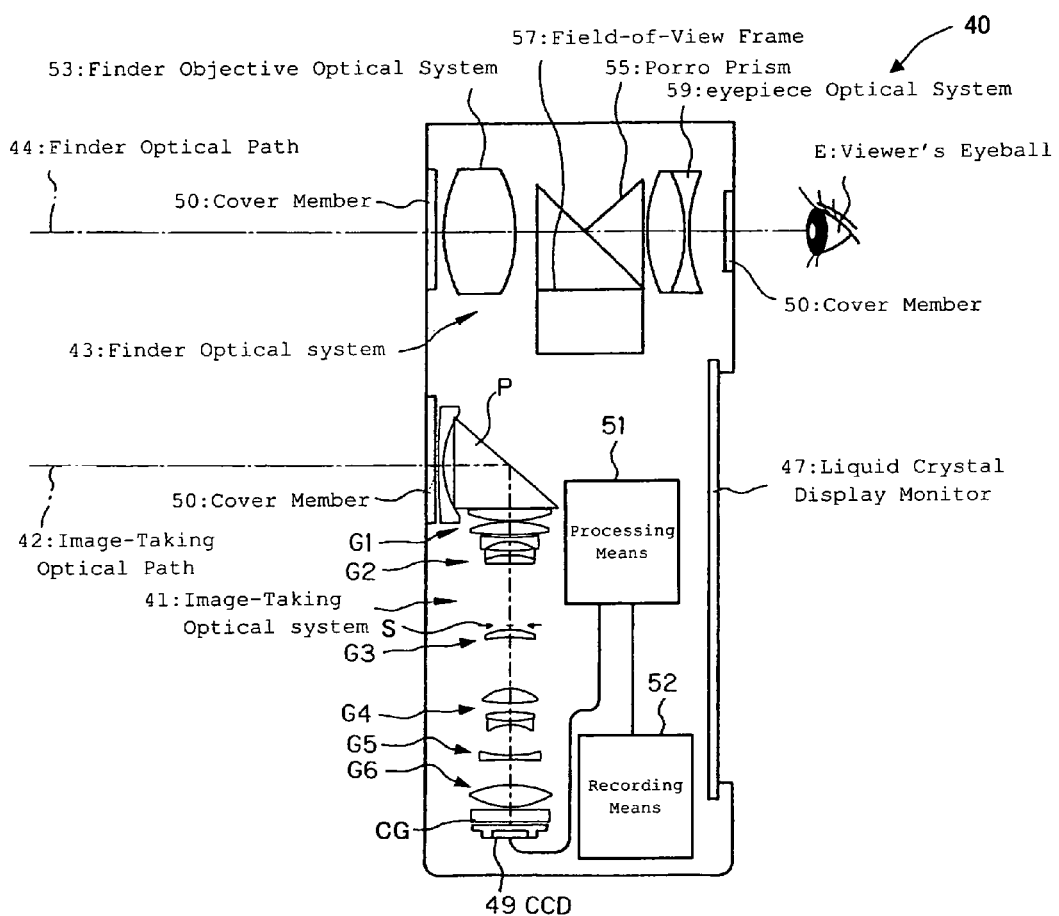
FIG. 31 is a sectional view of the digital camera 40 taking the form of the electronic imaging apparatus incorporating the inventive zoom lens.

FIG. 31 is a sectional view of the makeup of a digital camera working as an imaging apparatus, in which the zoom lens according to one embodiment of the invention is built into the image-taking optical system 41.

In this embodiment, the digital camera 40 includes an image-taking optical system 41 having a taking optical path 42, a finder optical system 43 having a finder optical path 44, a shutter 45, a flash 46, a liquid crystal display monitor 47, and so on. As the shutter 45 located on the upper portion of the camera 40 is pressed down, it causes images to be taken through the image-taking optical system 41, for instance, the zoom lens of Example 1.

An object image formed through the image-taking optical system 41 is formed on the imaging plane of a CCD, CMOS or other imaging device 49 via a cover glass CG. The object image received on the CCD, CMOS or other imaging device 49 is displayed as an electronic image on the liquid crystal display monitor (LCD) 47 located on the back of the camera via a processing means (such as CPU) 51. That processing means 51 may be connected with a recording means (such as a memory) 52 for the recording of taken electronic images. It is here to be noted that the recording means 52 may be provided separately from the processing means 51 or, alternatively, it may be designed in such a way as to implement electronic recording or writing on floppy (registered trademark) discs, memory cards, MOs, DVDs±RWs or the like. If silver halide film is provided in place of CCD 49 or the like, then the digital camera may be set up as a silver-halide camera.

Moreover, a finder objective optical system 53 is located on the finder optical path 44. An object image formed by the finder objective optical system 53 is formed on a field-of-view frame 57 for a Porro prism 55 that is an image erecting member. In the rear of this Porro prism 55 there is an eyepiece optical system 59 located for guiding the erected, orthoscopic image onto the viewer's eyeball E. It is here to be noted that a cover member 50 is located on the entrance side of the image-taking optical system 41 and finder objective optical system 53, and on the exit side of the eyepiece optical system 59.

Figure 32:
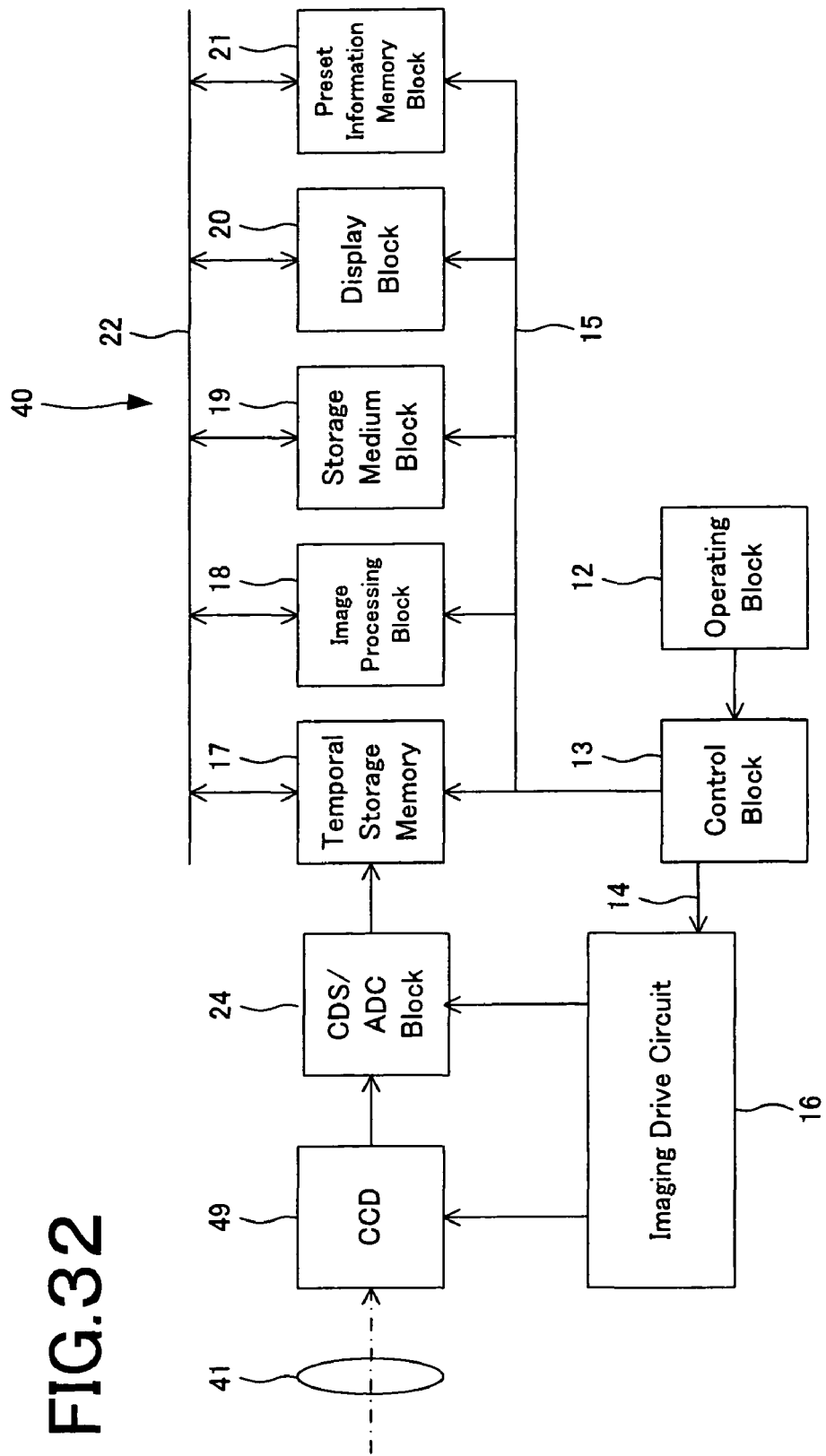
FIG. 32 is a block diagram illustrative of the internal circuitry of a main part of the digital camera.

FIG. 32 is a block diagram for the internal circuitry in the main part of the digital camera 40. In what follows, the aforesaid processing means shown by 51 is made up of a CDS/ADC block 24, a temporary storage memory 17, an image processing block 18, etc., and the storage means 52 is made up of a storage medium block, etc.

As shown in FIG. 32, the digital camera 40 includes an operating block 12, a control block 13 connected to the operating block 12, an imaging drive circuit 16 and a temporal storage memory 17 connected to the control signal output port of the control block 13 via buses 14 and 15, an image processing block 18, a storage medium block 19, a display block 20, and a preset information storage memory block 21.

The temporal storage memory 17, image processing block 18, storage medium block 19, display block 20 and preset storage memory block 21 are designed such that data are mutually entered in or produced out of them via a bus 22, and the imaging drive circuit 16 is connected with the CCD 49 and CDS/ADC block 24.

The operating block 12 is a circuit including various input buttons and switches, through which event information entered (by a camera operator) from outside is notified to the control block 13. The control block 13 is a central computing unit that is made up of typically a CPU and has a built-in program memory (not shown): it is a circuit that, according to the program loaded in that program memory, receives commands entered by the camera operator via the operating block 12 to have control over the digital camera 40.

The CCD 49 receives an object image formed through the image-taking optical system 41. More specifically, the CCD 49 is an imaging device that is driven and controlled by the image-taking drive circuit 16 to convert light quantity per pixel of that object image into electrical signals that are in turn sent out to the CDS/ADC block 24.

The CDS/ADC block 24 is a circuit that amplifies electrical signals entered from CCD 49 and subjects them to analog-to-digital conversion so that image raw data (Bayer data: hereinafter called the RAW data) subjected only to amplification and digital conversion are sent out to the temporal memory 17.

The temporal storage memory 17 is a buffer made up of an SDRAM, etc.: it is a memory device for temporal storage of the RAW data produced out of the CDS/ADC block 24. The image processing block 18 is a circuit that reads out the RAW data stored in the temporal storage memory 17 or the RAW data stored in the storage medium block 19 thereby electrically implementing various forms of processing inclusive of distortion correction based on an image quality parameter instructed by the control block 13.

The storage medium block 19 is a control circuit for a device that detachably receives a card type or stick type storage medium comprising typically a flash memory so that the RAW data transferred from the temporal memory 17 or image data processed at the image processing block 18 are recorded and held in that card type or stick type storage medium.

The display block 20 is a circuit for displaying images, operating menus or the like on the liquid crystal display monitor 47. The preset information storage memory block 21 includes a ROM sub-block having various image quality parameters previously loaded in it, and a RAM sub-block for storing an image quality parameter selected from among image quality parameters read out of that ROM sub-block by entering operation of the operating block 12. The preset information storage memory block 21 is a circuit for controlling inputs to or outputs out of those memories.

The thus assembled digital camera 40, because the inventive zoom lens is used as the imaging optical system 41, may be used as a small-format imaging apparatus well fit for the taking of moving images.

While various embodiments of the invention have been explained, it is to be understood that the present invention is never limited to them alone, and embodiments comprising combinations of the essential requirements and limitations are embraced in the category of those embodiments too.

What is claimed is:

1. A zoom lens, comprising, in order from an object side thereof, a first lens group having positive refracting power, a second lens group having negative refracting power, a third lens group having positive refracting power, a fourth lens group having positive refracting power, a fifth lens group having negative refracting power, and a sixth lens group having positive refracting power, wherein:

the first lens group includes a reflective optical element, and a lens in and on a most image side of the fourth lens group comprises a negative lens concave on its image side.

2. The zoom lens according to claim 1, which satisfies the following Condition (1):

$$1.9 \leq |(R_{G4L}+R_{G4S})/(R_{G4L}-R_{G4S})| \qquad (1)$$

where $R_{G4S}$ is a radius of curvature of a surface in and on a most object side of the fourth lens group, and $R_{G4L}$ is a radius of curvature of a surface in and on the most image side of the fourth lens group.

3. The zoom lens according to claim 1, wherein the fourth lens group comprises at least two lens components.

4. The zoom lens according to claim 1, which satisfies the following Condition (2):

$$0.1 \leq (R_{G5S}+R_{G4L})/(R_{G5S}-R_{G4L}) \leq 0.9 \qquad (2)$$

where $R_{G5S}$ is a radius of curvature of a surface in and on a most object side of the fifth lens group, and $R_{G4L}$ is a radius of curvature of a surface in and on the most image side of the fourth lens group.

5. The zoom lens according to claim 1, which satisfies the following Condition (3):

$$1.1 \leq F_{G5}/F_{G4Ln} \leq 5 \qquad (3)$$

where $F_{G5}$ is a focal length of the fifth lens group, and $F_{G4Ln}$ is a focal length of the negative lens in and on the most image side of the fourth lens group.

6. The zoom lens according to claim 1, wherein a lens surface in and on a most object side of the fifth lens group is concave on its object side.

7. The zoom lens according to claim 1, wherein the first lens group comprises a front subgroup having negative refracting power and a rear subgroup having positive refracting power.

8. The zoom lens according to claim 1, wherein the second lens group includes at least two negative lenses located back-to-back and side-by-side.

9. The zoom lens according to claim 1, wherein the sixth lens group remains fixed during zooming.

10. An electronic imaging apparatus, comprising:

a zoom lens as recited in claim 1, and an imaging device located on an image side of the zoom lens and having an imaging plane for converting an optical image into electrical signals.

* * * * *